(12) United States Patent
Chaput et al.

(10) Patent No.: US 12,465,911 B2
(45) Date of Patent: Nov. 11, 2025

(54) LASER-INDUCED CONFOCAL MICROSCOPE AND MICROFLUIDIC DEVICE FOR DIELECTROPHORETIC FLUORESCENCE-ACTIVATED DROPLET SORTING

(71) Applicants: THE REGENTS OF THE UNIVERSITY OF CALIFORNIA, Oakland, CA (US); THE SCRIPPS RESEARCH INSTITUTE, La Jolla, CA (US)

(72) Inventors: John Chaput, Irvine, CA (US); Derek Vallejo, Los Angeles, CA (US); Brian Paegel, Irvine, CA (US)

(73) Assignees: THE REGENTS OF THE UNIVERSITY OF CALIFORNIA, Oakland, CA (US); THE SCRIPPS RESEARCH INSTITUTE, La Jolla, CA (US)

( * ) Notice: Subject to any disclaimer, the term of this patent is extended or adjusted under 35 U.S.C. 154(b) by 953 days.

(21) Appl. No.: 17/607,008

(22) PCT Filed: May 1, 2020

(86) PCT No.: PCT/US2020/031121
§ 371 (c)(1),
(2) Date: Oct. 27, 2021

(87) PCT Pub. No.: WO2020/223675
PCT Pub. Date: Nov. 5, 2020

(65) Prior Publication Data
US 2022/0212188 A1    Jul. 7, 2022

Related U.S. Application Data

(60) Provisional application No. 62/842,434, filed on May 2, 2019.

(51) Int. Cl.
*B01L 3/00* (2006.01)
*G01N 15/00* (2024.01)
*G01N 15/14* (2024.01)

(52) U.S. Cl.
CPC ... *B01L 3/502715* (2013.01); *B01L 3/502753* (2013.01); *B01L 3/502784* (2013.01);
(Continued)

(58) Field of Classification Search
CPC ......... B01L 3/502715; B01L 3/502753; B01L 3/502784; B01L 2200/0673;
(Continued)

(56) References Cited

U.S. PATENT DOCUMENTS 8,685,894 B2    4/2014  Chaput et al.
9,528,106 B2   12/2016  Griffiths et al.
(Continued)

FOREIGN PATENT DOCUMENTS

WO    2008039207 A1    4/2008
WO    2016/065056 A1   4/2016

OTHER PUBLICATIONS

Mazutis, et al., "Single-cell analysis and sorting using droplet-based microfluidics," Nat Protoc, May 2013, 8(5):870-891. (Year: 2013).*
(Continued)

*Primary Examiner* — Jill A Warden
*Assistant Examiner* — Alex Ramirez
(74) *Attorney, Agent, or Firm* — VISTA IP LAW GROUP LLP

(57) ABSTRACT

Systems and method for sorting droplets includes a microfluidic chip or substrate having a droplet sorting channel coupled at an upstream location to a droplet inlet channel, the droplet sorting channel coupled at a downstream location to a waste channel and a collection channel. The device includes an optical interrogation device configured to illu-
(Continued)

minate the droplets passing through the sorting channel with excitation light from an excitation light source and capturing emitted fluorescent light and generating an output signal correlated to the fluorescence of the droplets. An actuator (electrode) is disposed in the microfluidic chip or substrate and coupled to a signal driver (e.g., a high voltage amplifier). The device or system uses a programmable controller configured to receive the output signals from the optical interrogation device and trigger the signal driver to actuate the actuator to direct the droplets into the collection channel.

17 Claims, 30 Drawing Sheets

Specification includes a Sequence Listing.

(52) U.S. Cl.
CPC ..... *G01N 15/1459* (2013.01); *G01N 15/1484* (2013.01); *B01L 2200/0673* (2013.01); *B01L 2300/0645* (2013.01); *B01L 2300/0663* (2013.01); *B01L 2300/0819* (2013.01); *B01L 2300/0864* (2013.01); *B01L 2400/0424* (2013.01); *G01N 2015/003* (2013.01)

(58) Field of Classification Search
CPC ..... B01L 2300/0645; B01L 2300/0663; B01L 2300/0819; B01L 2300/0864; B01L 2400/0424; G01N 15/1459; G01N 15/1484; G01N 2015/003
See application file for complete search history.

(56) References Cited

U.S. PATENT DOCUMENTS

| | | | |
|---|---|---|---|
| 9,863,938 | B2 | 1/2018 | Johnston et al. |
| 10,584,319 | B2 | 3/2020 | Chaput et al. |
| 2006/0003347 | A1 | 1/2006 | Griffiths et al. |
| 2009/0018028 | A1 | 1/2009 | Lindsay et al. |
| 2012/0065123 | A1 | 3/2012 | Johnston et al. |
| 2014/0045723 | A1 | 2/2014 | Blazej et al. |
| 2015/0232942 | A1 | 8/2015 | Abate et al. |
| 2018/0056288 | A1* | 3/2018 | Abate ............... G01N 15/1484 |

OTHER PUBLICATIONS

Mazutis, Linas, Single-cell analysis and sorting using droplet-based microfluidics, 2013, Nature Protocols, pp. 871-891 (Year: 2013).*

PCT International Search Report for PCT/US2020/031121, Applicant: The Regents of the University of California, Form PCT/ISA/210 and 220, dated Oct. 1, 2020 (5 pages).
PCT Written Opinion of the International Search Authority for PCT/US2020/031121, Applicant: The Regents of the University of California, Form PCT/ISA/237, dated Oct. 1, 2020 (13 pages).
Jeremy J. Agrestia et al., Ultrahigh-throughput screening in drop-based microfluidics for directed evolution, PNAS, Mar. 2, 2010, vol. 107, No. 9, 4004-4009.
Amir Aharoni et al., High-throughput screens and selections of enzyme-encoding genes, Current Opinion in Chemical Biology 2005, 9:210-216.
Jean-Christophe Baret et al., Fluorescence-activated droplet sorting (FADS): efficient microfluidic cell sorting based on enzymatic activity, Lab Chip, 2009, 9, 1850-1858.
Todd A. Duncombe et al., Microfluidics: reframing biological enquiry, Nat Rev Mol Cell Biol., Sep. 2015, 6(9): 554-567.
Andrew C. Larsen et al., A general strategy for expanding polymerase function by droplet microfluidics, Nature Communications, 7:11235, DOI: 10.1038/ncomms11235, www.nature.com/naturecommunications.
Linas Mazutis et al., Single-cell analysis and sorting using droplet-based microfluidics, Nat Protoc., May 2013, 8(5):870-891.
Vitor B. Pinheiro et al., Synthetic genetic polymers capable of heredity and evolution, Science. Apr. 20, 2012; 336 (6079): 341-344.
Alexander K. Price et al., Discovery in Droplets, Anal Chem. Jan. 5, 2016; 88(1): 339-353.
Nairmala Ramanujam, Fluorescence Spectroscopy of Neoplastic and Non-Neoplastic Tissues, Neoplasia, vol. 2, Nos. 1-2, Jan.-Apr. 2000, pp. 89-177.
Adam Sciambi et al., Accurate microfluidic sorting of droplets of 30kHz, Lab Chip, Jan. 7, 2015; 15(1): 47-51.
Yung-Chieh Tan et al., Monodispersed microfluidic droplet generation by shear focusing microfluidic device, Sensors and Actuators B 114 (2006) 350-356.
Derek Vallejo et al., Fluorescence Activated Droplet Sorting for Single Cell Directed Evolution, ACS Synth Biol. Jun. 21, 2019; 8(6): 1430-1440.
Heng-Dong Xi et al., Active droplet sorting in microfluidics: a review, Lab Chip, 2017, 17, 751.
Anastasia Zinchenko et al., One in a Million: Flow Cytometric Sorting of Single Cell-Lysate Assays in Monodisperse Picolitre Double Emulsion Droplets for Directed Evolution, Anal. Chem. 2014, 86, 2526-2533.
PCT International Preliminary Report on Patentability (Chapter I of the Patent Cooperation Treaty) for PCT/US2020/031121, Applicant: The Regents of the University of California, Form PCT/IB/326 and 373, dated Nov. 11, 2021 (15 pages).

* cited by examiner

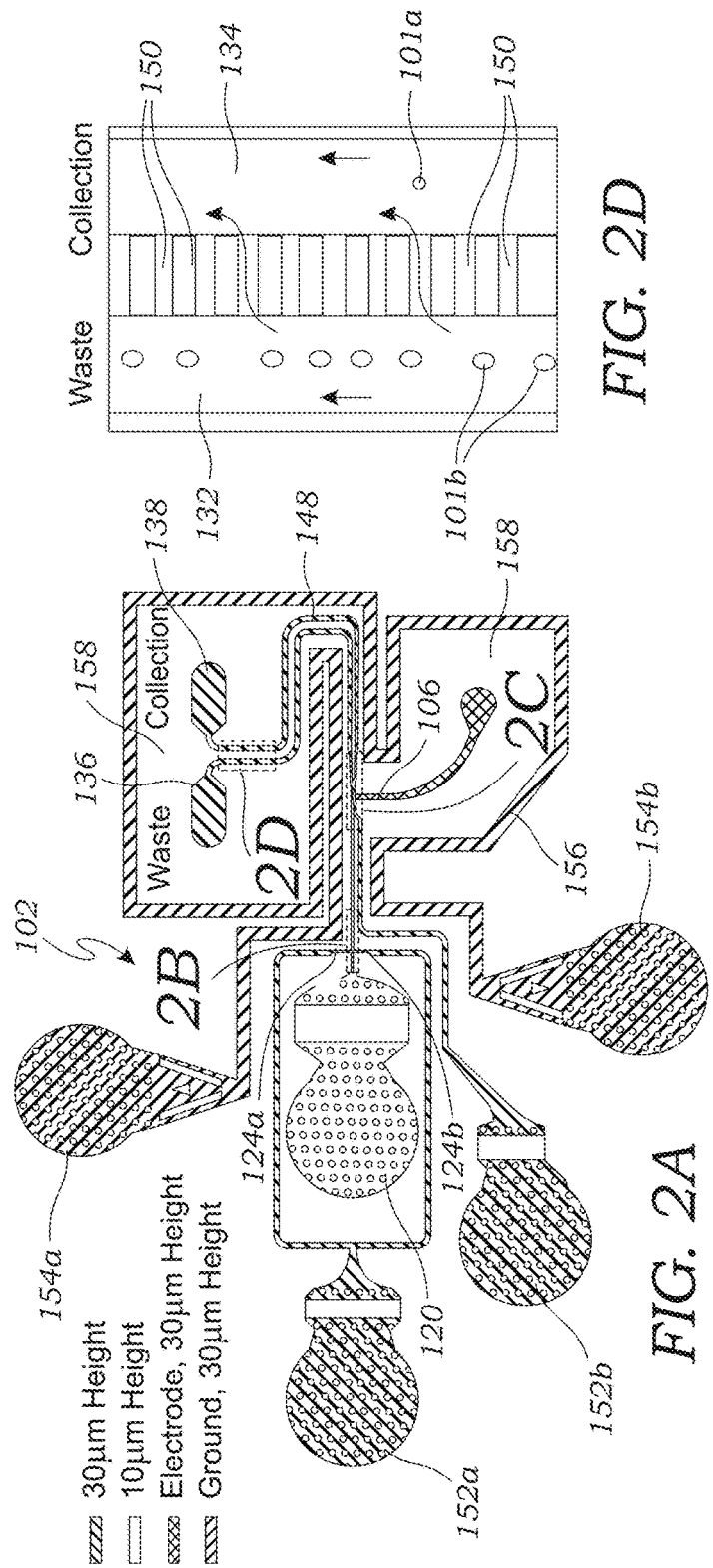
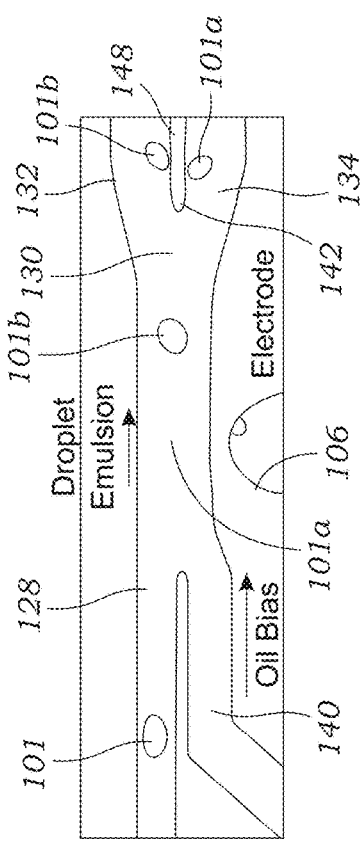
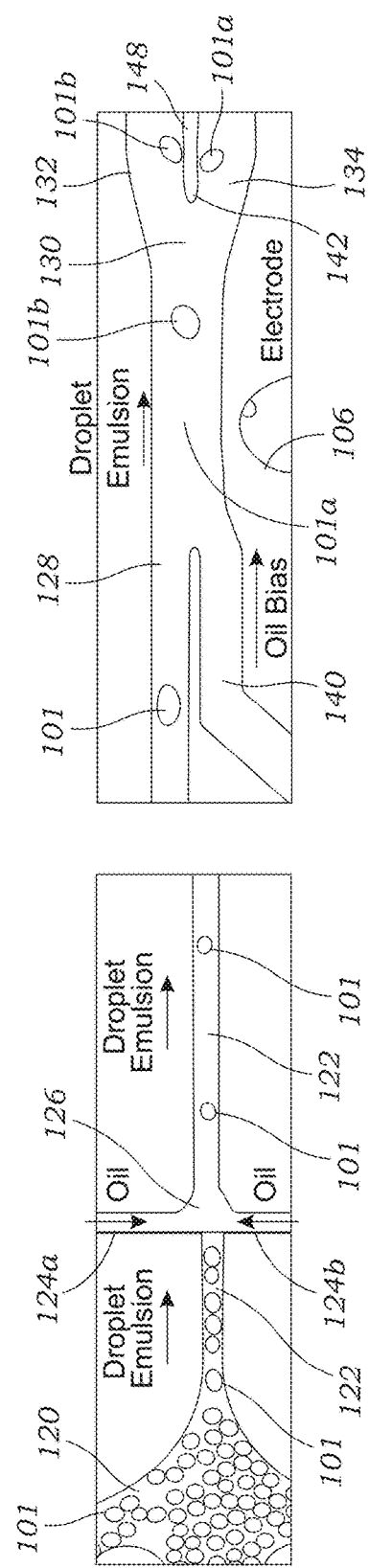

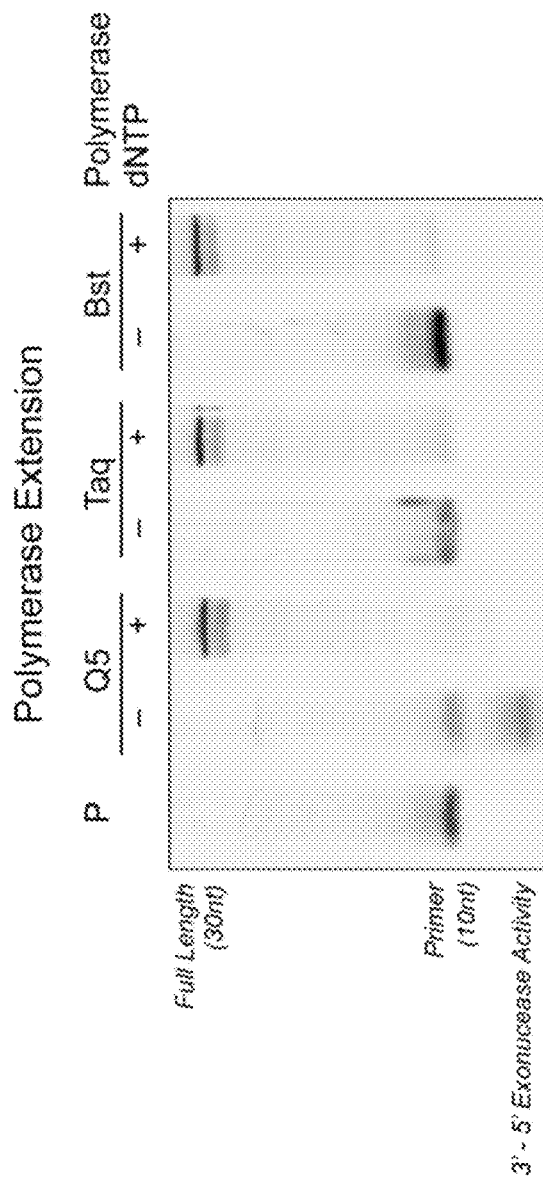
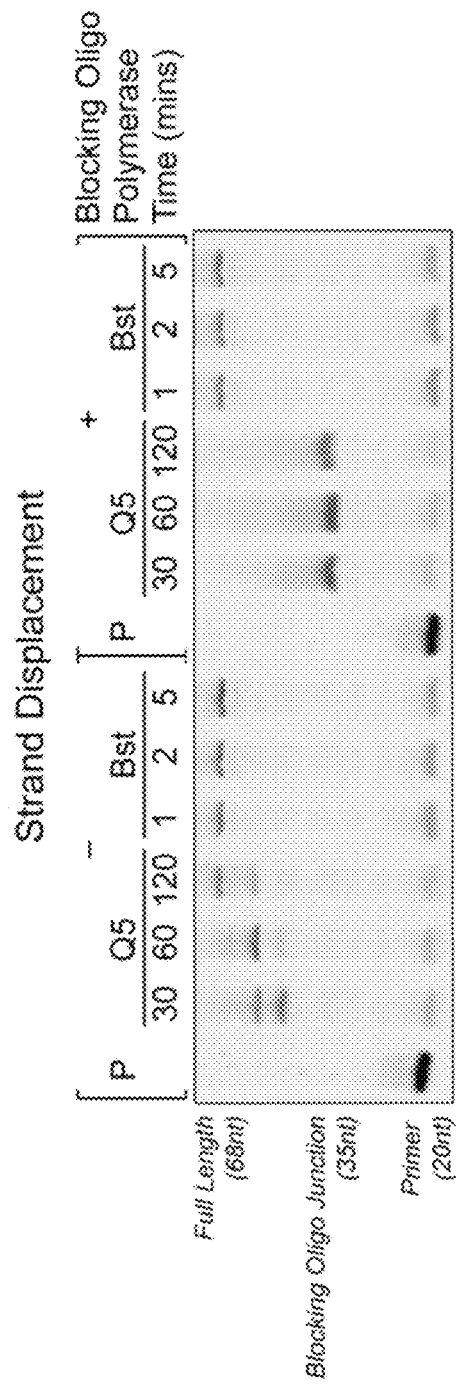
FIG. 14A
FIG. 14B $$N_{Hit,+} = N_+ \cdot (TPR) + N_- \cdot (FPR)$$
True Positives + False Positives $$N_{Hit,-} = N_+ \cdot (FNR) + N_- \cdot (TNR)$$
False Negatives + True Negatives (True Counts: $N_+$, $N_-$; Experimental Counts)

FIG. 17B

| Polymerase Extension | Sequence (5'->3') | Description | Format |
|---|---|---|---|
| ST.1G.HP.44.Cy3 | /5Cy3/SEQ ID NO: 1 | Cy3 Labeled Self-Priming Hairpin Template | Drops/Mock Enrichment |
| ST.1G.44 | SEQ ID NO: 2 | Template | Gel |
| QP09.Iowa | ATG GTT GT/3IABkFQ/ | Quencher Probe | Drops/Mock Enrichment |
| ST.1G.44.Primer.IR800 | /5IRD800/ SEQ ID NO: 3 | IR800 Labeled Primer | Gel |
| QP13.Iowa.BQ | SEQ ID NO: 4/3IABkFQ/ | Incorrect Quencher Sequence for Max Standard | Drops |

| Strand Displacement | Sequence (5'->3') | Description | Format |
|---|---|---|---|
| 3.17.HP.Cy3 | /5Cy3/SEQ ID NO: 5 | Cy3 Labeled Self-Priming Hairpin | Drops |
| 3.17 | SEQ ID NO: 6 | Template | Gel |
| Drops.SDP.317.Iowa | SEQ ID NO: 7/3IABkFQ/ | Blocking Oligo/Quencher | Drops |
| Drops.SDP.317 | SEQ ID NO: 7 | Blocking Oligo | Gel |
| IR800.PBS2 | /5IRD800/SEQ ID NO: 8 | IR800 Labeled Primer | Gel |
| QP13.Iowa.BQ | SEQ ID NO: 9/3IABkFQ/ | Incorrect Quencher Sequence for Max Standard | Drops |

| Restriction Digestion | Sequence (5'->3') | Description | Format |
|---|---|---|---|
| PstI-Template | SEQ ID NO: 10 | Template w/PstI Cut Site | Drops |
| PstI-Template.IR800 | /5IRD800/SEQ ID NO: 10 | IR800 Labeled Template w/PstI Cut Site | Gel |
| PstI-F-ON.Cy3 | /5Cy3/SEQ ID NO: 11 | Cy3 Labeled Probe Complement to PstI Cut Site | Drops/Gel |
| PstI-F-ON.Cy3.Cut.11 | /5Cy3/SEQ ID NO: 12 | Cy3 Labeled Probe/Digestion Product Piece/Max Std. | Drops |
| PstI-Template.Cut.19 | SEQ ID NO: 13 | Digestion Product Piece/Max Std. | Drops |
| PstI-Template.Cut.26 | SEQ ID NO: 14 | Digestion Product Piece/Max Std. | Drops |
| PstI-F-ON.Cut.15 | SEQ ID NO: 15 | Digestion Product Piece/Max Std. | Drops |
| Q-ON.Iowa | SEQ ID NO: 16/3IABkFQ/ | Quencher Probe | Drops/Gel |

| Ligation | Sequence (5'->3') | Description | Format |
|---|---|---|---|
| MB.Ligation.Drops | /5Cy3/ SEQ ID NO: 17/3IABkFQ/ | Molecular Beacon (5'Cy3, 3' Iowa Black FQ) | Drops |
| MB.Ligation | SEQ ID NO: 17 | Non-labeled Molecular Beacon for Gel Analysis | Gel |
| Ligation.N1.6.IR800 | /5IRD800/ACG AGA | IR Labeled Acceptor Sequence | Gel |
| Ligation.N1.6 | ACG AGA | Acceptor Sequence | Gel |
| Ligation.N2.6 | AGT GGA | Donor Sequence Fragment/Negative Control | Drops/Gel |
| Ligation.N2.6.Phos | /5Phos/AGT GGA | 5' Phosphorylated Donor Sequence | Drops/Gel |
| Ligation.N1+N2.12 | SEQ ID NO: 18 | Full Length Product/Max Standard | Drops |

| KOD-D542G Mutation | Sequence (5'->3') | Description |
|---|---|---|
| Tile 1 Fwd | SEQ ID NO: 19 | Polymerase Domain Forward PCR Primer |
| Tile 9 Rvs | SEQ ID NO: 20 | Polymerase Domain Reverse PCR Primer |
| KOD-poldom_381-422 Fwd | SEQ ID NO: 21 | pGDR-11 Vector PCR Forward Primer |
| KOD-poldom_21-65 Rvs | SEQ ID NO: 22 | pGDR-11 Vector PCR Reverse Primer |
| AN-SK-01-Fwd | SEQ ID NO: 23 | Q5 Site-Directed Mutagenesis Forward PCR Primer |
| AN-SK-02-Rvs | SEQ ID NO: 24 | Q5 Site-Directed Mutagenesis Reverse PCR Primer |

FIG. 19

SEQUENCE LISTING

<160> NUMBER OF SEQ ID NOS: 24

<210> SEQ ID NO 1
<211> LENGTH: 44
<212> TYPE: DNA
<213> ORGANISM: Artificial Sequence
<220> FEATURE:
<223> OTHER INFORMATION: Cy3 Labeled Self-Priming Hairpin Template

<400> SEQUENCE: 1
acaaccatac tcttccacat ctgcatacgc gaaagcgtat gcag         44

<210> SEQ ID NO 2
<211> LENGTH: 30
<212> TYPE: DNA
<213> ORGANISM: Artificial Sequence
<220> FEATURE:
<223> OTHER INFORMATION: Template

<400> SEQUENCE: 2
acaaccatac tcttccacat ctgcatacgc                         30

<210> SEQ ID NO 3
<211> LENGTH: 10
<212> TYPE: DNA
<213> ORGANISM: Artificial Sequence
<220> FEATURE:
<223> OTHER INFORMATION: IR800 Labeled Primer

<400> SEQUENCE: 3
gcgtatgcag                                               10

<210> SEQ ID NO 4
<211> LENGTH: 13
<212> TYPE: DNA
<213> ORGANISM: Artificial Sequence
<220> FEATURE:
<223> OTHER INFORMATION: Incorrect Quencher Sequence for Max Standard

<400> SEQUENCE: 4

```
acaaccatac tct                                                            13

<210> SEQ ID NO 5
<211> LENGTH: 82
<212> TYPE: DNA
<213> ORGANISM: Artificial Sequence
<220> FEATURE:
<223> OTHER INFORMATION: Cy3 Labeled Self-Priming Hairpin

<400> SEQUENCE: 5
acaaccattt atgtagcatt tatgaaattt ttaaatcaat ttactattgg ctactgcata        60
cgcgaaagcg tatgcagtag cc                                                 82

<210> SEQ ID NO 6
<211> LENGTH: 68
<212> TYPE: DNA
<213> ORGANISM: Artificial Sequence
<220> FEATURE:
<223> OTHER INFORMATION: Template

<400> SEQUENCE: 6
acaaccattt atgtagcatt tatgaaattt ttaaatcaat ttactattgg ctactgcata        60
cgagtgtc                                                                 68

<210> SEQ ID NO 7
<211> LENGTH: 33
<212> TYPE: DNA
<213> ORGANISM: Artificial Sequence
<220> FEATURE:
<223> OTHER INFORMATION: Blocking Oligo

<400> SEQUENCE: 7
taaaaatttc ataaatgcta cataaatggt tgt                                     33

<210> SEQ ID NO 8
<211> LENGTH: 20
<212> TYPE: DNA
<213> ORGANISM: Artificial Sequence
<220> FEATURE:
<223> OTHER INFORMATION: IR800 Labeled Primer

<400> SEQUENCE: 8
gacactcgta tgcagtagcc                                                    20

<210> SEQ ID NO 9
<211> LENGTH: 13
<212> TYPE: DNA
<213> ORGANISM: Artificial Sequence
<220> FEATURE:
<223> OTHER INFORMATION: Incorrect Quencher Sequence for Max Standard

<400> SEQUENCE: 9
acaaccatac tct                                                            13

<210> SEQ ID NO 10
<211> LENGTH: 45
<212> TYPE: DNA
<213> ORGANISM: Artificial Sequence
<220> FEATURE:
<223> OTHER INFORMATION: Template w/ Pst Cut Site

<400> SEQUENCE: 10
atacgcatac ctgtctgcag tggctaaaag cacacgcacg gagac                        45
```

```
<210> SEQ ID NO 11
<211> LENGTH: 26
<212> TYPE: DNA
<213> ORGANISM: Artificial Sequence
<220> FEATURE:
<223> OTHER INFORMATION: Cy3 Labeled Probe Complement to Pst1 Cut Site

<400> SEQUENCE: 11
tagccactgc agacaggtat gcgtat                                          26

<210> SEQ ID NO 12
<211> LENGTH: 11
<212> TYPE: DNA
<213> ORGANISM: Artificial Sequence
<220> FEATURE:
<223> OTHER INFORMATION: Cy3 Labeled Probe/Digestion Product Piece/Max
      Standard

<400> SEQUENCE: 12
tagccactgc a                                                          11

<210> SEQ ID NO 13
<211> LENGTH: 19
<212> TYPE: DNA
<213> ORGANISM: Artificial Sequence
<220> FEATURE:
<223> OTHER INFORMATION: Digestion Product Piece/Max Standard

<400> SEQUENCE: 13
atacgcatac ctgtctgca                                                  19

<210> SEQ ID NO 14
<211> LENGTH: 26
<212> TYPE: DNA
<213> ORGANISM: Artificial Sequence
<220> FEATURE:
<223> OTHER INFORMATION: Digestion Product Piece/Max Standard

<400> SEQUENCE: 14
gtggctaaaa gcacacgcac ggagac                                          26

<210> SEQ ID NO 15
<211> LENGTH: 15
<212> TYPE: DNA
<213> ORGANISM: Artificial Sequence
<220> FEATURE:
<223> OTHER INFORMATION: Digestion Product Piece/Max Standard

<400> SEQUENCE: 15
gacaggtatg cgtat                                                      15

<210> SEQ ID NO 16
<211> LENGTH: 17
<212> TYPE: DNA
<213> ORGANISM: Artificial Sequence
<220> FEATURE:
<223> OTHER INFORMATION: Quencher Probe

<400> SEQUENCE: 16
gtctccgtgc gtgtgct                                                    17

<210> SEQ ID NO 17
<211> LENGTH: 32
<212> TYPE: DNA
<213> ORGANISM: Artificial Sequence
<220> FEATURE:
```

<223> OTHER INFORMATION: Molecular Beacon

<400> SEQUENCE: 17
cgttgatggt tccacttctc gtgcgttcaa cg          32

<210> SEQ ID NO 18
<211> LENGTH: 12
<212> TYPE: DNA
<213> ORGANISM: Artificial Sequence
<220> FEATURE:
<223> OTHER INFORMATION: Full Length Product/Max Standard

<400> SEQUENCE: 18
acgagaagtg ga          12

<210> SEQ ID NO 19
<211> LENGTH: 22
<212> TYPE: DNA
<213> ORGANISM: Artificial Sequence
<220> FEATURE:
<223> OTHER INFORMATION: Polymerase Domain Forward PCR Primer

<400> SEQUENCE: 19
gaatgagctg gccccgaaca ag          22

<210> SEQ ID NO 20
<211> LENGTH: 28
<212> TYPE: DNA
<213> ORGANISM: Artificial Sequence
<220> FEATURE:
<223> OTHER INFORMATION: Polymerase Domain Reverse PCR Primer

<400> SEQUENCE: 20
ctaattaagc ttggctgcag gtcgactc          28

<210> SEQ ID NO 21
<211> LENGTH: 28
<212> TYPE: DNA
<213> ORGANISM: Artificial Sequence
<220> FEATURE:
<223> OTHER INFORMATION: pGDR-11 Vector PCR Forward Primer

<400> SEQUENCE: 21
gagtcgacct gcagccaagc ttaattag          28

<210> SEQ ID NO 22
<211> LENGTH: 22
<212> TYPE: DNA
<213> ORGANISM: Artificial Sequence
<220> FEATURE:
<223> OTHER INFORMATION: pGDR-11 Vector PCR Reverse Primer

<400> SEQUENCE: 22
cttgttcggg gccagctcat tc          22

<210> SEQ ID NO 23
<211> LENGTH: 27
<212> TYPE: DNA
<213> ORGANISM: Artificial Sequence
<220> FEATURE:
<223> OTHER INFORMATION: Q5 Site-Directed Mutagenesis Forward PCR Primer

<400> SEQUENCE: 23
ctacagcgac accggaggat tttttgc          27

```
<210> SEQ ID NO 24
<211> LENGTH: 35
<212> TYPE: DNA
<213> ORGANISM: Artificial Sequence
<220> FEATURE:
<223> OTHER INFORMATION: Q5 Site-Directed Mutagenesis Reverse PCR Primer

<400> SEQUENCE: 24
attaccttaa agccgtactt ttcctctatc tcctt                              35
```

LASER-INDUCED CONFOCAL MICROSCOPE AND MICROFLUIDIC DEVICE FOR DIELECTROPHORETIC FLUORESCENCE-ACTIVATED DROPLET SORTING

RELATED APPLICATION

This Application is a U.S. National Stage filing under z35 U.S.C. § 371 of International Application No. PCT/US2020/031121, filed on May 1, 2020, which claims priority to U.S. Provisional Patent Application No. 62/842,434 filed on May 2, 2019, which is hereby incorporated by reference in its entirety. Priority is claimed pursuant to 35 U.S.C. §§ 119, 371 and any other applicable statute.

STATEMENT REGARDING FEDERALLY SPONSORED RESEARCH AND DEVELOPMENT

This invention was made with Government support under Grant No. EB024116, GM120491, awarded by the National Institutes of Health. The Government has certain rights in the invention.

TECHNICAL FIELD

The technical field generally relates to devices and methods for analyzing and sorting of emulsions. More specifically, the technical field relates to a laser-induced confocal microscope and microfluidic device for fluorescence-activated droplet (water-in-oil, also referred to as "w/o") sorting.

BACKGROUND

In nature, random mutations provide the genetic diversity required for organisms to evolve by natural selection. However, the process of Darwinian evolution by natural selection occurs on a time scale that is impractical for real-world applications. To overcome this, directed evolution is typically used to engineer proteins, enzymes, and nucleic acid molecules with unnatural activity. In directed evolution, genetic diversity is artificially created by introducing mutations into a gene or family of genes that encode a protein whose function is used as a starting point for evolving a new enzymatic function. Library members are queried en masse for a desired activity using screening techniques that allow functional molecules to be partitioned away from the non-functional pool. This is an iterative process that requires recursive cycles of selection and amplification that are continued until the pool becomes dominated by members that share the desired functional property.

One factor that limits the impact of directed evolution is library size, which can quickly become large enough to overwhelm most selection strategies, as each position can encode up to 20 different amino acids. Consequently, parameters for library screening have become an important component of the directed evolution process. The recent miniaturization of directed evolution experiments into aqueous compartments with cell-like dimensions enables the rapid screening of very large library repertoires by reducing sample volumes to the picoliter-to-femtoliter scale. The microcompartments mimic natural cells by providing a genotype-phenotype link in which the encoding DNA and translated proteins are localized in a compartment with a defined boundary. The simplest approach to creating water-in-oil (w/o) emulsions involves the bulk mixing of aqueous and organic (oil) phases with vigorous stirring or agitation. However, this method produces polydisperse droplets with no control over droplet size and inefficient encapsulation makes it difficult to maintain a genotype-phenotype linkage. Given the cubic dependence of volume on diameter, polydisperse droplets cannot be partitioned by optical sorting due to massive differences in enzyme-substrate concentration.

With the advent of droplet microfluidics, uniform w/o emulsions can be produced at rates exceeding 30 kHz (30,000 droplets per second). In most cases, library members are delivered by encapsulating E. coli cells expressing the enzyme of interest in a water-in-oil ("w/o") droplet according to a Poisson distribution, such that each droplet contains one or no E. coli. Although this approach has been used to evolve enzymes with simple functions, recent advances in fluorescent dyes have made it possible to evolve enzymes that follow complicated reaction pathways. Polymerases are one example of an exceptionally challenging class of enzymes aimed at directed evolution, as each nucleotide incorporation step involves multiple conformational changes and transient intermolecular interactions. To evolve polymerases with new functional properties, a technique has been developed called 'droplet-based optical polymerase sorting' (DrOPS) that uses a fluorescent sensor to monitor polymerase activity inside w/o droplets that are prepared using microfluidics. As an example, DrOPS was used to evolve a polymerase that could synthesize threose nucleic acid (TNA) polymers on DNA templates. Achieving this goal required converting single w/o droplets into water-in-oil-in-water (w/o/w) double emulsion droplets that were compatible with the aqueous environment required for fluorescent activated cell sorting (FACS). Although successful, the requirement for FACS-based sorting is a tedious and expensive process that suffers from reduced partitioning efficiency as w/o/w droplets are significantly less stable than single w/o droplets. Thus, a significant need exists for new low-cost instruments that can rapidly sort single droplet compartments based on fluorescence.

Typically, optical screening assays that take advantage of microfluidically produced w/o emulsions require a separate instrument for analysis and sorting of the droplet population. While some commercial flow cytometers exist that are capable of analyzing w/o emulsions (e.g., QX200™ Droplet Reader, Bio-Rad, RainDrop Sense, RainDance Technologies), these instruments are designed for digital PCR and only work with a narrow set of reagents and droplet sizes. However, even more importantly, none of the commercial instruments available are capable of sorting w/o droplets based on the properties of an optical sensor. Thus, researchers interested in analyzing or sorting fluorescent droplets must convert their single droplets into double emulsion w/o/w droplets to be compatible with most flow cytometers and FACS instruments. Unfortunately, FACS-based approaches can be prohibitively expensive for many labs and use a sorting step that is designed for eukaryotic cells, which are significantly larger and more robust than most w/o/w droplets. In addition, double emulsions, like w/o/w emulsions, are less stable than w/o single emulsions, which can lead to sample loss and contamination. This problem is exacerbated by the fact that FACS instruments prohibit the use of surfactants, which are needed to stabilize w/o/w emulsions, especially at elevated temperatures needed for incubation and cell lysis used in many directed evolution screening experiments.

SUMMARY

In one embodiment, the invention described herein is a fluorescent-activated droplet sorting system (FADS system).

The FADS system includes a laser-induced confocal microscope and associated microfluidic sorting device for ultra-high throughput microfluidics-based fluorescence-activated droplet sorter. The FADS system is configured to sort microfluidically generated, micrometer-sized (e.g., ~20 µm) w/o droplet emulsions containing a fluorescent activity assay and a single cell, such as E. coli bacterium (or other prokaryotic cell), expressing the enzyme of interest, but could also be compatible with an invitro transcription-translation system. While the embodiments and examples disclosed herein utilize E. coli cells, the present invention is not limited to E. coli cells, but instead may be used with any suitable cells or even other protein expression modalities. These microcompartments mimic natural cells by providing a genotype-phenotype linkage in which the encoding DNA and translated proteins are co-localized within a defined boundary. By utilizing droplet microfluidic technology, highly monodisperse w/o emulsions can be produced with very tight control of material encapsulation and screened at rates approaching 30 kHz, allowing millions of variants to be assessed within a few hours. Coupling a fluorescent signal to enzymatic activity also provides for a more general approach to enzyme evolution, requiring only the development of a suitable substrate or sensor for the enzyme of interest.

Microfluidic-based optical cell sorting provides many advantages over traditional selection strategies. First, optical screening assays are highly versatile and can be tuned to a wide range of wavelengths and enzymatic reactions based on the fluorescent properties of the optical sensor or fluorophore. Furthermore, droplet microfluidic strategies are amenable to FADS, which circumvents the need for a costly FACS instrument or a second emulsification step required to create w/o/w emulsions. Ultimately, FADS offer a high throughput, low cost solution to protein engineering by providing the capacity to screen $10^8$ droplets per hour, which rivals the speed of most commercial FACS instruments. A custom FADS instrument would accelerate the pace of research by providing a dedicated instrument that could be used to evolve any enzyme whose function could be linked to a fluorescent reporter. By comparison, most FACS instruments are housed in a pay-per-use facility, where users must compete for time on a shared instrument. In the context of droplet microfluidics, this poses certain challenges, as the logistics of droplet production are not always synced with instrument availability.

The FADS system can streamline droplet microfluidic based directed evolution processes by eliminating the need for w/o/w double emulsion compartments that are required for aqueous based FACS sorting and can be produced at a fraction of the cost of a traditional FACS instrument ($50,000 compared to $500,000 for FACS). Furthermore, current droplet generators can produce uniform microdroplets (~20 µm diameter) at a rate of 30 kHz, providing the capacity to produce $10^8$ million droplets per hour. The FADS system can also sort individual droplets with equivalent rates, which compares favorably with existing FACS capabilities (max. 50 kHz, typically operated at 0.5-1 kHz) and exceeds existing droplet sorting systems (1-2 kHz).

To achieve sorting rates on par with conventional FACS, in certain embodiments, the microfluidic sorting device utilizes an elevated divider at the sorting junction in combination with a dielectrophoretic (DEP) force that pulls a fluorescent drop into the collection channel, as described further herein. Traditional microfluidic sorting systems utilize a full height, hard-wall divider at the sorting fork that leads to the waste or collection channels. At the high flow rates needed for ultra-fast sorting, the hard wall divider present in conventional sorting devices induces droplet breakup. However, certain embodiments of the disclosed microfluidic sorting device enable ultrafast partitioning in a FADS system that maintains droplet integrity where sorting speed is no longer limited by the geometry of the sorting system. This configuration assists in allowing the disclosed FADS system to be used in a general way to rapidly evolve enzymes with new functional properties.

In one embodiment, a FADS device is disclosed that can be used for evolving enzymes that can synthesize and modify XNAs (nucleic acid polymers with unnatural sugar-phosphate backbones). (See, Pinheiro, V. B.; Taylor, A. I.; Cozens, C.; Abramov, M.; Renders, M.; Zhang, S.; Chaput, J. C.; Wengel, J.; Peak-Chew, S. Y.; McLaughlin, S. H.; Herdewijn, P.; Holliger, P. Science 2012, 336, 341-344). All references cited herein are hereby incorporated by reference in their entirety. Two different methods for producing single emulsion droplets at 30 kHz are disclosed for encapsulating individual E. coli cells, which are used as a vehicle for protein expression and delivery.

The present disclosure describes several non-limiting examples of thermal, chemical, and enzymatic strategies for releasing recombinant enzyme into the surrounding compartment and also demonstrates the use of four different, non-limiting types of fluorescent sensors that are responsive to enzymes that function with polymerase-mediated primer-extension, polymerase-mediated primer-extension with strand displacement, ligase, and restriction endonuclease activities. The disclosed examples also show efficient droplet sorting at ~2 kHz with low false-positive and false-negative values. In addition, the examples demonstrate the power of the FADS system in a mock screen, which provided an enrichment value of >3000-fold from a doped library containing one active enzyme into a background of 6447 inactive enzyme variants. Thus, the FADS system and associated fluorescent sensors make it possible to discover new enzyme variants that can synthesize and manipulate XNA in a manner analogous to natural enzymes to drive new applications in biotechnology and healthcare.

Accordingly, one embodiment of the present invention is directed to a FADS system for sorting droplets. The FADS system includes a microfluidic chip (which may comprise, or consist of, a microfluidic substrate) having various channels formed therein for flowing therethrough w/o droplets for sorting. The microfluid chip has a droplet sorting channel coupled at an upstream location to a droplet inlet channel. The droplet sorting channel is coupled at a downstream location to a sorting junction. The sorting junction bifurcates the droplet sorting channel into one path that leads to a waste channel and one path that leads to a collection channel.

The FAD system also includes an optical interrogation device configured to (a) illuminate each droplet as it passes through the sorting channel with excitation light from an excitation light source, (b) detect emitted fluorescent light from each droplet, and (c) generate a respective output signal corresponding to the fluorescence of each respective droplet. A diverter is disposed in the microfluidic chip upstream of the sorting channel. The diverter is configured to be actuated to selectively direct each droplet into one of the collection channel or the waste channel. The diverter is operably coupled to a controller which controls the actuation of the diverter.

The FADS system also has a controller operably coupled to the diverter. The controller is configured to receive the output signal for each droplet from the optical interrogation device, and to control the actuation of the diverter based on the output signal for each droplet to selectively direct each droplet into either the collection channel or the waste channel. For example, the diverter may be configured to be actuated to direct a droplet to the collection channel, and to be de-actuated to allow a droplet to continue on its path to the waste channel, or vice versa.

In another aspect, the microfluidic chip may further comprise an oil bias channel coupled to the droplet sorting channel at the upstream location of the droplet sorting channel. The oil bias channel is configured to provide a flow of oil which biases the droplets toward either the collection channel side of the droplet sorting channel or the waste channel side of the droplet sorting channel. For example, if non-fluorescent droplets by default (i.e., without actuation of the diverter) are to be directed to the waste channel, then the oil bias channel biases the non-fluorescent droplets toward the waste channel, thereby preventing unwanted migration of the fluorescing droplets into the collection channel.

In another aspect of the FADS system, the diverter comprises an electrode which is configured to exert a dielectrophoretic (DEP) force on the droplets when actuated by the controller. Accordingly, the DEP force of the actuated electrode directs the droplets into either the collection channel or the waste channel. For instance, if the FADS system is configured to actuate the electrode to direct a droplet into the collection channel, then electrode is configured to exert the DEP force on the droplet which forces the droplet into the collection channel. In such case, when the electrode is not actuated, it does not exert a force on the droplet such that the droplet continues on its path into the waste channel (this may be assisted by the oil bias channel biasing the droplet toward the waste channel).

In another aspect, the electrode may comprise an electrically conductive material disposed in the chip or substrate. For instance, the electrode may comprise a salt solution.

In yet another aspect, the controller is a programmable controller comprising a field programmable gate array (FPGA) configured to receive the output signals from the optical interrogation device and actuate a high voltage amplifier to energize the electrode to exert a DEP force on the droplet to direct the droplets into the collection channel.

In still another aspect, the microfluidic chip further comprises first and second oil inlet channels that intersect at the droplet inlet channel. The first and second oil inlet channels form a flow focusing junction which spaces (with an objective of substantially even spacing) the droplets in the droplet inlet channel before entering the droplet sorting channel.

In another aspect, the microfluidic chip further comprises a droplet reservoir upstream of, and in fluid communication with, the droplet inlet channel. The droplet reservoir receives a population of w/o droplets to be sorted. The droplets in the droplet reservoir flow into the droplet inlet channel.

In another aspect, the excitation light source comprises one or more lasers. The one or more lasers includes lasers which each emit light at a wavelength which causes a fluorophore of interest to fluoresce. Each of the laser may emit light at a different wavelength for detecting different fluorophores.

In yet another aspect, the optical interrogation device may utilize a photomultiplier tube (PMT) for detecting emitted fluorescent light from a fluorophore in the droplets. In another feature, the optical interrogation device may utilize a plurality of PMTs a plurality of PMTs, wherein each PMT is responsive to a different wavelength or wavelength range from the other PMTs. This allows the optical interrogation device to detect emitted fluorescent light from different fluorophores and/or different excitation light sources.

In another aspect, the microfluidic chip further comprises an elevated divider interposed between the waste channel and the collection channel at the sorting junction. The elevated divider extends downstream of the sorting junction for a divider length such that the elevated divider separates only an upper portion of the waste channel and the collection channel for the divider length and leaves a lower portion of the waste channel and the collection channel fluidly connected by a dead-end channel below the elevated divider. Downstream of the elevated divider and the dead-end channel, a border wall completely separates the waste channel and the collection channel. The elevated divider and dead-end reduce the shear on the droplets, especially at high flow rates, avoiding breakup or damage to the droplets and allowing them to move through the sorting junction into the collection channel intact. In another aspect, the elevated divider comprises a facing surface disposed above the dead-end channel which is located at the sorting junction.

In yet another aspect, the border wall between the waste channel and collection channel may include a plurality of pressure equilibration channels along a portion of the border wall.

In still another aspect, the controller is configured to actuate the diverter based on a threshold corresponding to the measured fluorescent at a particular wavelength or wavelength range. For instance, the controller may be configured to actuate the diverter when the measured fluorescence is above or below a specified threshold. Furthermore, the measured fluorescence may be measured for a defined residence time of each droplet.

In yet another aspect, the FDAS system may further include a high-speed camera configured to capture images of droplets passing through the droplet sorting channel. The system may also have an illumination light configured to illuminate droplets passing through the droplet sorting channel for imaging by the high-speed camera. The illumination light may emit a light which does interfere with the excitation light and the emitted fluorescent light. For example, the illumination light may emit light at a wavelength which is different than the wavelength of the excitation light and emitted fluorescence light.

In another aspect of the FDAS system, the microfluidic chip may be produced by molding PDMS on a silicon wafer mold formed by a photolithographic process. Another embodiment of the present invention is directed to a method of using the FDAS system for sorting droplets. The method comprises flowing a plurality of droplets into the droplet inlet channel. The droplets passing through the sorting channel with excitation light are illuminated from the excitation light source and emitted fluorescent light from the droplets is detected using the optical interrogation device. A respective output signal is generated corresponding to the detected fluorescence of each droplet. Then, each of the droplets is directed into one of the collection channel or the waste channel by actuating the diverter based on the respective output signal for each droplet.

In another aspect of the method, the droplets contain a single cell or no cell therein. For instance, the cell may comprise a eukaryotic cell or a prokaryotic cell. In still another aspect, the droplets also include a cell lysing agent.

In another aspect, the method may further include comparing the detected emitted fluorescent light to a threshold intensity, and directing the droplets into one of the collection channel or waste channel by actuating the diverter based on the comparison of the detected emitted fluorescent light to the threshold intensity. For example, the controller may be configured to actuate the diverter when the measured fluorescence is above or below a specified threshold, or within a wavelength range. Furthermore, the measured fluorescence may be measured for a defined residence time of each droplet.

In still another aspect, the step of determining whether the detected emitted fluorescent light from each droplet includes detecting fluorescence emission at multiple distinct wavelength ranges, and directing droplets determined to have detected emitted fluorescent light that includes fluorescence emission at multiple distinct wavelength ranges into one of the collection channel or waste channel by actuating the diverter.

In yet another aspect, the method includes determining a ratio of intensity values at multiple distinct wavelength values from the detected emitted fluorescent light from each droplet, comparing the ratio of intensity values to a threshold ratio value, and directing droplets into one of the collection channel or waste channel by actuating the diverter based on the comparison of the ratio of intensity values to the threshold value.

In another aspect of the method, a least some of the droplets contain a first fluorophore and a second fluorophore, the optical interrogation device detects emitted fluorescent light from the second fluorophore and generates the respective output signal corresponding to the detected fluorescence of the second fluorophore, and the controller actuates the diverter based on the respective output signal to selectively direct the droplets containing the second fluorophore into one of the collection channel or waste channel.

In second embodiment of a FADS system for sorting droplets, the FADS system includes a microfluidic chip having a droplet sorting channel coupled at an upstream location to a droplet inlet channel. The droplet sorting channel is coupled at a downstream location to a sorting junction which leads to a waste channel and a collection channel. The FADS system includes an optical interrogation device configured to illuminate the droplets passing through the sorting channel with excitation light from an excitation light source and detect emitted fluorescent light and generating an output signal correlated to the fluorescence of the droplets. An electrode (the diverter in this embodiment) is disposed in the microfluidic chip and is coupled to a high voltage amplifier. The FADS system includes a programmable controller comprising a field programmable gate array (FPGA) (the controller in this embodiment) configured to receive the output signals from the optical interrogation device and trigger the high voltage amplifier to direct the droplets into the collection channel.

In another aspect of the second embodiment of a FADS system, the microfluidic chip further includes an oil bias channel. The oil bias channel is configured to provide a flow of oil which biases the droplets toward either the collection channel side of the droplet sorting channel or the waste channel side of the droplet sorting channel.

In another aspect, the system may further include first and second oil inlet channels that intersect at the droplet inlet channel. The oil inlet channels may be formed in the microfluidic chip. The first and second oil inlet channels form a flow focusing junction which spaces (with an objective of substantially even spacing) the droplets in the droplet inlet channel before entering the droplet sorting channel.

In another aspect, the emitted fluorescent light may be detected or captured by one or more photomultiplier tubes (PMTs).

In another aspect, the second embodiment of a FADS system may further include plurality of PMTs, each PMT responsive to a particular wavelength or wavelength range.

In yet another aspect, the electrode comprises an electrically conductive material disposed in the chip or substrate. In another feature, the electrode comprises a salt solution.

In still another aspect, an elevated divider may be interposed between the waste channel and the collection channel at a bifurcation. In another aspect, the elevated divide may comprise a facing surface disposed above a dead-end channel located at the bifurcation.

In another aspect, the programmable controller may contain executable software thereon which programs the programmable to trigger the high voltage amplifier based on a threshold corresponding to the measured fluorescent intensity and residence time of each droplet.

In still another feature, the waste channel and collection channel may include a plurality of pressure equilibration channels along a portion thereof.

In yet another aspect, the FADS system may include a high-speed camera configured to capture images of droplets passing through the droplet sorting channel.

In another embodiment is directed to a method of using the second embodiment of a FADS system described above. The method includes flowing a collection of droplets into the droplet inlet channel, at least some of the droplets containing a fluorophore; illuminating the droplets passing through the sorting channel with excitation light from the excitation light source and capturing emitted fluorescent light from the droplets containing the fluorophore; moving the droplets containing the fluorophore into the collection channel by energizing the electrode; and collecting the droplets from the collection channel.

In another aspect of the method, the droplets may contain a single cell or no cell therein. In yet another aspect, the cell may comprise a eukaryotic or prokaryotic cell. In another aspect, the droplets may further comprise a cell lysing agent.

In another aspect, the method may pass between about 2,000 and 20,000 droplets per second through the sorting channel.

In yet another aspect, the at least some of the droplets contain a first fluorophore and second fluorophore and wherein the droplets containing the second fluorophore are moved into the collection channel by energizing the electrode.

In another aspect, a plurality of droplets that exhibit fluorescence emission above a threshold intensity level may be moved into the collection channel by energizing the electrode. In another aspect, a plurality of droplets that exhibit fluorescence emission below a threshold intensity level may be moved into the collection channel by energizing the electrode. In still another aspect, the droplets exhibiting fluorescence emission within a certain wavelength range may be moved into the collection channel by energizing the electrode.

In another aspect, droplets may be sorted based on multiple fluorescent channels (e.g., multiple colors). For instance, droplets exhibiting fluorescence emission at multiple distinct wavelength ranges may be moved into the collection channel by energizing the electrode, and/or droplets exhibiting fluorescence emission at the multiple distinct wavelength ranges and having a ratio of intensity values at those multiple distinct wavelength ranges that exceed a threshold value may be moved into the collection channel by energizing the electrode. In yet another aspect, the droplets exhibiting fluorescence emission at the multiple distinct wavelength ranges and have a ratio of intensity values at those multiple distinct wavelength ranges that are below a threshold value are moved into the collection channel by energizing the electrode.

In another aspect, droplets that contain fluorescent molecules (i.e., fluorophore or "label" or "marker") may, in some embodiments, contain a quencher moiety, or the like, that may attenuate the fluorescence emission from the droplet.

BRIEF DESCRIPTION OF THE DRAWINGS

FIG. 2A is a schematic illustration of the microfluidic sorting chip of the FADS system of FIG. 1, according to one embodiment.

FIG. 2B is an enlarged view of the droplet reservoir, droplet inlet channel, and oil inlet channels of the microfluidic sorting chip of FIG. 2A, showing the regular spacing of injected droplets entering the droplet inlet channel prior to the sorting junction.

FIG. 2C is an enlarged view of the droplet sorting channel, oil bias channel, and sorting junction of the microfluidic sorting chip of FIG. 2A showing positive fluorescent droplets (transparent) being directed to the collection channel and negative droplets (opaque) flowing into the waste channel.

FIG. 2D is an enlarged view of a portion of the microfluidic sorting chip of FIG. 2A showing the pressure equilibration channels through the border wall between the collection channel and waste channel.

FIG. 3B shows the pre-sorted droplet population. FIG. 3C shows the positively sorted droplets. FIG. 3D shows the negatively sorted droplets. Negative droplets contained an opaque green dye and positive droplets contained 1 µM Cy3-labeled DNA. The scale bars in FIGS. 3B-3D are 100 µm.

FIG. 5A shows results of testing using recombinant enzymes that catalyze polymerase extension. FIG. 5B shows results of testing using strand displacement. FIG. 5C shows results of testing using restriction enzyme digestion. FIG. 5D shows results of testing using DNA ligation activities. The data is presented as the distribution of peak droplet fluorescence for each population. The peak value fluorescence describes the maximum fluorescence reading of a droplet as it passes in front of the laser line.

FIG. 9A illustrates the production of an SU-8 master mold that will form the channel reliefs in a PDMS mold. Multiple layers can be added sequentially to create channel geometries with different heights. FIG. 9B illustrates the production of a PDMS chip from an SU-8 master mold.

FIG. 11A shows Poisson probability distributions calculated for different $E.$ $coli$ occupancy levels in uniform droplets. A Poisson distribution was used to model the proportion of droplets $p(\lambda,k)$ containing a given number of cells (k) at four different occupancy levels ($\lambda$), a parameter describing the average number of cells per droplet. The $OD_{600}$ of the pre-encapsulated $E.$ $coli$ solution can be used to predict the value of $\lambda$ (and vice-versa), which is critical for experiments that target a specific occupancy level. An OD600 of 0.05 and 0.5 were calculated to result in values of $\lambda$ of 0.1, and 1.0, respectively, and were validated experimentally. FIG. 11B shows fluorescent images showing the difference in cellular droplet occupancy of green fluorescent protein ("GFP") expressing $E.$ $coli$ at $OD_{600}=0.05$ and $OD_{600}=0.5$. Scale bars in FIG. 11B are 50 µm.

FIG. 13A shows results for recombinant enzymes co-encapsulated in droplets with fluorescent sensors along with the appropriate substrates for detecting polymerase extension. FIG. 13B shows results for recombinant enzymes co-encapsulated in droplets with fluorescent sensors along with the appropriate substrates for detecting strand displacement. FIG. 13C shows results for recombinant enzymes co-encapsulated in droplets with fluorescent sensors along with the appropriate substrates for detecting restriction digestion. FIG. 13D shows results for recombinant enzymes co-encapsulated in droplets with fluorescent sensors along with the appropriate substrates for detecting DNA ligation. The bar charts summarize the average peak droplet fluorescence for each population (right). Error bars represent the distribution of peak fluorescence values within the population. Fluorescent microscopic images of each droplet population are shown to the left. The scale bars in FIGS. 13A-13D are 50 µm.

FIGS. 14A-14D illustrate the validation of optical sensors in bulk solution. FIG. 14A illustrates the validation of optical sensors in bulk solution for a polymerase extension assay. Primer extension analysis on the polymerase extension sensor using Q5 (1 hour), Taq (1 hour), and Bst (5 minutes) polymerases in the presence and absence of dNTP substrates at 55° C. FIG. 14B illustrates the validation of optical sensors in bulk solution for a strand displacement assay. Time course at 37° C. on the strand displacement sensor with Q5 and Bst polymerases in the presence and absence of a 33 nt blocking oligo. FIG. 14C illustrates the validation of optical sensors in bulk solution for a restriction digestion assay. Pst 1 restriction site sensor incubated at 37° C. for 18 hours with Pst 1, and a non-specific restriction enzyme, Not 1. FIG. 14D illustrates the validation of optical sensors in bulk solution for a DNA ligation assay. Ligation of two 6 nt oligos in the presence of the complementary molecular beacon sensor at three temperatures for 1 hour.

FIG. 17B is a contingency table used to derive equations to calculate true hit and true non-hit values from measured hit and measured non-hit values given known TPR, FPR, FNR, and TNR.

FIG. 19 is table of sequences, descriptions and formats for various optical sensors (reporters) and other reagents used in the Examples herein.

DETAILED DESCRIPTION OF ILLUSTRATED EMBODIMENTS

Figure 1A:
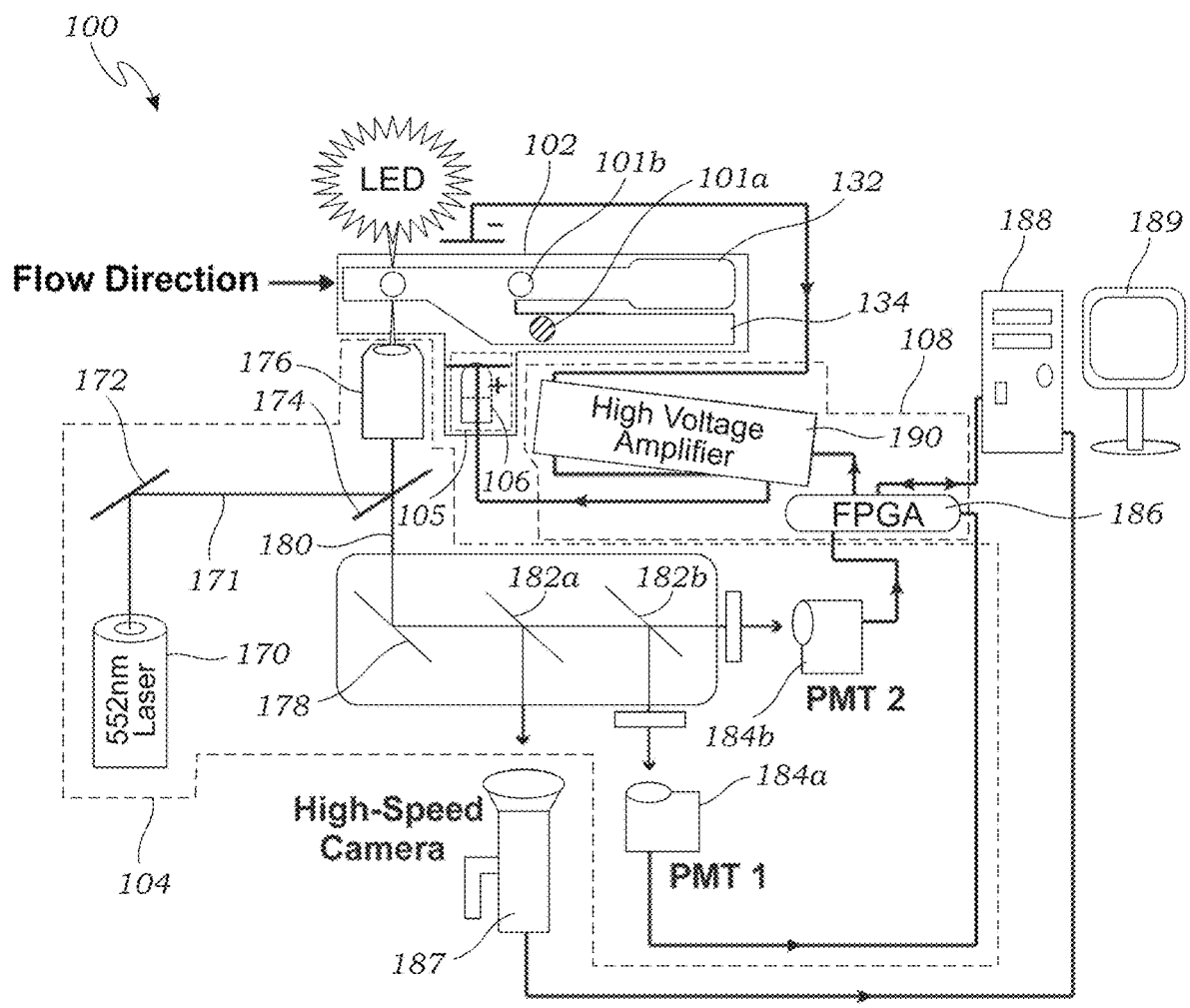
FIG. 1A illustrates a schematic block diagram of a FADS system, according to one embodiment.
Figure 1B:
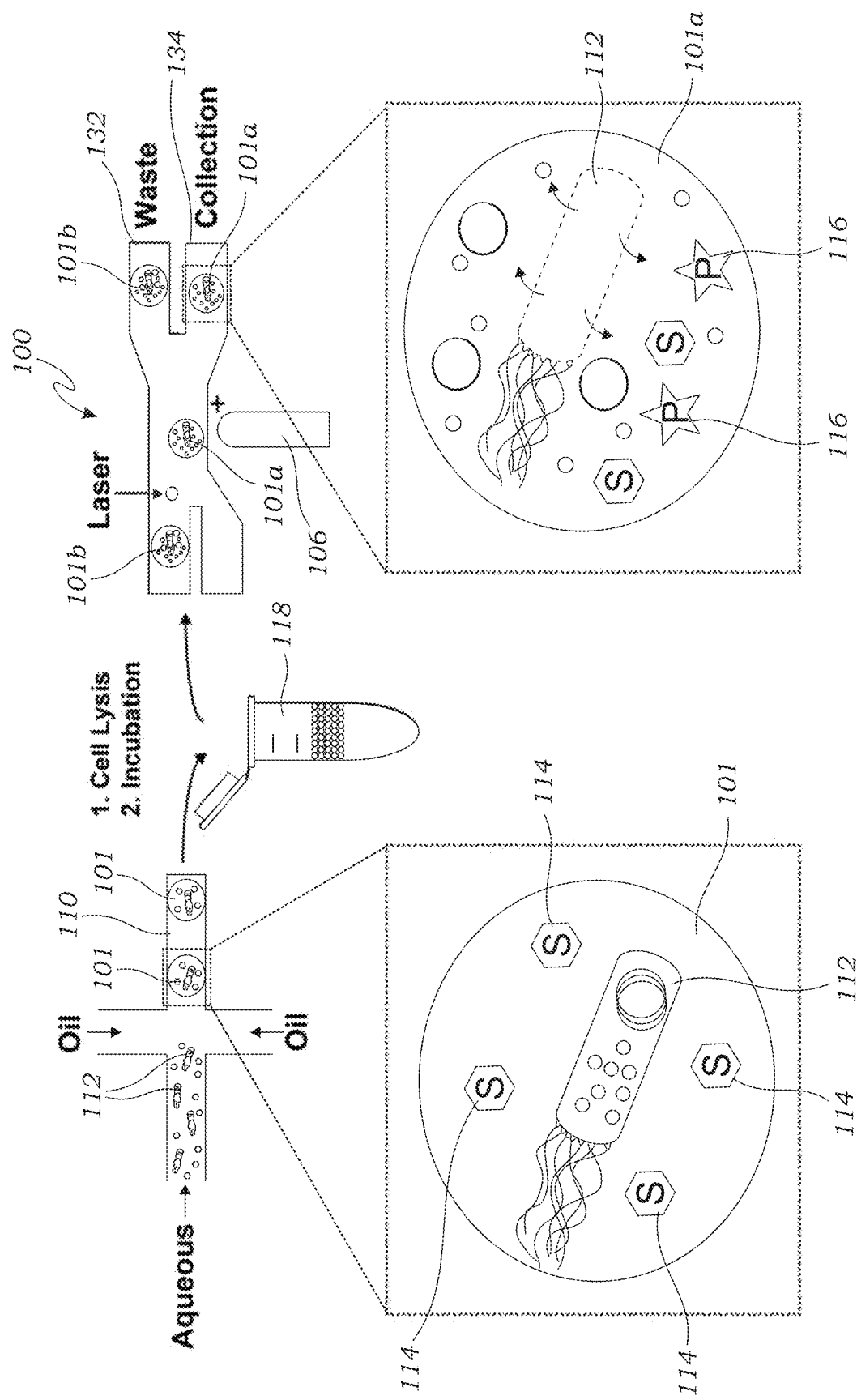
FIG. 1B illustrates a schematic diagram of a complete droplet sorting process using the FADS system of FIG. 1A, including droplet formation to form an encapsulated cell, cell lysis and incubation, and droplet sorting using the FADS system of FIG. 1A, according to one embodiment.

Referring to FIGS. 1A and 1B, a FADS system 100 according to one embodiment is illustrated. The FADS system 100 includes a microfluidic sorting chip 102 having a plurality of fluid channels formed therein for storing, flowing, and directing w/o droplets 101 (also referred to as droplets 101*a*, 101*b*) for sorting. The FAD system 100 also includes an optical interrogation module 104 configured to (a) illuminate each droplet as it passes through the sorting channel with excitation light from an excitation light source, (b) detect emitted fluorescent light from each droplet, and (c) generate a respective output signal corresponding to the fluorescence of each respective droplet. The FADS system 100 has a diverter 105 disposed in the microfluidic sorting chip 102. In the illustrated embodiment, the diverter 105 is an electrode 106. The FADS system 100 also has a programmable controller 108 operably coupled to the optical interrogation module 104 and the diverter 106. The controller 108 is configured to receive the output signal for each droplet from the optical interrogation module 104, and to control the actuation of the diverter 105 based on the output signal for each droplet to selectively direct each droplet within the microfluidic sorting chip 102.

FIG. 1B shows a schematic diagram of a complete droplet sorting process using the FADS system 100 of FIG. 1A. The complete droplet sorting process includes droplet formation to form an encapsulated cell, cell lysis and incubation, and droplet sorting using the FADS system 100. A droplet formation chip 110 may be used to form the w/o droplets 101 to be sorted by the FADS system 100. The droplet formation chip 110 forms w/o droplets 101 which each include a cell 112 having a gene from a library of genes encoding a specific protein or enzyme, along with a fluorescent activity assay (and corresponding substrates) 114, encapsulated in an aqueous droplet 101. The fluorescent assay 114 utilizes a fluorescent reporter 116 (e.g., label, marker or other fluorophore) to indicate the result of the assay. The w/o droplets 101 are then lysed and incubated in an incubation module 118. Lysis (e.g., chemical, enzymatic, or heat lysis) of the encapsulated cells releases the expressed proteins from the cell host (e.g., *E. coli* cell). The encapsulated cells are incubated to allow the expressed proteins to react with the substrates in the fluorescent assay 114. After the lysing and incubation, the droplets 101 are injected into FADS system 100 for sorting, for instance, to enrich for members with a desired functional activity.

Figure 10:
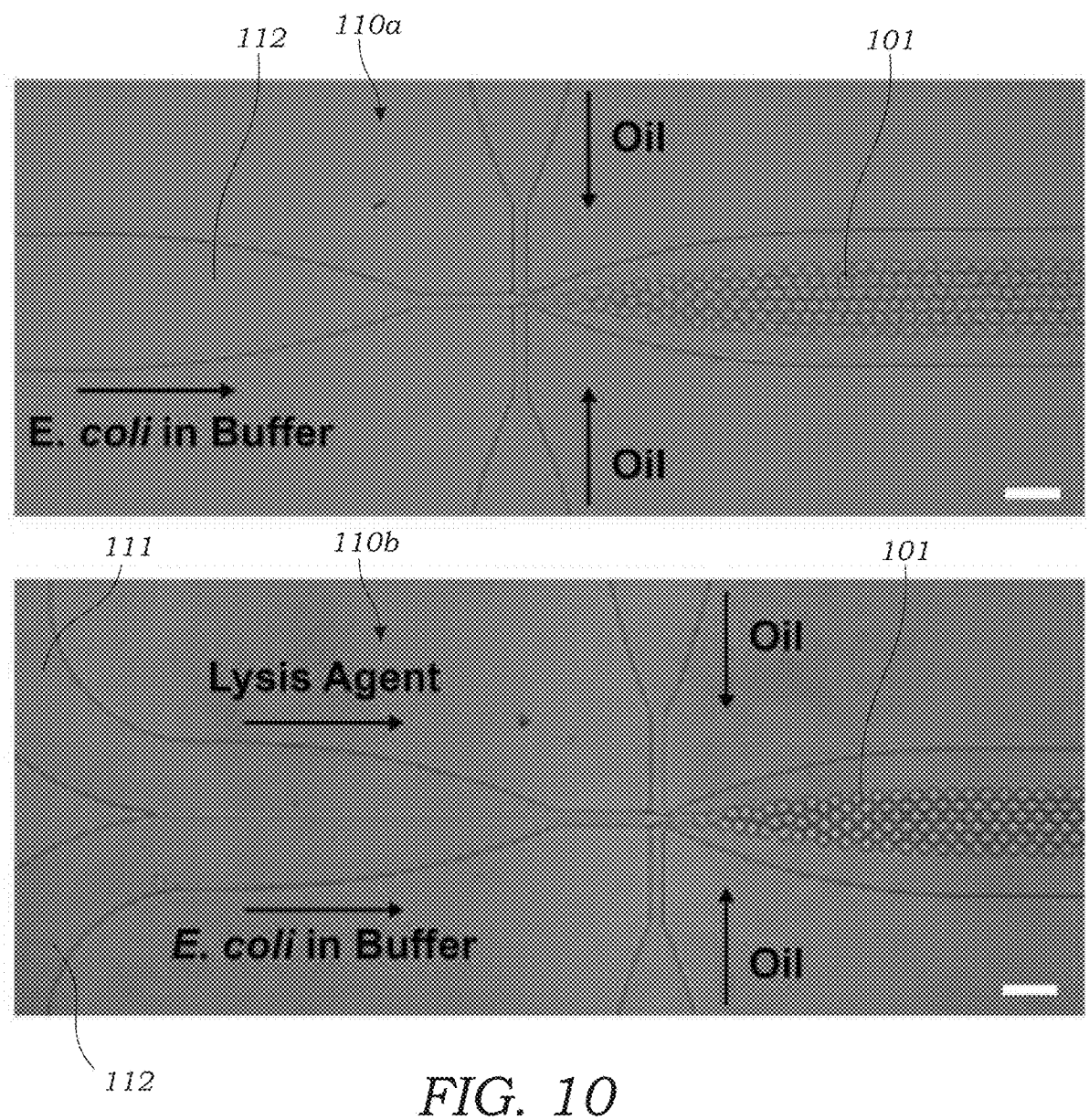
FIG. 10 illustrates two different w/o droplet generation devices. The scale bars in FIG. 10 are 75 µm.

Referring to FIG. 10, two different devices and corresponding methods of forming w/o droplets 101 are illustrated. The droplet formation chip 110*a* generates w/o droplets 101 from a single aqueous stream of cells 112 (e.g., *E. coli* cells) which intersects with two oil channels at a flow focusing junction. The single-stream droplet formation chip 110*a* is compatible with a thermal lysis process in which the droplets 101 are lysed thermally prior to being sorted in the microfluidic chip 102. The droplet formation chip 110*b* generates w/o droplets 101 using a double co-flowing aqueous stream. A first aqueous stream of cells 112 intersects with a second aqueous stream of lysis reagents. The combined first and second aqueous streams intersect downstream with two oil channels at a flow focusing junction. The droplet formation chip 110*b* allows delivery of the lysis reagents separate from the population of cells 112 for encapsulation into a w/o droplet 101. The droplet formation chips 110*a*, 110*b* are capable of producing single emulsion w/o droplets 101 at 30 droplets per second (30 KHz) or greater.

Referring to FIGS. 2A-2D, an exemplary microfluidic sorting chip 102 is illustrated. The microfluidic sorting chip 102 may be formed of a substrate, such as PDMS, using a photolithographic silicon process, as described below. The microfluidic sorting chip 102 includes an input droplet reservoir 120 at the most upstream end of the droplet sorting flow path on the chip 102. The input droplet reservoir 120 receives a population of unsorted droplets 101 after they have been prepared formed, lysed and incubated, as described herein. A droplet inlet channel 122 is coupled to, and in fluid communication with, the input droplet reservoir 120 at a downstream location to the input droplet reservoir 120.

The microfluidic sorting chip 102 has a first oil inlet channel 124*a* and a second oil inlet channel 124*b* which intersect, and are in fluid communication with, the droplet inlet channel 122. The first oil inlet channel 124*a* intersects the droplet inlet channel 122 from a first side of the droplet inlet channel 122, and the second oil inlet channel 124*b* intersects the droplet inlet channel 122 from a second side, opposite the first side, of the droplet inlet channel 122. As best shown in FIG. 2B, as the droplets 101 exit the input droplet reservoir 120 and enter the droplet inlet channel 122, the droplets 101 are relatively close together, and unevenly spaced. The oil inlet channels 124*a*, 124*b* form a flow focusing junction 126 which creates spaces between the droplets 101 as they flow downstream through the droplet inlet channel 122. The flow focusing junction 126 may also substantially evenly spaces the droplets flowing through the droplet inlet channel 122.

The microfluidic sorting chip 102 also includes a droplet sorting channel 128 coupled to, and in fluid communication with, the downstream end of the droplet inlet channel 122. In other words, the droplet sorting channel 128 is coupled at an upstream location of the droplet sorting channel 128 to the droplet inlet channel 122. An oil bias channel 140 is also coupled to, and in fluid communication with, the downstream end of the droplet inlet channel 122, such that it is also coupled at the upstream location of the oil bias channel 140 to the droplet inlet channel 122. The oil bias channel 140 provides a flow of oil which biases the droplets 101 toward a default side (with the electrode 106 de-actuated) of the droplet sorting channel 128, i.e., either the collection channel side of the droplet sorting channel or the waste channel side of the droplet sorting channel. For example, if non-fluorescent droplets 101 by default (i.e., without actuation of the diverter) are to be directed to the waste channel 132, then the oil bias channel 140 biases the non-fluorescent droplets 101*b* toward the waste channel 132, thereby preventing unwanted migration of the fluorescing droplets \ into the collection channel 134. The electrode 106 diverts droplets 101*a* to the collection channel 134.

The droplet sorting channel 128 is coupled to, and in fluid communication with, a sorting junction 130 at the downstream end of the droplet sorting channel 128 (i.e., the droplet sorting channel is coupled at a downstream location to the sorting junction 130). The sorting junction 130 bifurcates and leads to a waste channel 132 and a collection channel 134. The waste channel 132 is coupled to, and in fluid communication with, a waste reservoir 136 at a downstream location of the waste channel 132. Similarly, the collection channel 134 is coupled, and in fluid communication with, a collection reservoir 138 at a downstream location of the collection channel 134.

Figure 2E:
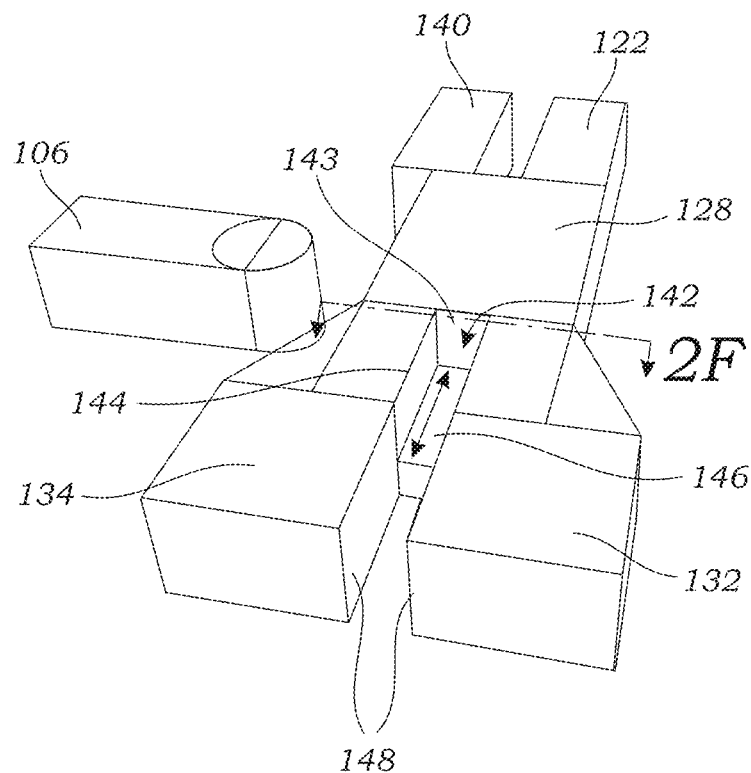
FIG. 2E is a see-through, perspective view of the microfluidic sorting chip of FIG. 2A at the sorting junction showing the droplet sorting channel, oil bias channel, inlet channel, electrode, collection channel, and waste channel.

The microfluidic chip 102 has an elevated divider 142 located at the sorting junction 130. As shown in FIG. 2E, the elevated divider 142 is interposed between the waste channel 132 and the collection channel 134 and extends downstream of the sorting junction 130 for a divider length 144. The elevated divider 142 comprises a facing surface 143 located at the sorting junction 130 and disposed above a dead-end channel 146. As shown in the cross-section of FIG. 2F, the elevated divider 142 separates only the upper portion of the waste channel 132 and the collection channel 134, such that a lower portion of the waste channel 132 and the collection channel 134 remain fluidly connected by the dead-end channel 146 located below the elevated divider 142. Border wall(s) 148 downstream of the dead-end channel 146 completely separate the waste channel 132 and collection channel 134. As explained herein, traditional FADS sorters use a hard wall divider that can damage droplets at high flow rates. At lower flow rates, the droplets 101 can be sufficiently displaced laterally away from the divider wall before reaching the starting edge of the divider wall (i.e., while flowing down the droplet sorting channel upstream of the hard divider wall) to avoid this. However, at high flow rates, the large electric fields from the electrode 106 required to displace the droplets 101 laterally away from the divider wall can destabilize and damage the droplets 101. Instead of using large electric fields (see description of electrode 106 herein) at high flow rates, the elevated divider 142 of the microfluidic chip 102 allows droplets 101 to gradually enter the collection channel 134 and waste channel 132, such that the droplets 101 experience reduced shear which does not damage the droplets. The dead-end channel 146 under the elevated divider wall 142 promotes a Laplace pressure to gently and gradually guide the droplets 101 into the correct channel 132 or 134. This allows the use of a smaller electric field from the electrode 106, while the elevated divider and dead-end reduce the shear on the droplets, especially at high flow rates, avoiding breakup or damage to the droplets 101 and allowing them to move through the sorting junction 128 into the collection channel 134 or waste channel 132 intact.

A portion of the downstream end of the border wall 148 has a plurality of pressure equilibration channels 150 for equalizing the pressure between the waste channel 132 and the collection channel 134.

The microfluidic sorting chip 102 also has one or more oil reservoirs 152 for supplying oil to the first and second oil inlet channels 124*a*, 124*b*, and the oil bias channel 140. In the illustrated embodiment, the microfluidic sorting ship 102 has a first oil reservoir 152*a* in fluid communication with the first oil inlet channel 124*a* and the second oil inlet channel 124*b*, and a second oil reservoir 152 in fluid communication with the oil bias channel 140.

The microfluidic sorting chip 102 may also include pads and channels for the routing of the electrical features of the sorting chip 102. The microfluidic sorting chip 102 includes two ground pads 154a, 154b, and a ground track 156 connected to the ground pads 154a, 154b, and routed around the diverter/electrode 106, waste channel 132, collection channel 134, waste reservoir 136 and collection reservoir 138 to form a ground moat 158. A diverter pad 160 is also included for receiving the electrode 106.

The various droplet handling features and electrical features of the microfluidic sorting chip 102, including the input droplet reservoir 120, droplet inlet channel 122, sorting channel 128, first and second oil inlet channels 124a, 124b, oil reservoirs 152, droplet sorting channel 128, waste channel 132, collection channel 134, waste reservoir 136, collection reservoir 138 and oil bias channel 140, ground pads 154, ground track 156, and electrode pad 160 may have varying depths (or heights), or the same depth (or height). While the vertical dimensions of the features of the microfluidic sorting chip 102 will be described in terms of depth from the top of such features, such depth dimensions are equivalent to the height of such features from the bottom of the features. In one embodiment, these features have a depth of from 10 µm to 30 µm, or from 5 µm to 50 µm. In the illustrated embodiment of FIG. 2A, the input droplet reservoir 120 is a shallow channel, for instance, having a depth of 10 µm. The oil reservoirs 152, oil inlet channels 124, droplet inlet channel 122, sorting channel 128, waste channel 132, collection channel 134, waste reservoir 136 and collection reservoir 138 are deeper, for instance, having a depth of 30 µm. The ground pads 154, ground track 156, and electrode pad 160 are also deeper, for instance, having a depth (or height) of 30 µm.

Figure 9A:
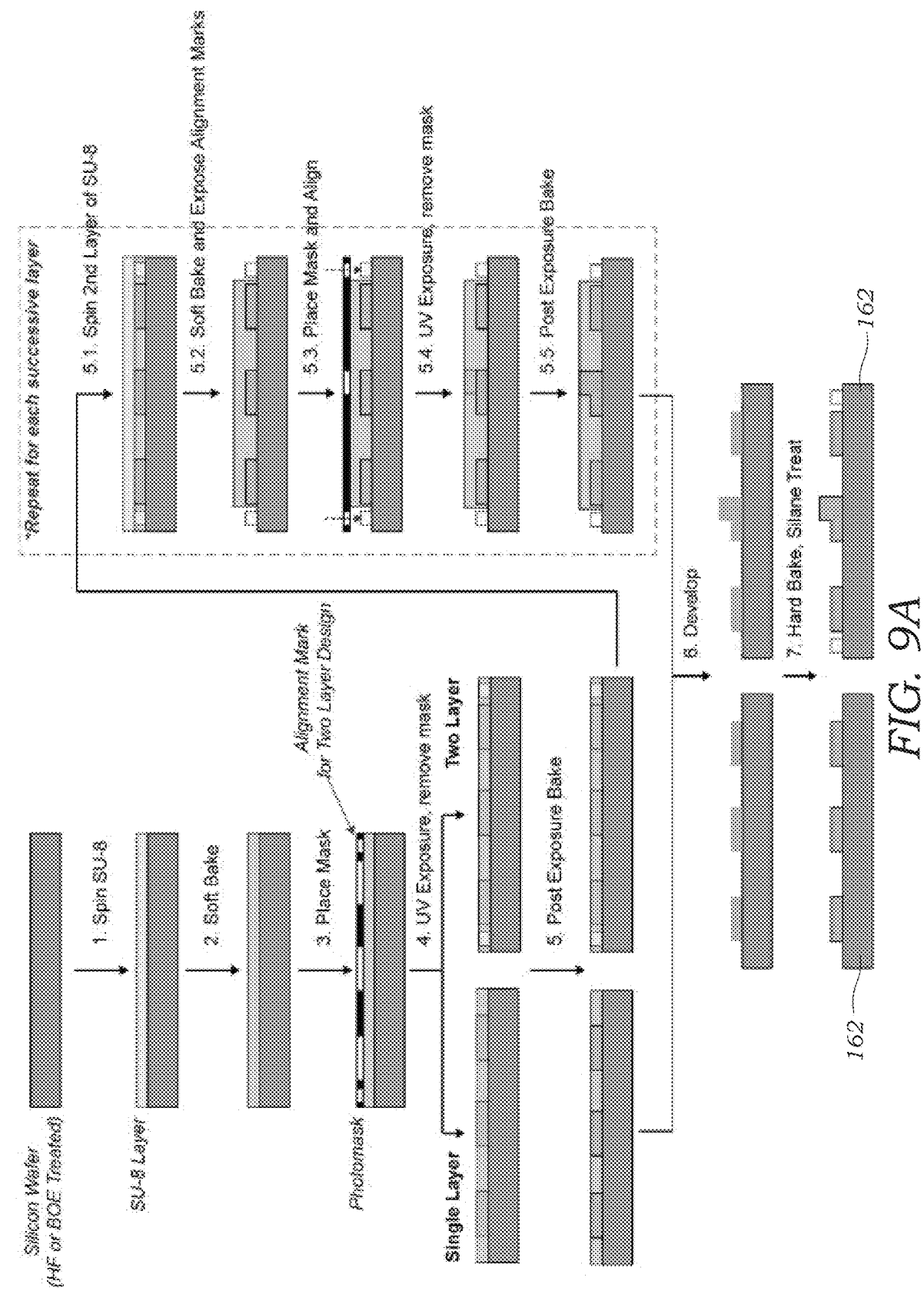
FIGS. 9A and 9B illustrate a fabrication process for a PDMS microfluidic sorting chip, according to one embodiment.
Figure 9B:
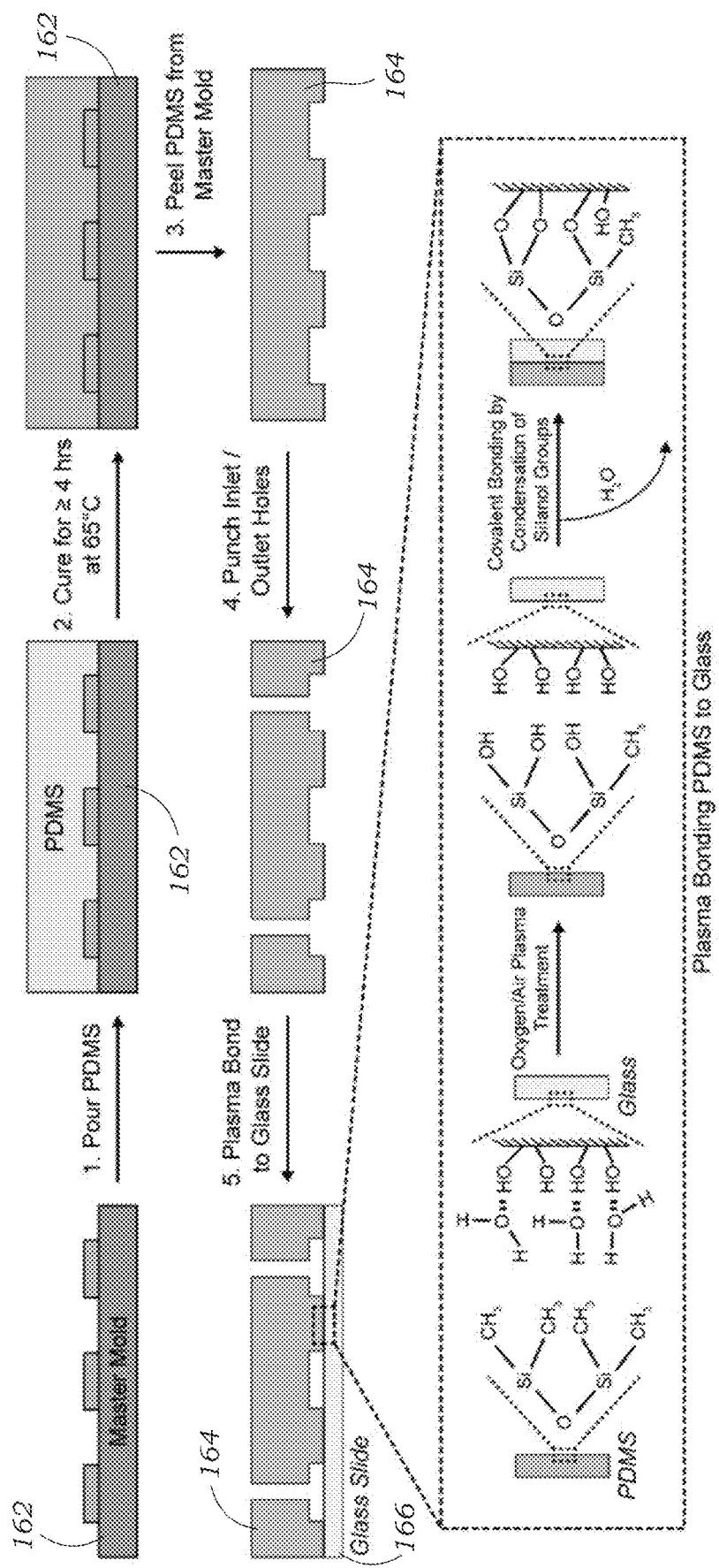

The microfluidic sorting chip 102 may be made of polydimethylsiloxane (PDMS) or other suitable material. As illustrated in FIGS. 9A-9B, the microfluidic sorting chip 102 may be fabricated using a molding process wherein the mold is a silicon mold formed by a photolithographic process. FIG. 9A illustrates a process for fabricating a silicon master mold 162 using a photolithographic process. The silicon master mold is then used to mold a PDMS part 164 having the fluid channels, reservoirs, and/or other structures of the sorting chip 102 formed therein. The PDMS part 164 may be machined to add other required elements, such as inlet holes and outlet holes. The PDMS part 164 is then attached to a substrate or base 166, such as a glass slide. The PDMS part 164 may be attached to the substrate 166 by plasma bonding, adhesive, or other suitable attachment process.

The FADS system 100 includes a diverter 105, which in the illustrated embodiment, comprises an electrode 106. The electrode 106 may comprise a salt solution, such as a specified concentration of salt (NaCl) in water. The electrode 106 is disposed on the microfluidic sorter chip 102 adjacent the droplet sorting channel 128 just upstream of the sorting junction 130. The electrode 106 is configured to be selectively actuated to direct the droplets 101 as they are flowing through the sorting channel 128 toward, and into, one of the collection channel 134 or the waste channel 132. The electrode 106 is actuated by is applying a pulsed voltage to the electrode 106 (using the programmable controller 108, as described herein) to create a non-uniform electric field which generates a DEP force that polarizes and deflects the droplet 101 of interest (e.g., droplet 101a) into a collection channel 134. When the electrode 106 is not actuated (i.e., no applied voltage), the electrode 106 does not effect the droplets 101 as they are flowing through the sorting channel 128. In the illustrated embodiment, the electrode 106 is configured to exert a DEP force which forces the droplets 101 onto a path toward and into the collection channel 134. As explained above, in the illustrated embodiment, the oil bias channel 140 is configured to bias the droplets 101 into the waste channel 132 as the default. Alternatively, the electrode 106, and/or the waste channel 132 and collection channel 134 can be arranged such that the actuated electrode 106 forces the droplets toward, and into, the waste channel 132, in which case, the oil bias channel 140 can be configured to bias the droplets 101 into the collection channel 134 as the default.

While the diverter 105 in this embodiment of a FADS system 100 is an electrode 106, the diverter 105 may be any suitable device for exerting a force on the droplets 101 flowing through the sorting channel 128 to direct the droplets into one of the collection channel 134 or the waste channel 132. As some other examples, the diverter 105 may be configured to utilize mechanical forces, hydrodynamic forces, magnetic forces, or the like, to selectively direct the droplets 101 into the waste channel 132 and/or collection channel 134 as the droplets 101 flow through the droplet sorting channel 128.

The optical interrogation module 104 includes an excitation light source 170. The excitation light source 170 may be a laser 170 or other suitable excitation light, which is configured to emit light at a wavelength, wavelengths, or wavelength range which will excite the fluorescent reporter 116 to fluoresce (i.e., emit fluorescent light). The optical interrogation module 104 includes a first reflective mirror 172 and a dichroic mirror 174 to direct the light into an objective lens 176 which focuses the incident light 171 from the excitation light source 170 onto the droplet sorting channel 128. The dichroic mirror 174 may be a single band or multi-band dichroic. For example, a multi-band, such as a quad band dichroic allows the use of a multi-channel detection system having multiple excitation light sources 170 (not shown in FIG. 1A) for detecting different types of fluorophore reporters 116 such as different fluorophore-quencher pairs 116. For example, the optical interrogation module 104 may have two, three, four or more excitation light sources 170. The focused light illuminates the droplets 101 as they flow through the droplet sorting channel 128 and causes the fluorophore reporters 116 in the droplets 101 to emit fluorescent light 180.

The optical interrogation module 104 also has a second reflective mirror 178 for directing fluorescent light 180 emitted by the droplets 101 through one or more dichroic mirrors 182. The embodiment of FIG. 1A includes a series of two emission dichroic mirrors 182a, 182b that direct the emitted fluorescent light 180 onto one or more light detectors 184a, 184b and a video camera 187. The light detectors 184 may be photomultiplier tubes (PMTs) or other suitable light detection devices. Each of the light detectors 184 detects the fluorescent light 180 directed onto the respective light detector 184 after being filtered by the respective dichroic mirrors 182 and outputs an output signal corresponding to the detected fluorescent light 180. For instance, the light detectors 184 may output an output signal corresponding to the intensity of detected fluorescent light 180. Each of the light detectors 184 is operably coupled to the controller 108 to transmit the output signals from the light detectors 184 to the controller 108.

The video camera 187 is arranged to capture video images of the droplet sorting process in the microfluidic sorting chip 102. Thus, the video camera 187 may be arranged to capture video of the droplet inlet channel 122, droplet sorting channel 128, sorting junction 130, waste channel 132 and/or collection channel 134 (referred to collectively as the sorting area of the chip 102), as well as the droplets 101 as they flow therethrough. The video camera 187 may be a high-speed camera capable of at least 35,000 frames per second (fps), or at least 25,000 fps, or at least 15,000 fps. The video camera 187 provides video of the droplet sorting process to allow monitoring of the sorting process, and also recording the video of the sorting process. The video camera 187 is operably coupled to a computer 188 for recording the video onto the computer 188 and/or to control the operation of the video camera 187. An illumination light 192 is provided which directs illumination light onto the sorting area of the chip 102 and the droplets 101 flowing therethrough. The illumination light 192 preferably emits light that does not overlap with the spectral properties of the excitation light 171 and emitted fluorescent light 180. For example, the illumination light 192 may be a blue light LED which emits blue light. Blue light does not overlap with the spectral properties of most fluorescent reporters 116, including the reporters 116 used in the Examples described herein.

The programmable controller 108 includes a programmable integrated circuit 186 which is configured to receive the output signals from the light detectors 184, analyze the output signals, and control the actuation of the electrode 106. In the illustrated embodiment, the programmable integrated circuit 186 is a field-gated programmable array (FPGA) which allows execution of the programmable code of the FPGA independent of a main computer 188. This may reduce any delay time or latency between fluorescence detection by the light detectors 184 and actuation of the electrode 106 during sorting of droplets 101 (i.e., droplets 101a, 101b into respective channels). The controller 108 may also include a signal driver 190 coupled to the integrated circuit 186. The signal driver 190 is configured to receive an actuation signal from the integrated circuit 186 and output a driver signal to the diverter/electrode 106. For instance, in the illustrated embodiment, the signal driver 190 is a high-voltage amplifier which receives an actuation signal from the integrated circuit 186 and outputs a high-voltage signal to the electrode 106 based on the actuation signal.

The FADS system 100 also has a computer 188 operably coupled to the programmable controller 108, and the camera video 186 (as described above). The computer 188 may be a personal computer, server computer, or other suitable computing device, having a display 189. The computer 188 is configured to monitor the droplet sorting process, collect data during the droplet sorting process, and adjust sorting parameters (e.g., set sorting thresholds, sorting speed, etc.). The computer 188 has a lab software program 194 configured to program the integrated circuit 186, including setting sorting thresholds of the integrated circuit 186 (i.e., instructions on how to sort droplets 101 having a specified emitted fluorescent intensity level). For example, the integrated circuit 186 may be programmed to actuate the electrode 106 to deflect a respective droplet 101 based on a comparison of the detected emitted fluorescent light 180 from the droplet 101 to a threshold intensity. For instance, the threshold intensity may be: (a) a minimum intensity in which the integrated circuit 186 actuates the electrode 106 when the emitted fluorescent light 180 exceeds the threshold intensity; or (b) a maximum intensity in which the integrated circuit 186 actuates the electrode 106 when the emitted fluorescent light 180 is below the threshold intensity; or (c) a threshold intensity range in which the integrated circuit 186 actuates the electrode 106 when the emitted fluorescent light 180 is within the threshold intensity range; or (d) a suitable combination of the foregoing.

Figure 18:
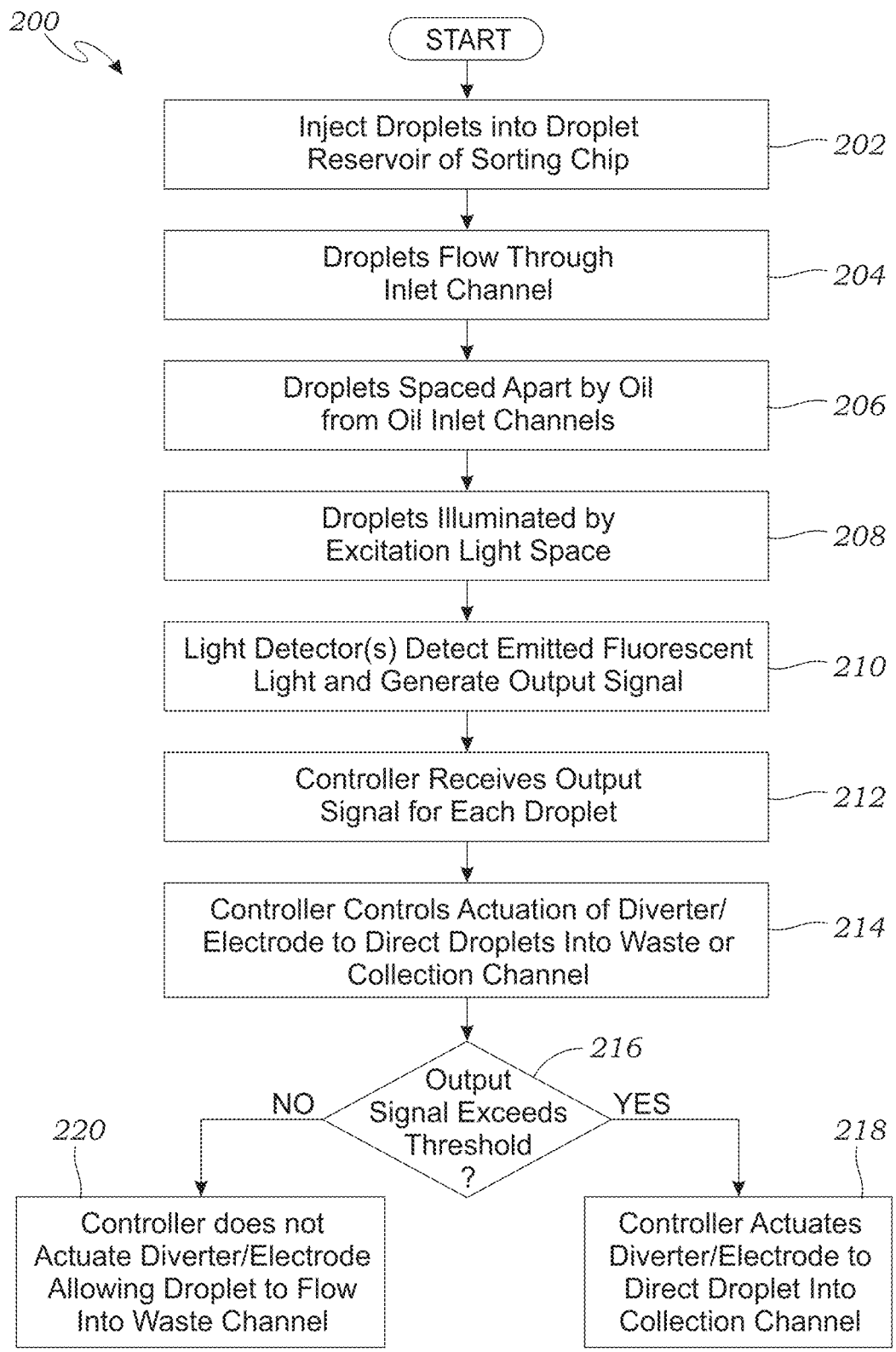
FIG. 18 is a flow chart of a method for using the FADS system of FIG. 1A for sorting droplets, according to one embodiment.

Referring now to FIG. 18, one embodiment of a method 200 for using the FADS system 100 to sort droplets will now be described. At step 202, a population of droplets 101 is injected into the input droplet reservoir 120 of the microfluidic sorting chip 102. The droplets 101 may be prepared as described herein and shown in FIG. 1B, including the description of forming and encapsulating a cell 112 along with a fluorescent assay 114 utilizing a fluorescent reporter 116 into a w/o droplet 101, and lysing and incubating the droplets 101. At step 204, the droplets 101 flow out of the droplet reservoir 120 into the droplet inlet channel 122. At step 206, the droplets are substantially evenly spaced apart by the oil inlet channels 124 as they flow through the droplet inlet channel 122. At step 208, the droplets 101 are illuminated by the excitation light source 170 as the droplets 101 flow through the droplet sorting channel 128. At step 210, at least some of the droplets 101 emit fluorescent light 180. At step 210, one or more of the light detectors 184 detect the emitted fluorescent light 180 from each respective droplet 101 and generates a respective output signal corresponding to the fluorescent light 180. At step 212, the controller 108 receives the respective output signal for each droplet 101, and analyzes the output signal. At step 214, the controller 108 controls the actuation of the electrode 106 based on the respective output signal for each droplet 101 to direct each droplet into either the collection channel 134 or the waste channel 132. For instance, the illustrated method 100 is for an embodiment in which the the sorting is conducted based on a minimum fluorescence threshold for droplets 101 to be sorted into the collection channel 134, and the default flow path of the droplets in the droplet sorting channel (i.e., the electrode 106 not actuated to direct the droplet 101) is directed to the waste channel 132. In such case, at step 216, the controller 108 determines whether the output signal exceeds the threshold. For droplets having a fluorescence intensity which exceeds the minimum fluorescence threshold, at step 218, the controller 108 sends an actuation signal to the signal driver 190 and the signal driver 190 actuates the electrode 106 to direct such droplets 101 into the collection channel 134. For droplets 101 having a fluorescence intensity which does not exceed the minimum fluorescence, at step 220, the controller 108 does not send an actuation signal to the signal driver 190 such that the signal driver 190 does not actuate the diverter/electrode 106, thereby allowing such droplets to flow into the waste channel 132 (as described herein, the oil bias channel 140 biases the droplets 101 flowing through the droplet sorting channel 128 to the default channel, in this case, the waste channel 132. Based on the descriptions herein, the method 100 may be configured for any type of threshold and for other configurations of the default channel.

EXAMPLES

The following examples of the FADS system disclosed herein were also described in a publication, Fluorescence-Activated Droplet Sorting for Single-Cell Directed Evolution, *ACS Synth. Biol*, 2019, 8, 6, 1430-1440, Alek Vallejo, Ali Nikoomanzar, Brian M. Paegel and John C. Chaput, which is incorporated by reference herein in its entirety.

The working principle of the microfluidic sorter designed for (but not limited to) Cy3 excitation/emission is illustrated in FIGS. 1A and 1B. Incident light from a 552 nm laser is focused on the microfluidic droplet sorting channel where w/o droplets pass in single file. Emitted fluorescent light from fluorescing droplets is led through a 405/488/543/635 nm Quad Band Dichroic into an optical train through a series of long-pass dichroics that can lead to a high-speed camera or 1 of 2 photomultiplier tubes (PMT). Use of the quad-band dichroic allows for the use of a two-channel detection system (Cy3 and AlexaFluor 660) and can allow for multiple lasers to be added to the system for detecting different fluorophore-quencher pairs. The sample is illuminated with blue light, which does not overlap with the spectral properties of Cy3 or AlexaFluor 660 and is imaged with a high-speed camera (Phantom VEO 410L, Vision Research) to enable filming at ≥50,000 frames per second (fps). The PMT signals are analyzed by a field-gated programmable array (FPGA, USB-7856R, National Instruments) that is controlled with custom LabView software (National Instruments). Droplets falling within a user-defined threshold (i.e., those droplets that have fluorescent level at or above a cut-off threshold) are sorted via an amplified pulse (using a high-voltage amplifier) triggered by the FPGA (600V, 3 square pulses, 50 kHz, 50% duty cycle) that is transmitted to the microfluidic-sorting device via a salt-water electrode (4M). The resulting non-uniform electric field generates a dielectrophoretic (DEP) force that polarizes and deflects the droplet of interest into a collection channel.

Figure 2F:
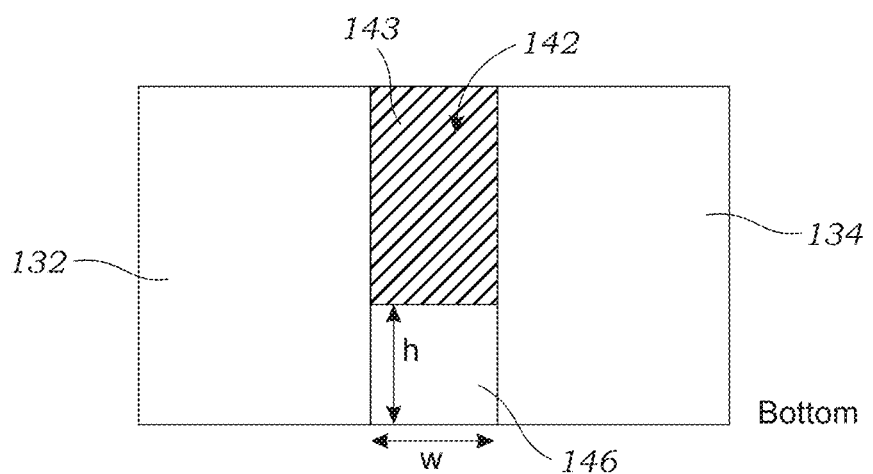
FIG. 2F is a cross-sectional view of the microfluidic chip of FIG. 2A at the sorting junction viewed in the downstream direction showing the elevated divider wall and dead-end channel that is interposed between the collection channel and the waste channel.

The sorting speeds of typical FADS instruments are limited by two factors: the speed of the electronics and the geometry of the sorter. To overcome the former, the data acquisition unit (USB-7856R, National Instruments) is equipped with a field-gated programmable array (FPGA) to allow execution of code independent of the main computer, where the delay time from detection to sorting can be reduced to a few μsec (microseconds) to enable nearly instantaneous sorting. The latter is overcome using a two-layer microfluidic design as seen in FIGS. 2A-2D, whereby the border wall separating the collection and waste channels is slightly elevated as seen in FIGS. 2E and 2F. Traditional FADS sorters use hard wall dividers that can damage droplets at high flow rates. Droplets can be sufficiently displaced beyond the divider before reaching its starting edge to avoid this, but at high flow rates, the large electric fields required for sorting can destabilize and damage the droplets. Instead, the elevated divider allows droplets to experience reduced shear as they can gradually enter the collection channel intact. This is due to a dead-end channel that is formed within the space under the elevated facing divider wall that promotes a Laplace pressure to gently and gradually guides the droplet into the correct channel. As seen in FIG. 2f, the dead-end channel has a width (w) and height (h) on the order of about 10 um. The elevated divider wall this starts about 10 μm above the bottom surface of the droplet sorting channel. The height of the elevated divider wall may be 10-20 μm to the top of the device. Using this configuration, droplet breakup, which is common to hard wall dividers, is avoided and small lateral displacements around the centerline can be corrected.

RESULTS

Generating Microfluidic Droplets for Enzyme Engineering

For the experiments described herein, two different types of fluorocarbon-coated polydimethylsiloxane (PDMS) microfluidic devices were fabricated based on previous designs that were established for generating uniform water-in-oil (w/o) droplets. The fluorocarbon-coated microfluidic sorting devices (FIGS. 9A, 9B, 10) contain similar flow-focusing junctions designed to produce uniform w/o droplets that are stabilized by surfactants in the oil that prevent coalescence at elevated temperatures (as high as 95° C.) and allow for long-term storage at room temperature. The two droplet production devices differ based on the design of the channels carrying the aqueous stream (FIG. 10), which promotes either a single aqueous stream or a double co-flowing aqueous stream upstream of the flow focusing junction. The single-stream device was designed to be compatible with a thermal lysis strategy, while the double flow design allows for the delivery of lysis reagents separate from the population of E. coli cells. Following an iterative design-build-test process, optimal designs produced for both PDMS devices were found to maintain a droplet production rate of 30 kHz for at least 7-8 hours, which is long enough to produce ~$10^9$ droplets.

Figure 11A:
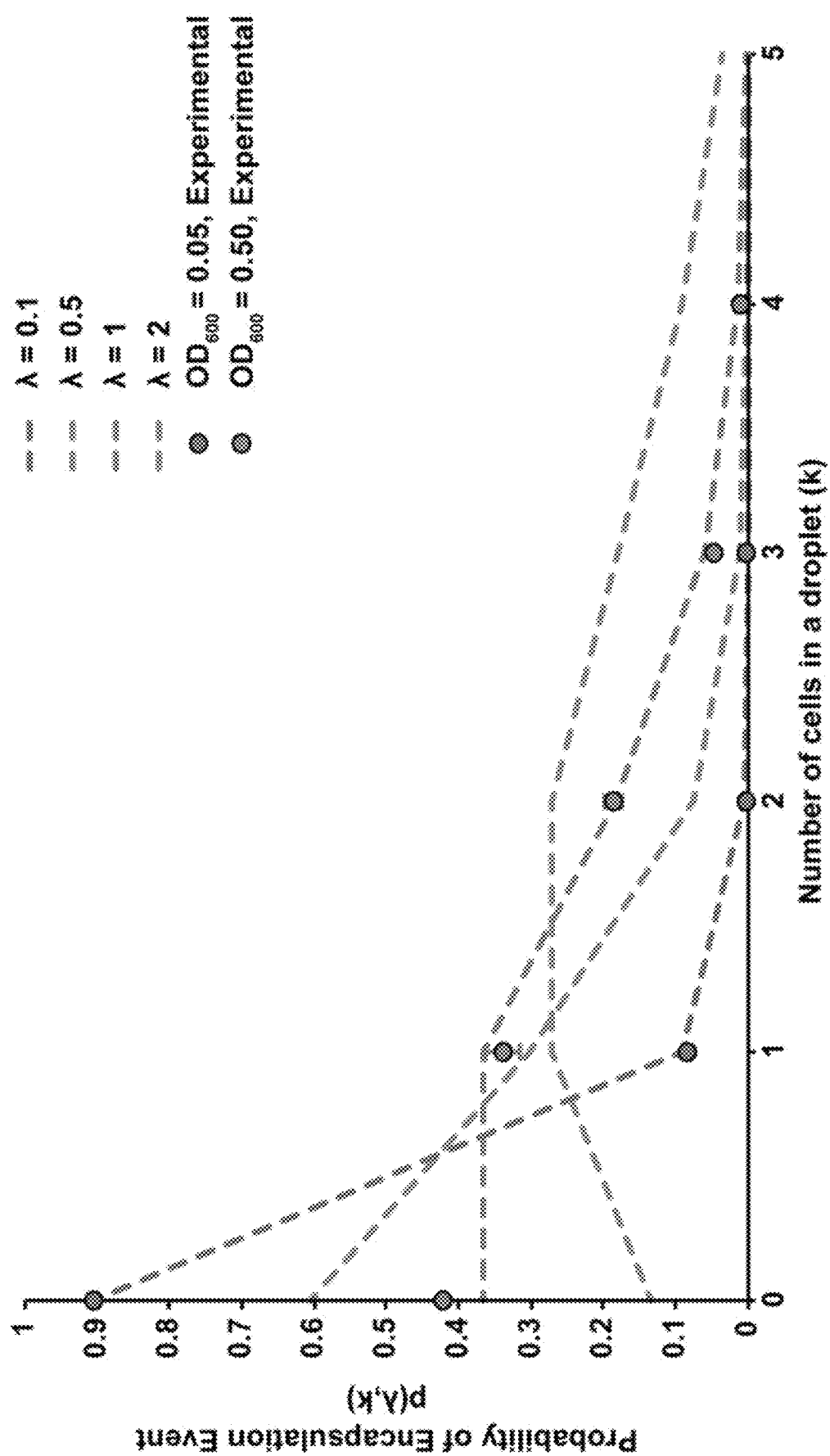
FIGS. 11A and 11B illustrate theoretical model and empirical validation of $E.$ $coli$ occupancy.

Droplets were formed following a Poisson distribution ($\lambda$=0.1) to ensure that 95% of the occupied droplets contain only one E. coli per droplet. Under these conditions, the droplet population is produced at 10% occupancy (FIG. 11A). This distribution is necessary for maintaining the genotype-phenotype linkage required for directed evolution whereby the genetic information encoded in the DNA plasmids of positively sorted droplets is recovered to determine the sequence of enzyme variants with desired functional properties. Given that E. coli concentration is readily quantified by absorbance ($OD_{600}$), a conversion factor relating $OD_{600}$ to the actual cellular concentration of E. coli ($\sigma_{1.0}$) can be achieved using the following equation where $\nabla_d$ is the droplet volume.

$$OD_{600} = \frac{\lambda}{V_d \cdot \sigma_{1.0}}$$

Figure 11B:
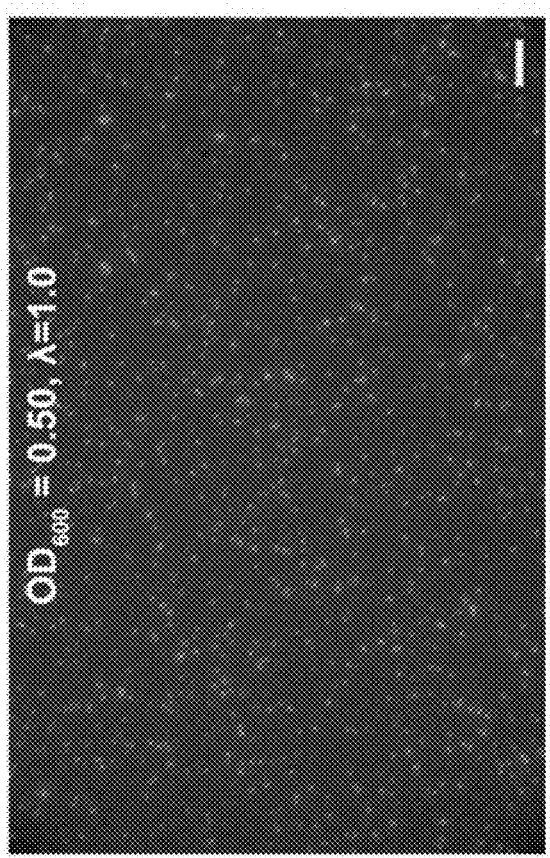
Figure 11B:
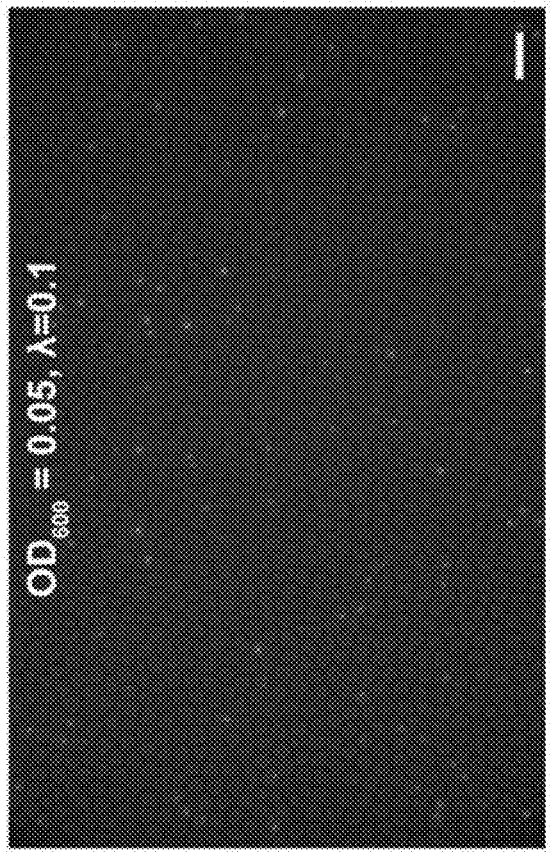

If one assumes that $\sigma_{1.0}$=5.0×$10^8$ cells/mL when $OD_{600}$=1.0, then an $OD_{600}$ of 0.05 will result in $\lambda$=0.1 for 20 μm diameter droplets. This prediction closely agrees with empirical observations obtained using green fluorescent protein (GFP) expressed in E. coli (see FIG. 11B).

E. Coli Lysis Inside Droplet Microcompartments

Using E. coli as a protein expression system for delivering recombinant enzymes to w/o droplets requires efficient methods for lysing the bacteria without disrupting the droplet microcompartment. As described above, droplets are produced under conditions in which the aqueous phase contains all the reagents needed to achieve a desired activity assay once the enzyme is released from the bacteria and allowed to react with the substrate. Since w/o droplets are resistant to coalescence at elevated temperatures, thermophilic enzymes can be released using a thermal lysis strategy, which typically involves heating the droplet population for 5 minutes at 90-95° C. For thermal lysis, it is advised to use fluorous oils and surfactants that stabilize the compartments at high temperatures.

Figure 12A:
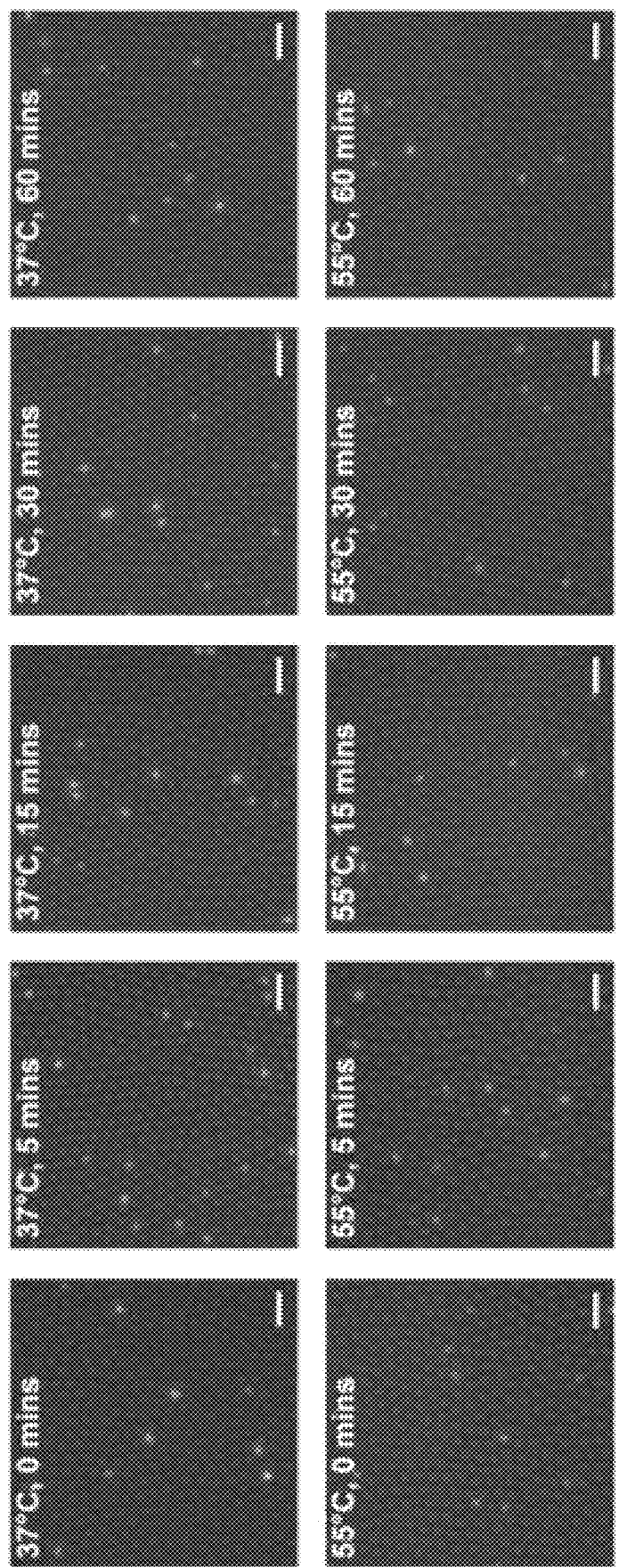
FIGS. 12A-12C illustrate time and temperature dependence of chemical and enzymatic lysis. Fluorescent images of GFP expressing *E. coli* encapsulated in droplet microcompartments at different time points at 37° C. (top rows) and 55° C. (bottom rows) for FIG. 12(*a*) 1×Thermopol, FIG. 12(*b*) 1×Bug Buster, and FIG. 12(*c*) 1×Lysozyme. Scale bars in FIGS. 12A-12C are 50 µm.
Figure 12B:
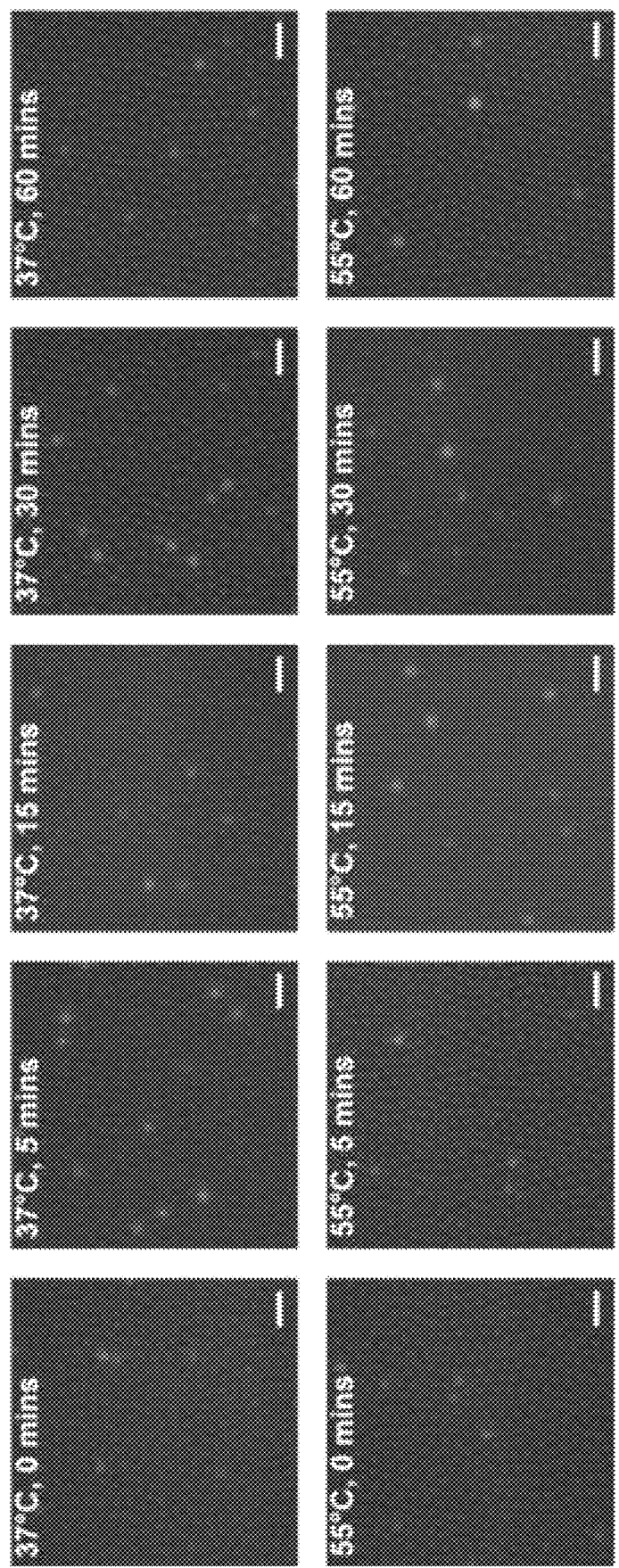
Figure 12C:
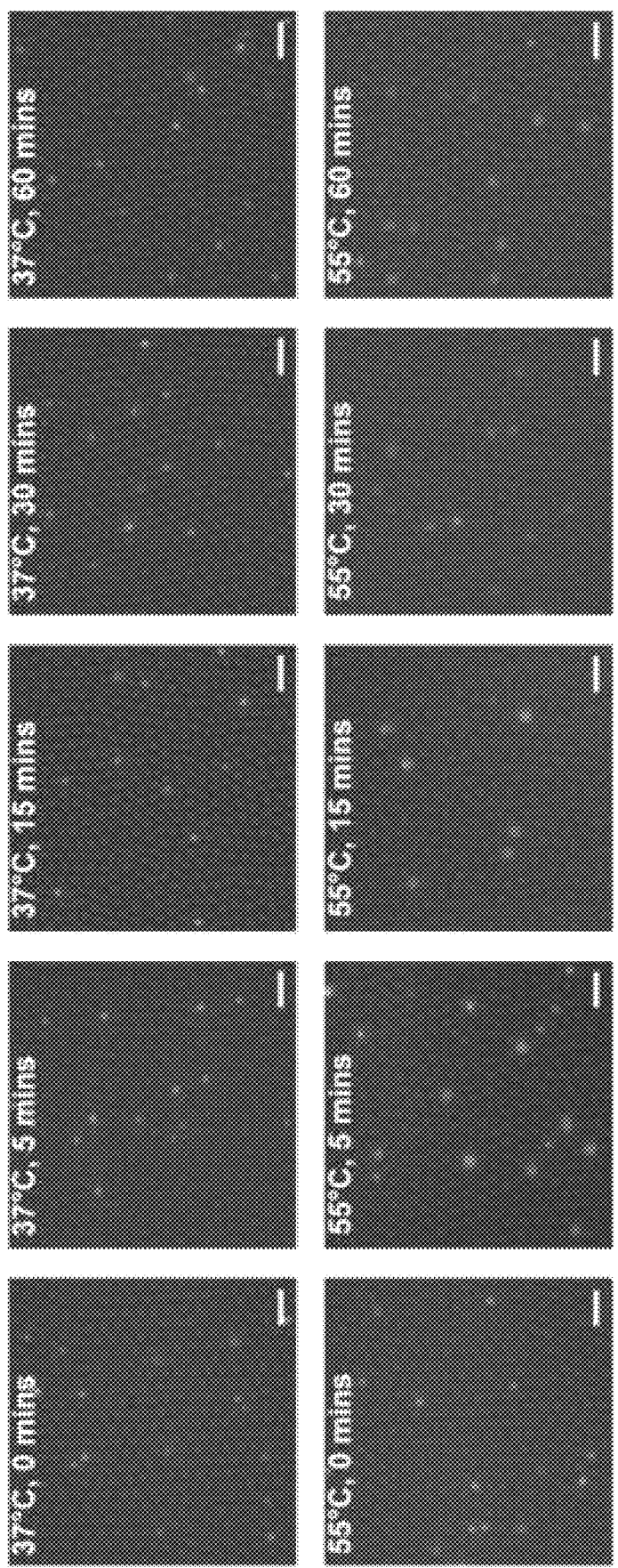

Mesophilic enzymes are not compatible with heat lysis procedures and necessitate the use of chemical or enzymatic agents that can lyse the E. coli membrane under milder conditions. We therefore chose to explore this process using GFP as a reporter system for natively folded enzymes that escape the cell membrane. Using the co-flow droplet generator design (FIG. 10), we produced a population of 20 μm diameter droplets in which GFP-expressing E. coli were co-encapsulated with buffer only, buffer and Bug Buster, or buffer and lysozyme. Each droplet population was monitored over time at 37 and 55° C. by fluorescence microscopy (FIG. 12A-12C). As expected, GFP fluorescence in the buffer only population was confined to the cell. By contrast, droplets encapsulated with Bug Buster became fluorescent after a brief incubation (5 min, 37° C.). Similar images were observed for the lysozyme sample after incubation at a slightly elevated temperature (5 min, 55° C.). Based on these results, we postulate that either condition should be suitable for microfluidic screening of mesophilic enzymes.

Design of a Fluorescent-Activated Droplet Sorting (FADS) Device

Following cell lysis, droplets are incubated for an extended period of time to allow the enzyme to escape the cell membrane and react with the substrate. Since this is a single-cell technique, stochastic factors, such as differences in protein expression levels between individual E. coli cells, differences in the release of the enzyme into the surrounding droplet, and the failure of some enzymes to react with enough substrate molecules to produce a robust signal, may contribute to varying levels of droplet fluorescence. Consequently, it is important that the signal-to-noise ratio (SNR) of the optical sensor used to detect active droplets be as high as possible in order to identify functional enzyme variants with high confidence. Previously, it has been shown that the Cy3-Iowa Black fluorophore-quencher pair maintains a higher SNR than other commonly used fluorophore-quencher pairs. Based on this observation, a FADS instrument was designed that was compatible with the green-yellow fluorescence of a Cy3 organic dye (~550 nm excitation and ~570 nm emission).

An overview of the optical train and associated electronics for signal acquisition and sorting are provided in FIGS. 1A and 1B. Focused light from a 552 nm laser is positioned upstream of the sorting junction of a microfluidic chip that is designed for dielectrophoretic sorting using a 4M NaCl salt water electrode that was surrounded by a large ground moat (FIG. 2A). This chip has the capacity to screen individual droplets at rates approaching 30 kHz, which is comparable to, if not slightly faster than commercial FACS instruments. Although faster rates are possible, our experiments were performed with a sorting rate of ~2 kHz using pressure pumps that have a smaller footprint and allow for near instantaneous response times (~100 ms). It was found that this rate is more than sufficient to screen modest size libraries ($10^4$ members) with high redundancy (~$10^3$ copies of each library member) in just a few hours.

The FADS microfluidic sorting chip was designed with a second flow focusing junction which allows droplets entering the device to become evenly spaced inside a microfluidic channel (FIG. 2B). Flowing droplets pass through a focused laser line that is located immediately upstream of a Y-junction that leads to waste and collection channels. Droplets passing through the laser produce a fluorescent signal with a ~570 nm emission wavelength that is detected by a photomultiplier tube (PMT) in the optical train. If the optical signal for a fluorescent droplet exceeds a user-defined value set for photon counting intensity and occupancy time, three 600 $V_{pp}$ (50 kHz, 50% duty cycle) square wave pulses are applied across the salt water electrode within 5 µs of detecting the droplet. Based on the principle of dielectrophoresis, the non-uniform electric field polarizes the droplet causing it to deflect into the collection line located at the Y-junction (FIG. 2c). Dim droplets that are either empty or contain inactive enzyme maintain their trajectory and flow into the waste line. As a precaution, an oil bias flow acts to prevent the migration of inactive droplets into the collection line. As needed, the device may be illuminated with blue light (such as from a blue LED) to visualize droplet sorting and capture video data with a high-speed camera (35 kHz fps), as blue light does not overlap with the spectral properties of Cy3.

Sorting Fluorescent Droplets

The efficiency of droplet sorting is a critical parameter for directed evolution experiments aimed at producing enzymes with tailormade properties as a high false negative rate causes active variants to be removed from the pool, while a high false positive rate leads to reduced selection efficiency. To evaluate the sorting efficiency of our home-built FADS instrument, the efficiency of droplet sorting was calculated using a defined mixture of fluorescent and non-fluorescent droplets. The fluorescent and non-fluorescent droplets were generated at full occupancy by encapsulating either a Cy3-labeled DNA (ST.1G.HP.44.Cy3, as shown in the table of FIG. 19) or a green dye inside w/o droplets, respectively. The population of non-fluorescent droplets appears opaque when illuminated with blue light (FIGS. 2B-2D), making them distinguishable from the population of fluorescent droplets on still and video images.

Figure 3A:
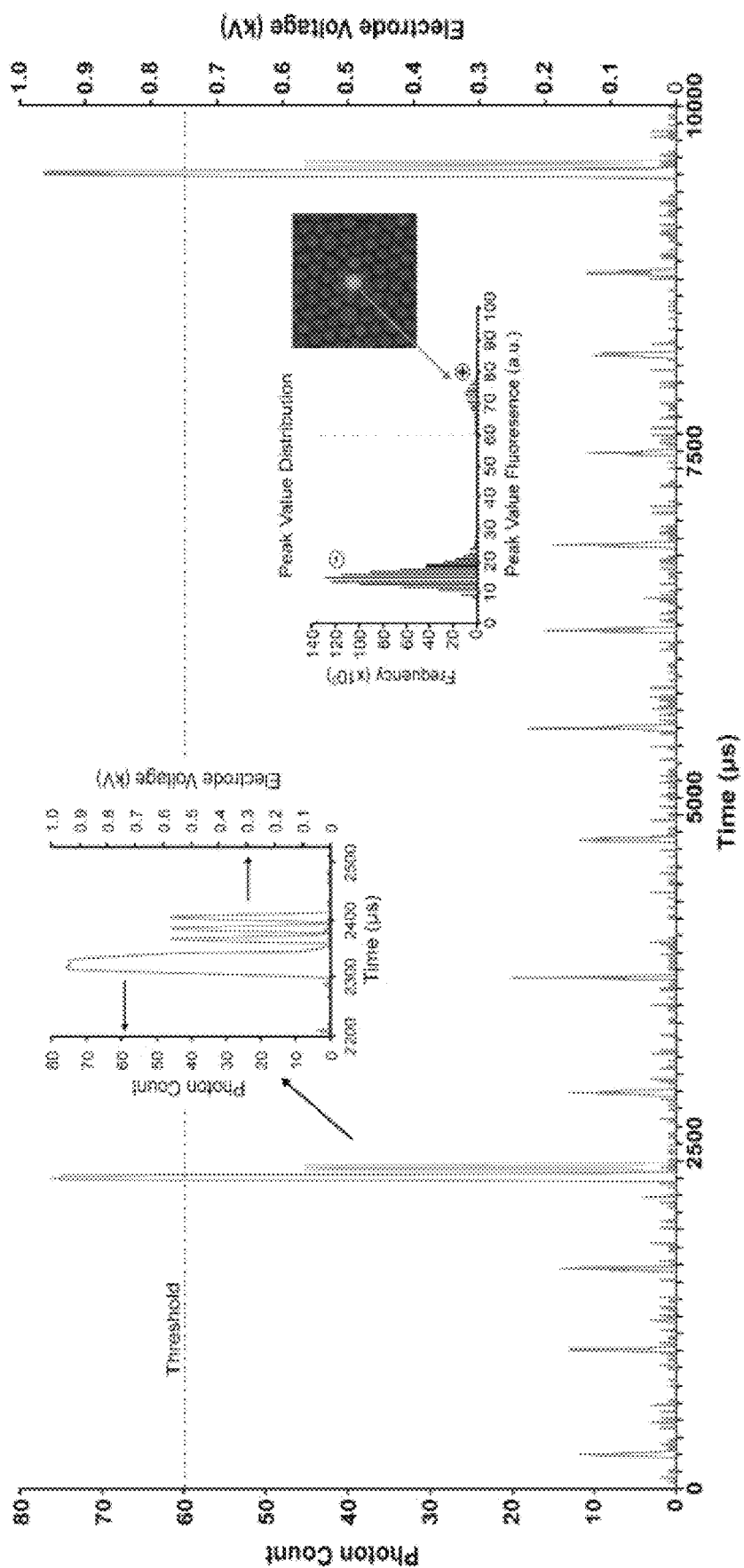
FIG. 3A illustrates a sample of FADS data acquired during an Example sorting run using a system according to the FADS system of FIG. 1A, showing the PMT-detected fluorescence signal (red (R), left axis) produced by positive and negative drops along with the voltage pulse applied to the electrode (blue (B), right axis) when a positive drop is detected. Insets show a magnified image of the shaded region (left) illustrating a positive drop along with the generated sorting pulse, and the histogram (right) showing the distribution of peak droplet fluorescence values for an active population.
Figure 3D:
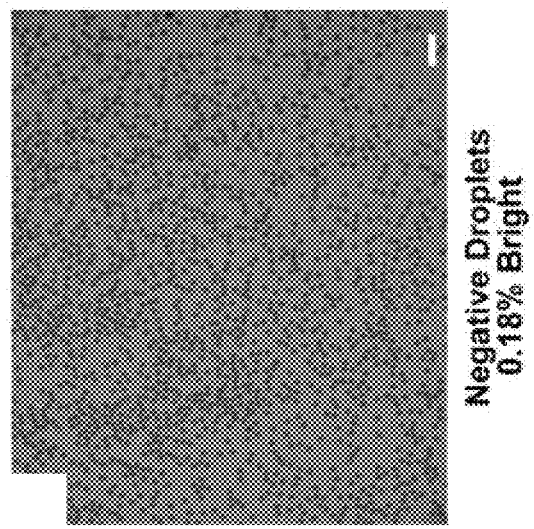
FIGS. 3B-3D illustrate fluorescence microscope images from the Example sorting run of FIG. 3A.
Figure 3C:
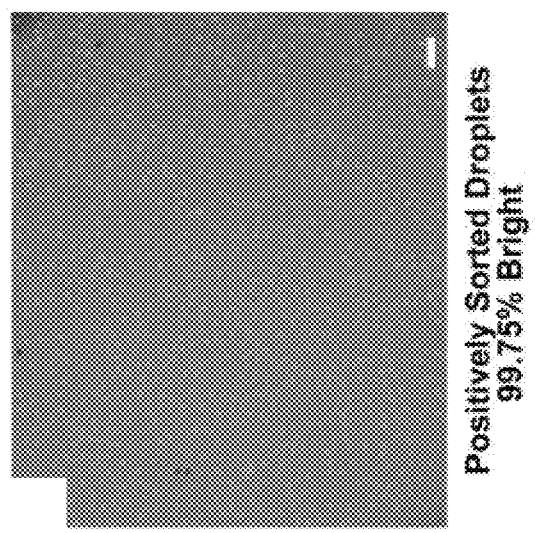
Figure 3B:
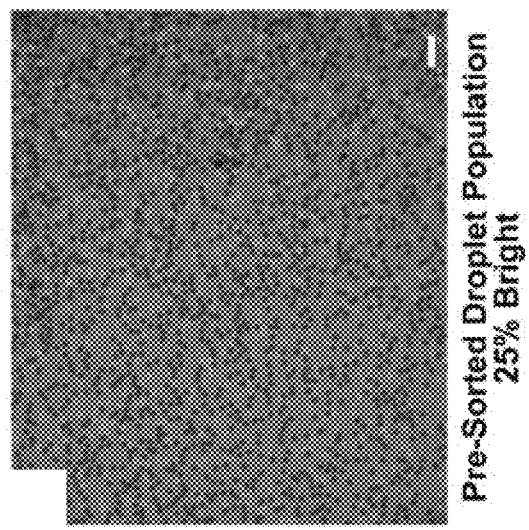

The two droplet samples were mixed together to create a pre-sorted population of droplets that contained ~25% fluorescent droplets. The mixed sample was introduced into the FADS system and sorted with a photon counting threshold of 60 and a temporal residence time of 50-75 µs (microseconds). These parameters were selected based on a series of flow experiments where it was observed the distribution of peak heights and widths for homogeneous populations of fluorescent drops flowing at a rate of ~2-3 kHz. A sample of the droplet traces from a 1-hour sorting run (~10 million droplets) performed at screening rate of 3 kHz (image acquisition rate of 200 kHz) is provided in FIG. 3A. Fluorescence microscopy images taken of the pre- and post-sorted droplets (FIGS. 3b-3d) indicate that the positively sorted droplet population was composed of ~99.75% fluorescent drops, while the negatively sorted population contained only ~0.18% fluorescent drops.

Videos were taken at regular intervals to monitor the deflection of fluorescent droplets into the collection line. Close inspection of the droplet sorting process reveals that the small number of non-fluorescent droplets present in the collection line was mainly due to irregular droplet spacing, which causes smaller size droplets (produced by droplet splitting at the sorting junction) to pack behind regular size droplets. When the regular size droplets are fluorescent, the smaller size droplets are deflected into the collection line by dielectrophoresis. A second source of background was detected in the equilibrium channels located downstream of the sorting junction. In this case, large equilibrium channels were allowing some non-fluorescent droplets to pass from the waste channel into the collection channel. To overcome both problems, a new microfluidic sorting chip was produced that increased droplet spacing in the sorting channel and modified the equilibrium channel between the waste and collection lines. The new device -reduced the frequency of non-fluorescent droplets in the sorted pool to <0.01%.

Establishing Optical Sensors for a Diverse Set of Nucleic Acid Enzymes

DNA modifying enzymes play a critical role in biotechnology and medicine by allowing genetic information to be amplified, ligated, and sequenced. Consequently, these enzymes represent a toolkit of reagents that are routinely used for basic and applied research involving genes, gene families, and entire genomes. However, in many cases, natural enzymes do not perform as well as expected because they are being used in a non-natural context and would benefit from optimization by directed evolution. As a first step in this direction, optical sensors are needed that can report on the functional activity of DNA modifying enzymes in w/o droplets. Toward the broader goal of establishing a set of nucleic acid modifying enzymes that function on nucleic acid polymers with non-natural backbone structures, we investigated four different types of enzymatic activity that are central to molecular biology. These include DNA synthesis by primer-extension, DNA synthesis with strand displacement, restriction enzyme digestion, and DNA ligation (FIGS. 5a-5d).

Polymerase extension. DNA polymerases are one of the most important enzymes found in nature, and as such, have become the cornerstone of biotechnology applications that involve DNA synthesis, amplification, and sequencing. Polymerases with modified activities are continually being developed to support new applications in healthcare, which has created a demand for engineered polymerases with properties that exceed their natural counterparts. To support this process, we have established an optical polymerase activity assay that allows high-throughput screening in uniform w/o/w droplets that are sorted by FACS. The sensor consists of a 5'-Cy3 labeled self-priming template that is quenched at room temperature by a short DNA strand carrying a 5'-quencher. At elevated temperatures, the quencher strand dissociates from the template and if the polymerase is able to extend the primer to full-length product, the droplets fluoresce because the quencher is no longer able to reanneal with the template.

Figure 13A:
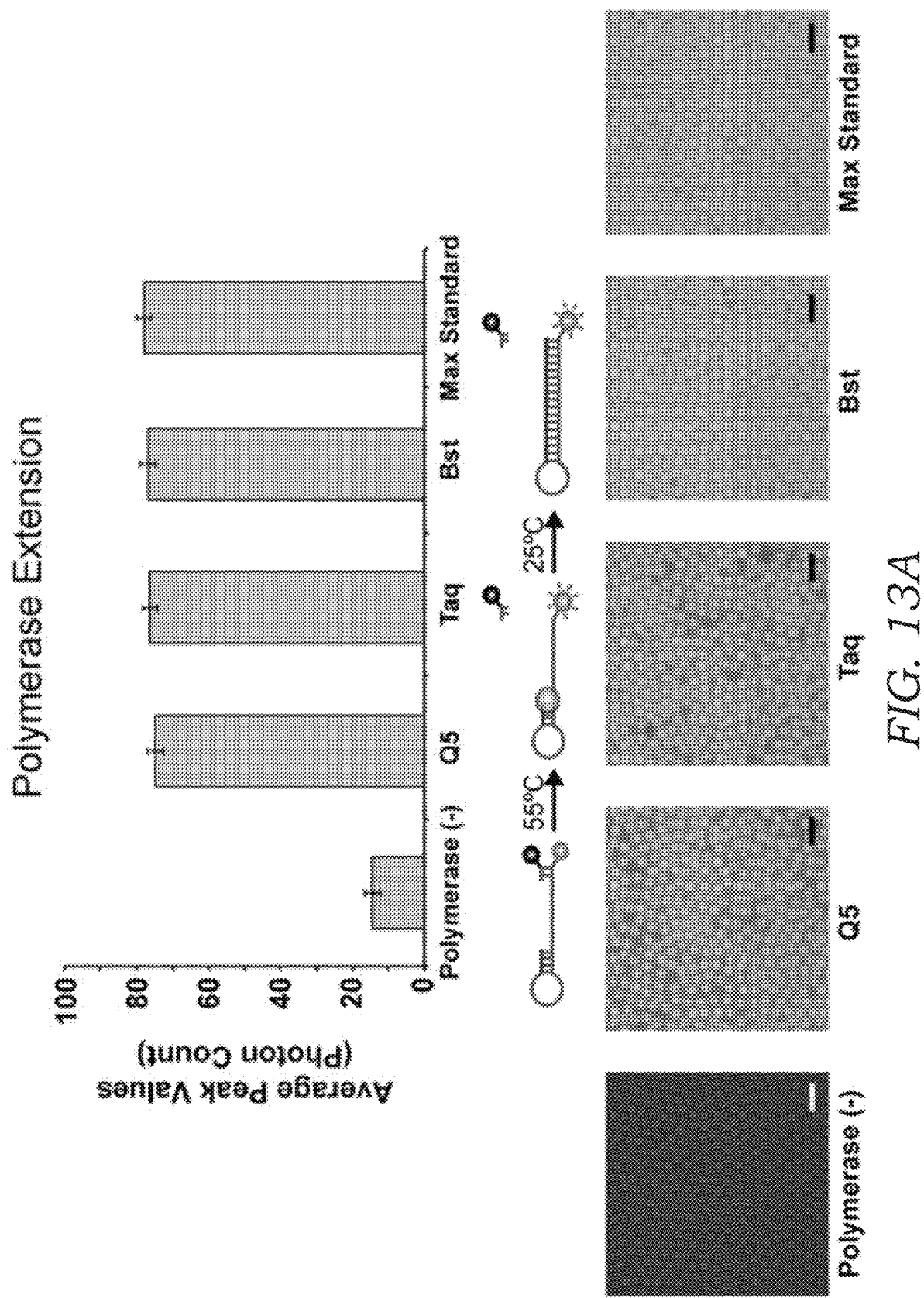
FIGS. 13A-13D illustrate optical sensors used to detect enzymatic activity in droplet microcompartments.
Figure 14C:
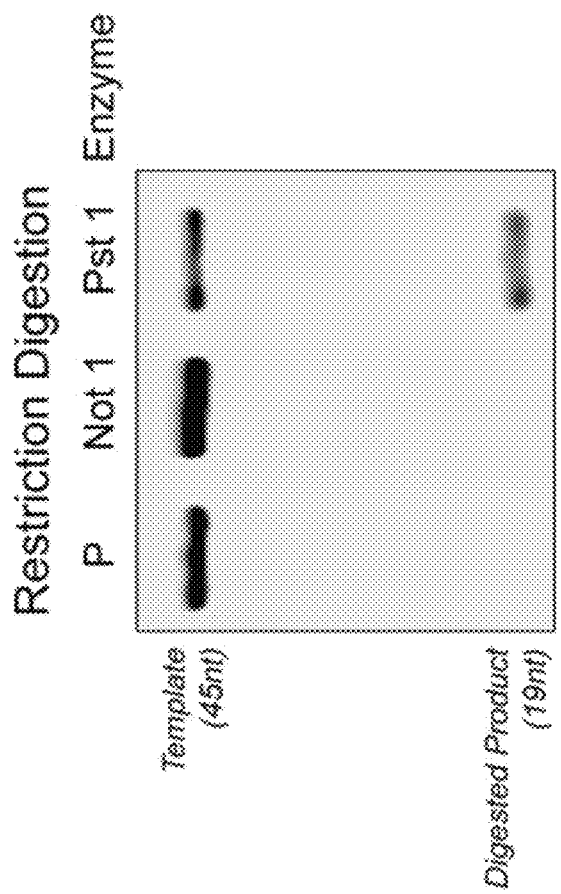

To evaluate the polymerase sensor in the context of a FADS device, three different commercial thermophilic DNA polymerases (Bst, Taq, and Q5) were encapsulated at full occupancy in droplets, incubated for 1 hour at their preferred temperature, and sorted based on their fluorescence (activity). A histogram analysis of ~$10^6$ droplet-sorting events from each polymerase population (FIG. 5a) confirms that each sample exhibits robust polymerase activity that is 95% of our synthetic full-length product (FIG. 13a). These results are in close agreement with bulk solution experiments that were assayed by denaturing polyacrylamide gel electrophoresis (PAGE) (FIG. 14a). Based on the signal intensity of our no polymerase control, the maximum SNR for this sensor is ~5.4 (Z'=0.79), which is more than sufficient to distinguish the fluorescent droplets from non-fluorescent droplets.

Figure 13B:
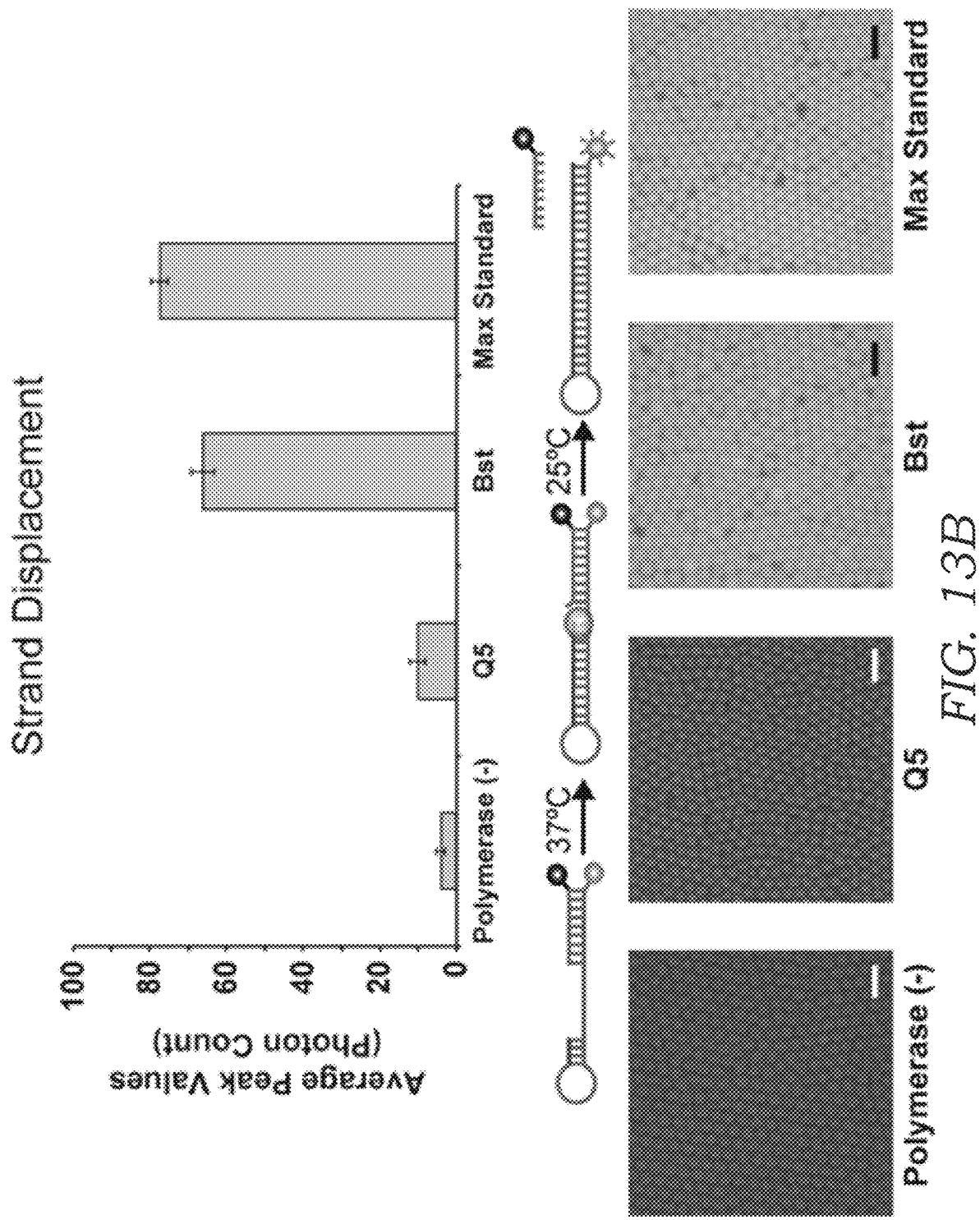
Figure 13C:
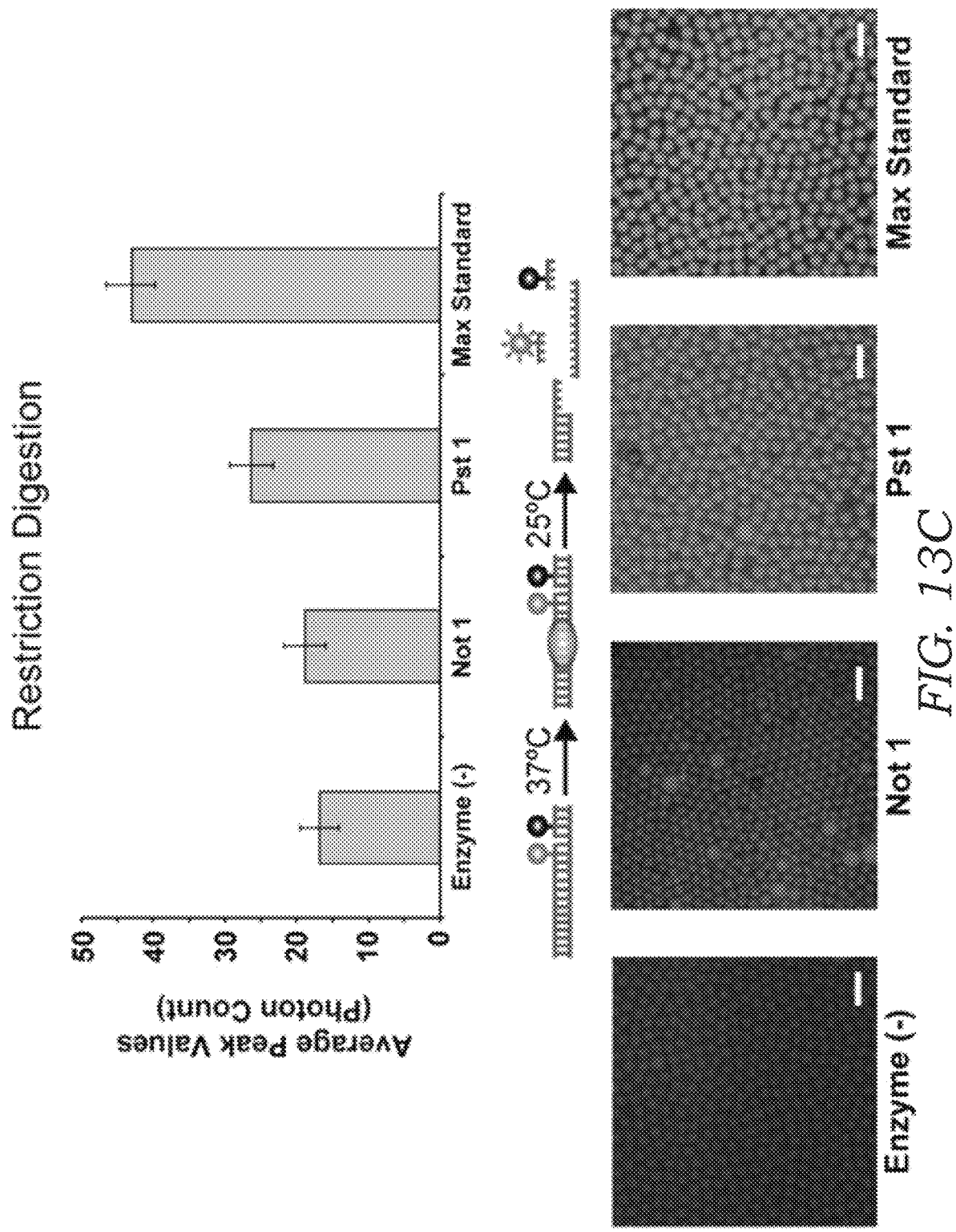

Strand displacement. DNA polymerases with strand displacement activity have found practical utility in numerous DNA amplification techniques, including loop-mediated isothermal amplification (LAMP), strand displacement amplification (SDA), helicase-dependent amplification (HDA), and the nicking enzyme amplification reaction (NEAR). These techniques are critical components of several point-of-care diagnostic tools that rely on a simple workflow, quick turnaround time, and minimal analytical instrumentation. Given the strong interest in polymerases with strand displacement activity, we sought to create an assay to promote the directed evolution of these enzymes in w/o droplets. For this application, we used a modified version of our polymerase sensor that contained a longer, more thermally stable version of the quencher strand whose displacement is needed to create a fluorescent signal. The sensor was evaluated in droplets using commercial DNA polymerases that exhibit (Bst) and lack (Q5) strand displacement activity. Analysis of ~$10^6$ droplet-sorting events from each polymerase (FIG. 14b) confirms that Bst DNA polymerase exhibits robust strand displacement activity with a cumulative droplet count that is ~85% of the max standard, while Q5 DNA polymerase is similar to the no polymerase control. These results are in close agreement with bulk solution experiments assayed by traditional PAGE (FIG. 14b). The sensor yields an SNR of ~18 (Z'=0.86) (FIG. 13b), which is 3-fold better than the polymerase sensor developed for primer-extension activity. The increased sensitivity of the strand displacement sensor is due to the higher thermal stability of the quencher strand ($\Delta\Delta G$=−42.7 kcal/mole), which is less likely to dissociate from the template at room temperature than the shorter strand developed for standard primer-extension activity.

Figure 5A:
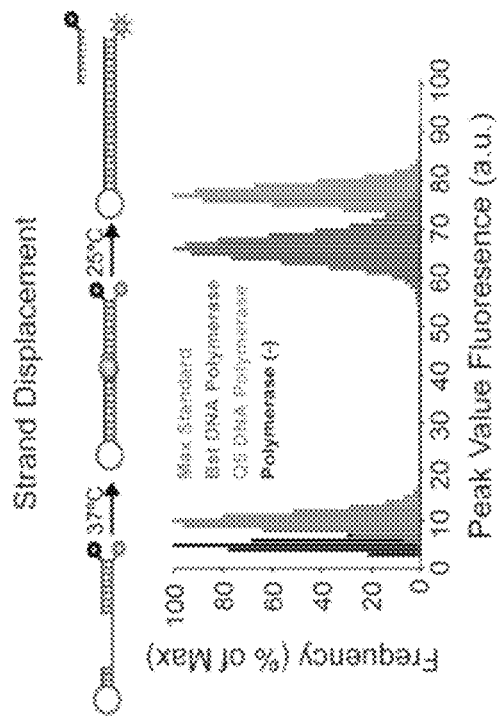
FIGS. 5A-5D are plots of the distribution of peak droplet fluorescence for each population for testing data of different optical sensing modalities for droplet sorting based on DNA modifying enzymes.
Figure 5B:
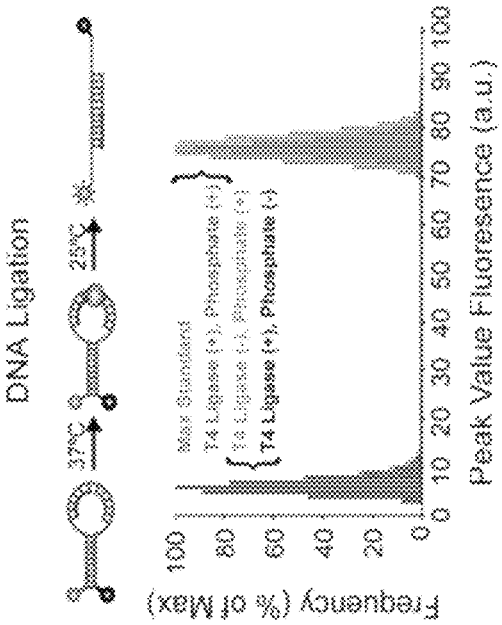
Figure 5C:
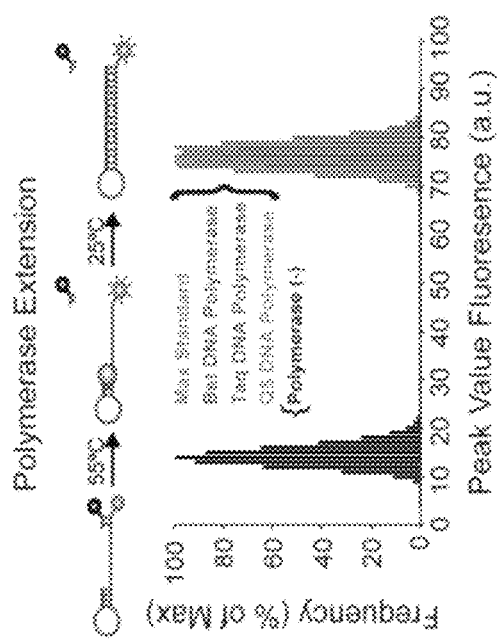
Figure 5D:
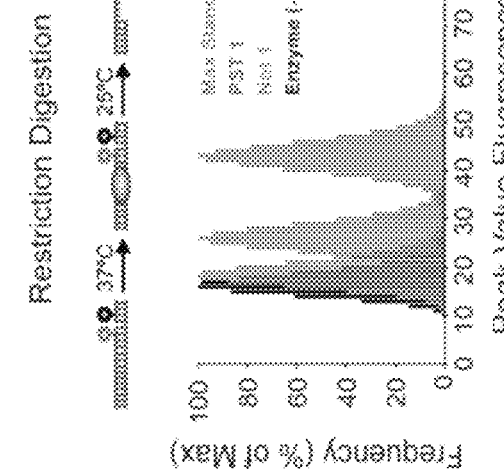
Figure 6:
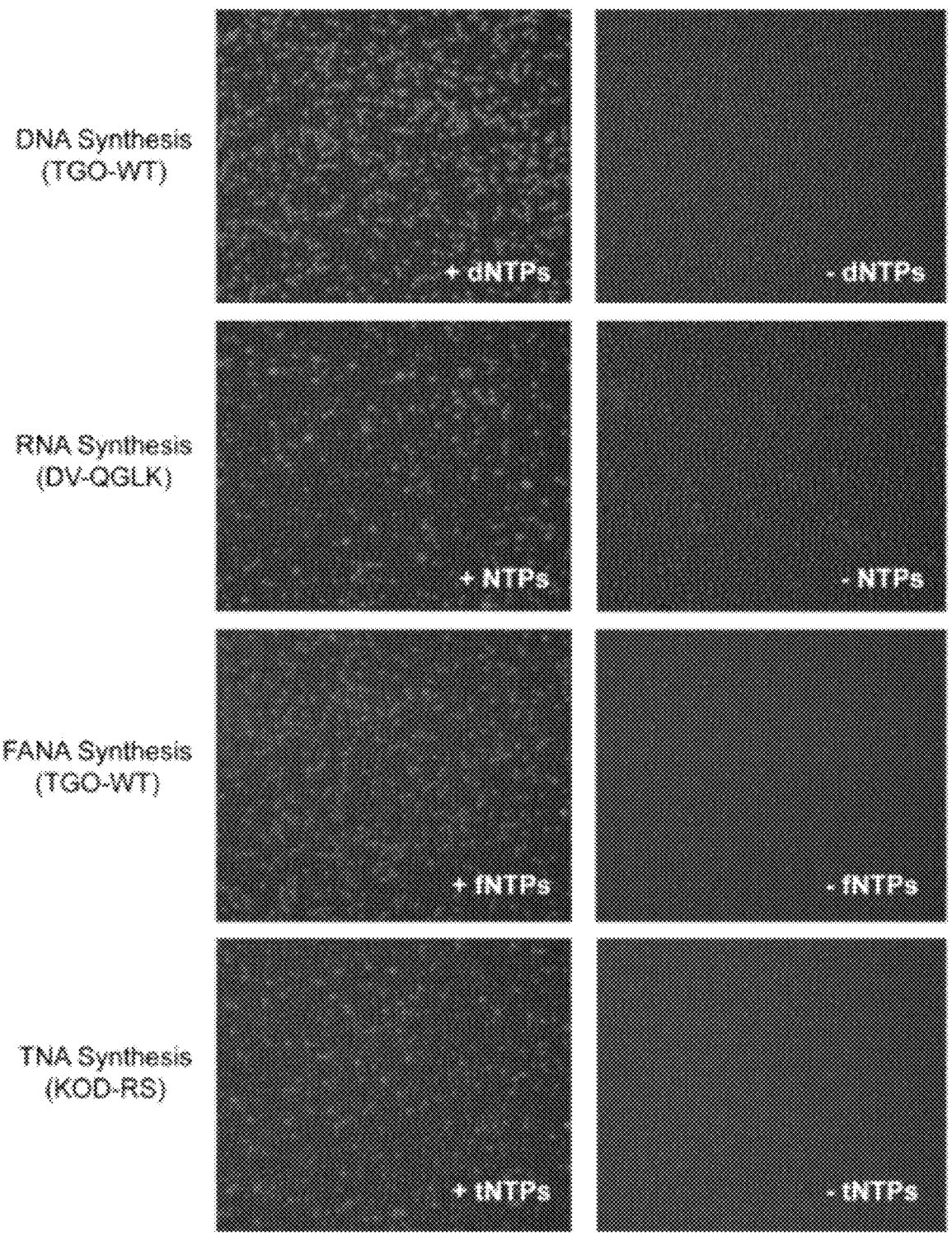
FIG. 6 illustrates polymerase-mediated synthesis of natural, non-cognate, and xeno-nucleic acid polymers in uniform droplet microcompartments. $E.$ $coli$ expressing natural and engineered polymerases were encapsulated in droplet microcompartments, lysed, and assayed for polymerase activity in the presence (left) and absence (right) of the appropriate nucleoside triphosphate. Enzymatic activities include (a) TGOmediated DNA synthesis; (b) DV-QGLK-mediated RNA synthesis, (c) TGO-WT-mediated FANA synthesis, and (d) KOD-RS-mediated TNA synthesis. The absence of florescence in the no nucleoside triphosphate controls demonstrates that endogenous $E.$ $coli$ nucleotides do not interfere with polymerase activity.

Restriction digestion. Restriction endonucleases catalyze the sequence-specific double-stranded cleavage of DNA to produce cut DNA products with blunt or sticky-ends. These enzymes are commonly used for cloning and plasmid linearization. Because the evolution of enzymes with custom restriction endonuclease activity is an attractive area of research, we adapted an optical sensor that was previously developed for use in bulk solution. Accordingly, the sensor consists of a nicked duplex in which enzymatic activity disrupts a fluorophore-quencher pair adjacent to the digestion site (FIG. 5c). Using a sensor that was engineered to contain a Pst I nuclease digestion site, we measured the strand cleavage activity of two commercial DNA endonucleases (Pst I and Not I) in droplets. A histogram produced from ~$10^6$ droplet-sorting events (FIG. 5c) indicates that Pst I is specific for the Pst I nuclease digestion site, with Not I indistinguishable from the no enzyme control. The sensor produced a modest SNR of 2.6 (Z'=0.29), which is consistent with a 50% cleavage rate observed in bulk solution (FIG. 14c) and agrees with manufacturer specifications.

Figure 13D:
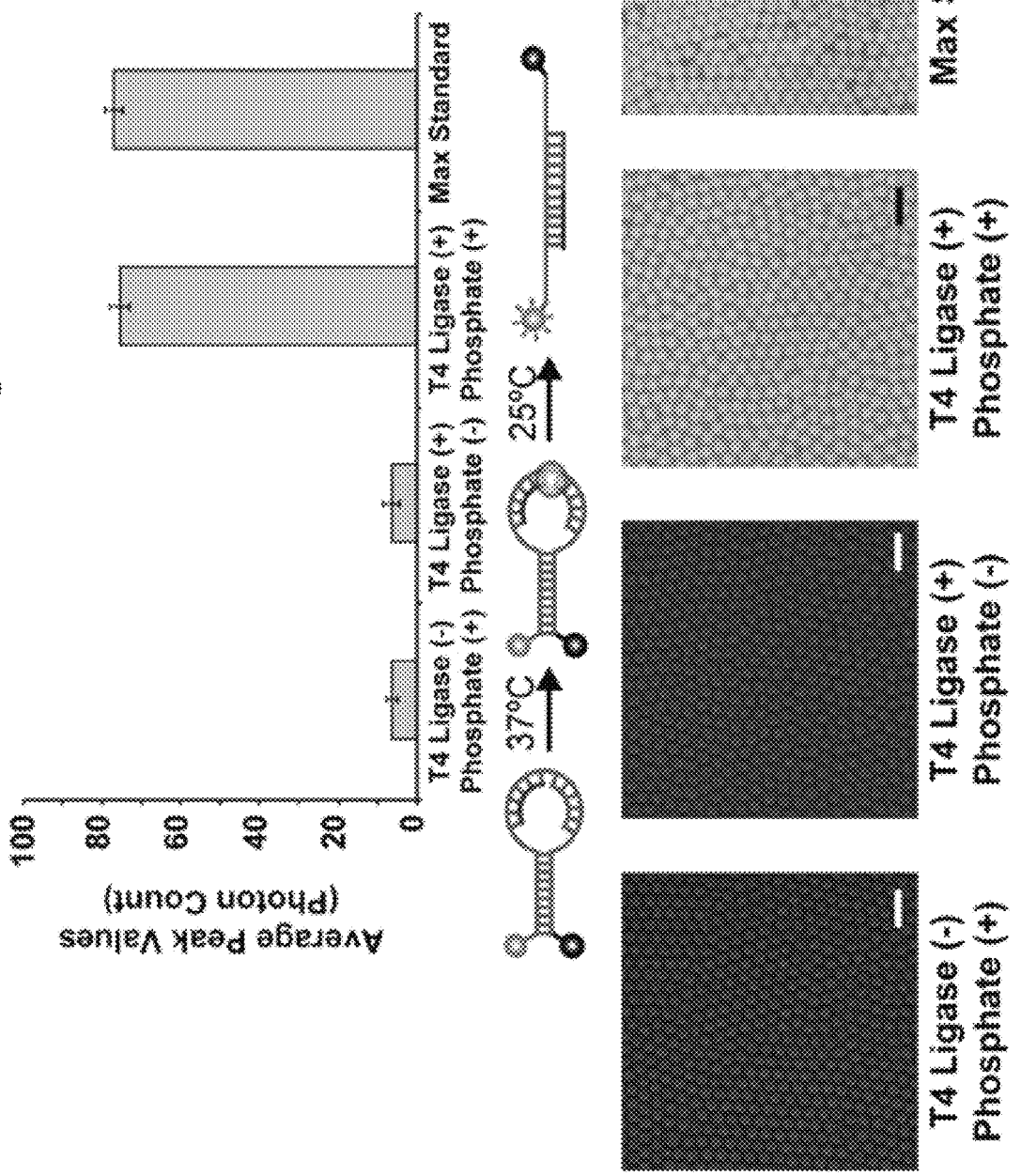
Figure 15:
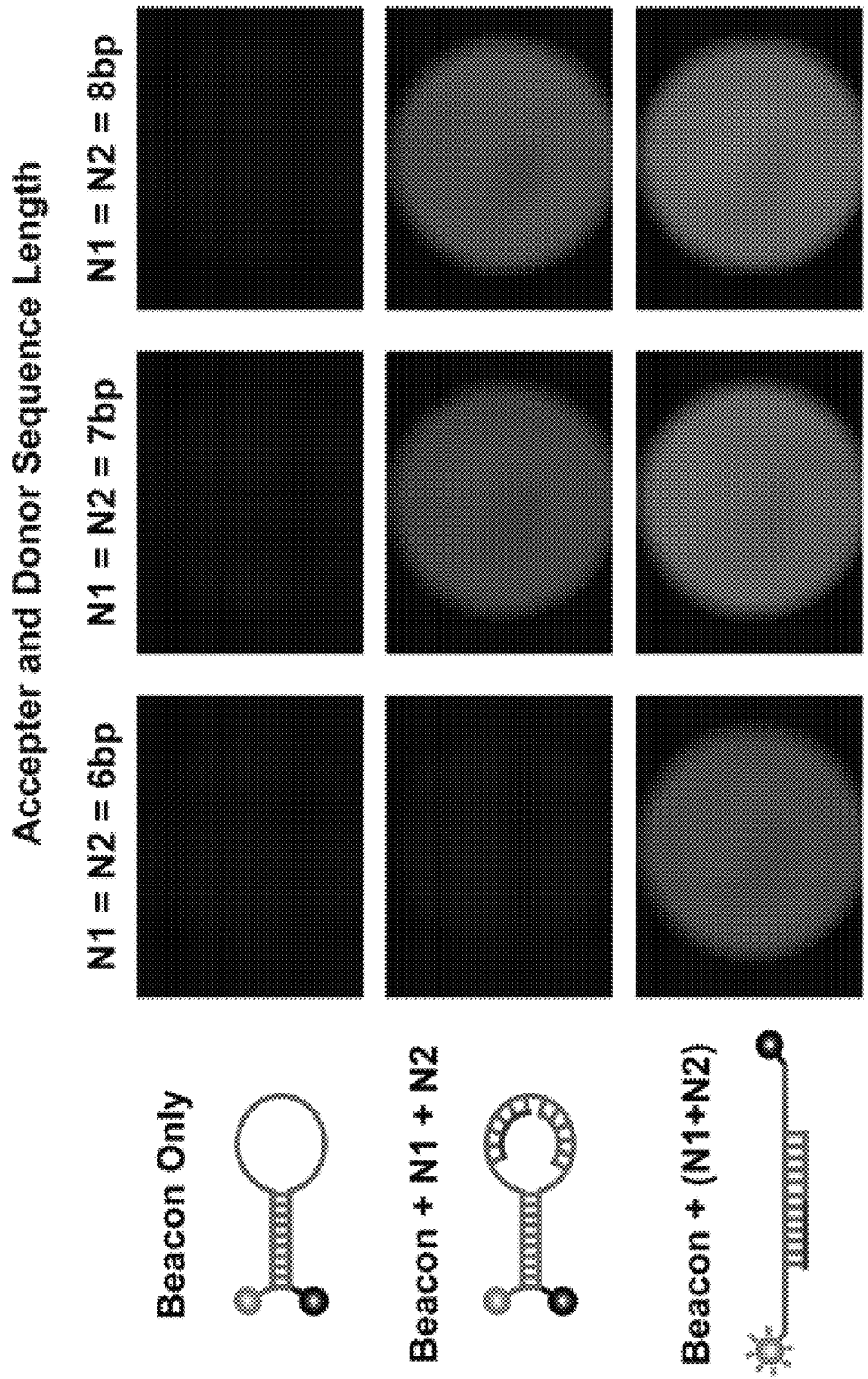
FIG. 15 illustrates identifying optimal substrate lengths for the DNA ligase sensor. The SNR of the ligase sensor was evaluated for different donor and acceptor oligonucleotide lengths by fluorescence microscopy. Fluorescent images of the beacon only (top row), the beacon with different length donor/acceptor strands (middle row), and the beacon with chemically synthesized full-length product (bottom row). Donor and acceptor lengths of 6 nts allow the molecular beacon to function with optimal fluorescence activity. Longer substrate lengths lead to unwanted fluorescence of the unligated complex.
Figure 16:
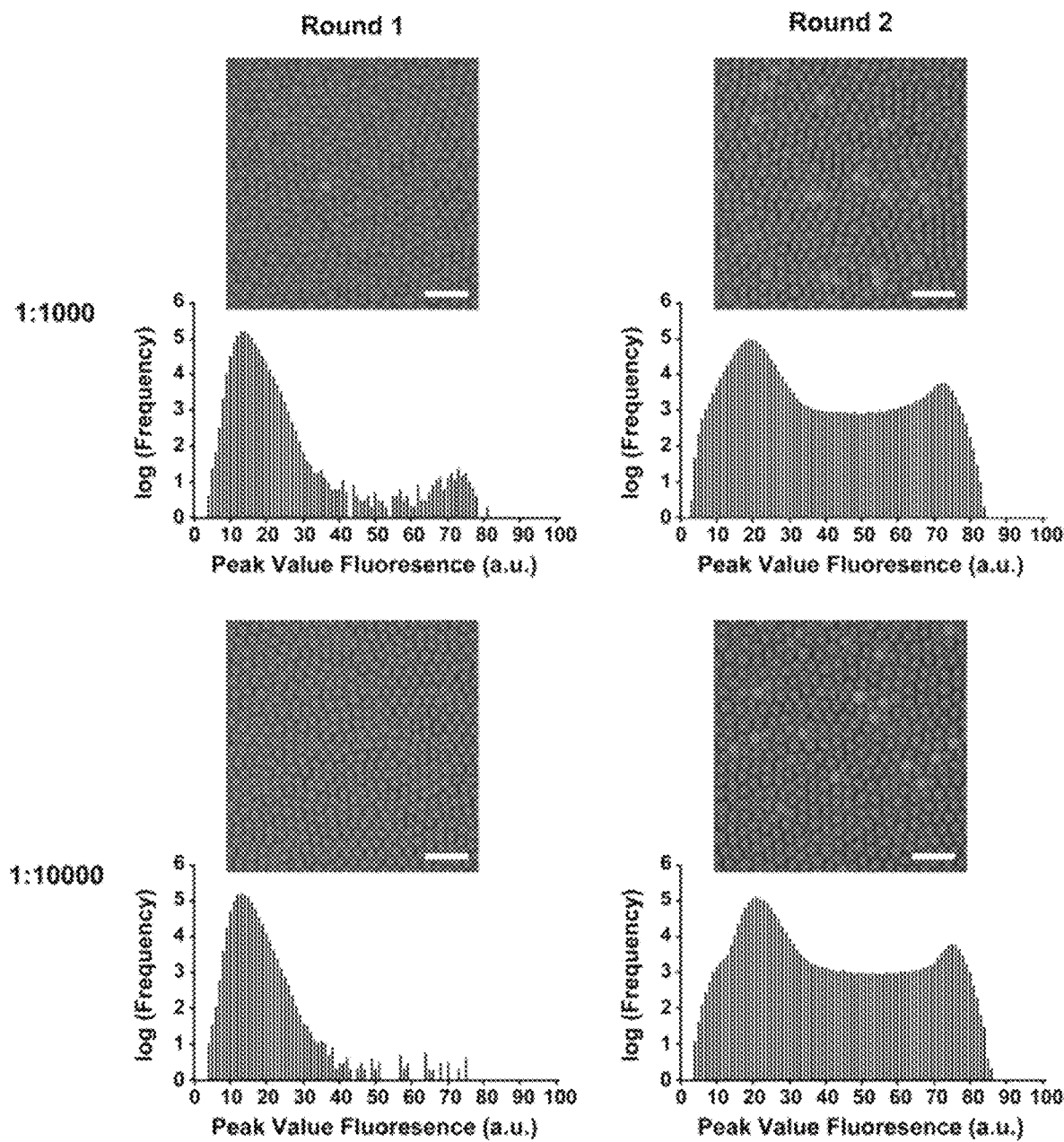
FIG. 16 illustrates images and peak fluorescence distributions for naïve (round 1, left) and enriched (round 2, right) droplet encapsulated populations of KOD-wt expressing *E. coli* spiked into populations of *E. coli* expressing KOD-D542G null mutant at ratios of 1:1000 (top) and 1:10000 (bottom). The scale bars for FIG. 16 are 75 µm.
Figure 17A:
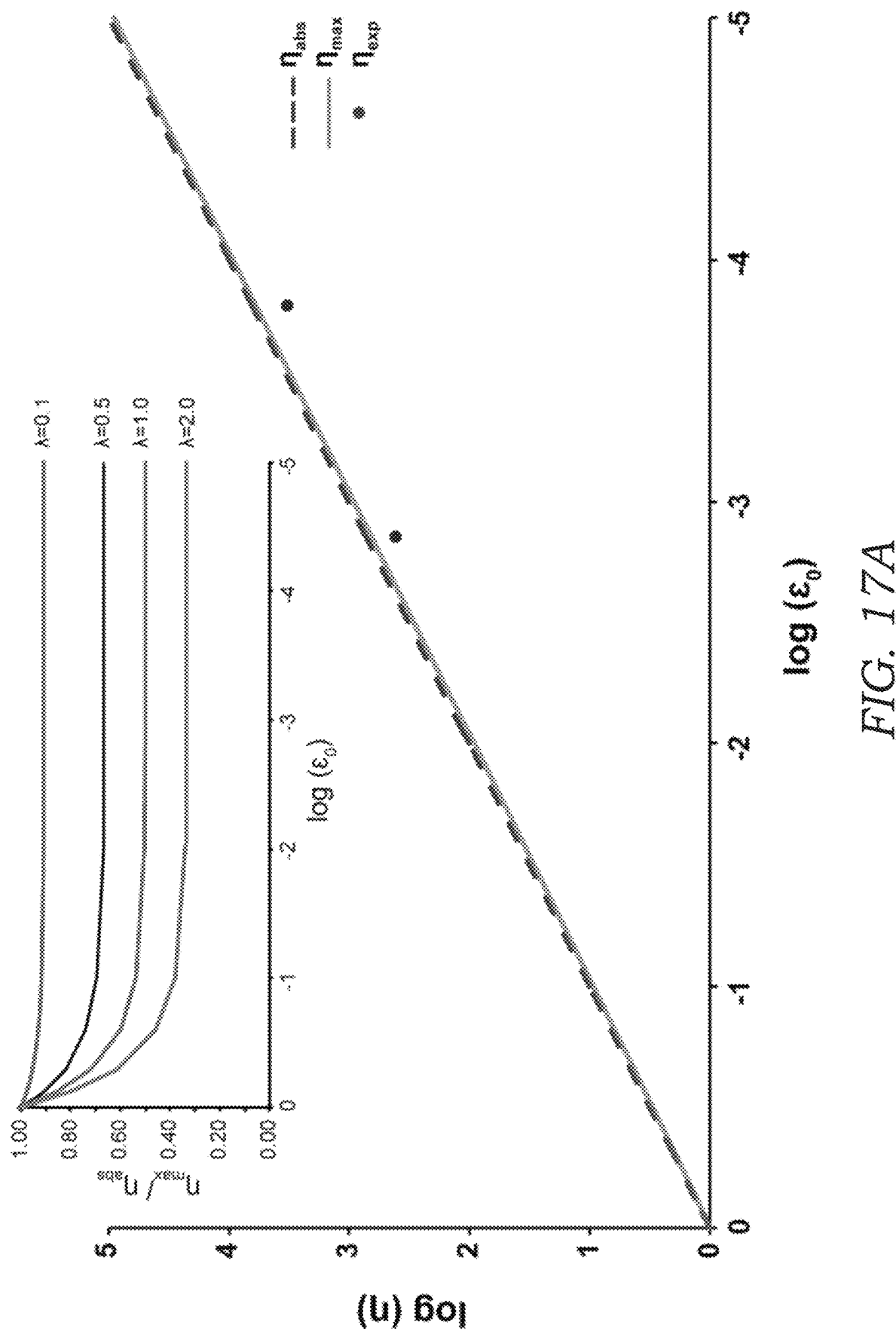
FIG. 17A is a plot of absolute maximum enrichment ($\eta_{abs}$) and theoretical maximum enrichment ($\eta_{max}$, $\lambda$=0.1) over a range of $\varepsilon_0$. Enrichment values measured with the FADS system are plotted for $\varepsilon_0$=1/1000, and 1/10000. Inset plots the ratio of the $\eta_{max}$ to $\eta_{abs}$ vs. $\varepsilon_0$ for $\lambda$=0.1, 0.5, 1, and 2, which can also be interpreted as the maximum $\varepsilon_1$ that can be achieved with a given $\varepsilon_0$. As $\varepsilon_0$ approaches 1, $\eta_{max}$ approaches $\eta_{abs}$, and as $\varepsilon_0$ becomes increasingly small, $\eta_{max}$ approaches a finite value that decreases with increasing $\lambda$, meaning the maximum degree to which a population can be enriched decreases for a given $\varepsilon_0$ as $\lambda$ increases.

DNA ligation. Ligases are critical for a variety of biotechnology applications, including cloning and next-generation DNA sequencing (NGS). We therefore adapted a previous DNA ligase sensor to function in microfluidic droplets. The sensor is based on a molecular beacon design with two short substrates annealed to the loop region of a DNA stem-loop structure. Enzymes that ligate the two DNA strands together produce a fluorescent signal by converting the stem-loop into a linear duplex that separates the donor-quencher pair. We evaluated the activity of the sensor in droplets using T4 DNA ligase (FIG. 13d). Analysis of ~$10^6$ droplet-sorting events demonstrates that the enzyme functions with high activity, producing fluorescent values equivalent to the synthetic standard (SNR of ~12, Z'=0.84, FIG. 13d). Notably, the sensor fluorescence in droplets lacking the enzyme or lacking a phosphorylated substrate remained quenched. Interestingly, we found that the ligase sensor is highly sensitive to the length of the acceptor and donor strands (FIG. 15), which required careful optimization to create a high activity sensor.

Polymerase-Mediated DNA, RNA, and XNA Synthesis from *E. Coli* Generated Enzymes Engineering DNA polymerases to synthesize nucleic acid polymers with backbone structures that are distinct from those found in nature has enabled the evolution of affinity reagents (aptamers) and catalysts that are resistant to nuclease digestion. However, substantially more work is needed to establish new examples of engineered polymerases that recognize different XNA polymers. To demonstrate how researchers could evolve new examples of XNA polymerases, we encapsulated populations of *E. coli* cells expressing three different types of thermophilic polymerases in w/o droplets. The set of polymerases included a natural DNA polymerase isolated from the bacterial species *Thermococcus gorgonarius* (Tgo) that synthesizes DNA and coincidentally a close structural analog of DNA known as 2'-fluoroarabino nucleic acid (FANA), a DNA polymerase (DV-QGLK) that was engineered to synthesize RNA, and a DNA polymerase (Kod-RS) that was engineered to synthesize threose nucleic acid (TNA). In each case, *E. coli* cells expressing these enzymes were encapsulated in w/o droplets with the polymerase sensor responsive to primer-extension activity and the correct set of nucleoside triphosphates (dNTPs, NTPs, FANA-NTPs, and tNTPs), heat lysed, and incubated for 18 hours at 55° C. Fluorescent microscope images collected afterwards reveal a strong fluorescence dependence on the presence of nucleoside triphosphates that are supplied ex vivo, as droplets lacking nucleoside triphosphates remain dim. Importantly, this result demonstrates that endogenous nucleoside triphosphates (dNTPs and NTPs) from the *E. coli* host are present at insufficient quantities to produce a false positive signal, confirming that polymerase engineering in microfluidic droplets can proceed without interference from endogenous substrates.

Mock Enrichment Assay for DNA Synthesis Activity

The performance of the FADS system was evaluated by performing a mock selection designed to enrich for droplets with recombinant DNA polymerase activity. *E. coli* cells expressing wild-type Kod DNA polymerase (KOD-wt) and a null mutant (KOD-null) containing the D542G mutation in the enzyme active site were mixed at a molar ratio of 1:1000 and 1:10000 (active to inactive variants). The *E. coli* populations were separately encapsulated in microfluidic droplets with the polymerase sensor and substrates necessary for primer-extension activity, heat lysed, incubated en masse (1 h, 55° C.), and individual droplets were sorted for DNA synthesis activity using the FADS device. Plasmids from positively sorted droplets were isolated, the gene-coding region was amplified by PCR and the expression vector was reconstructed by Gibson assembly, transformed into fresh *E. coli*, grown to confluency, and induced to express a new population of *E. coli* cells that had been enriched in polymerases with DNA synthesis activity. The regenerated population of *E. coli* were encapsulated in microfluidic droplets along with the sensor, buffer, and dNTP substrates, and the number of fluorescent droplets were counted by flowing the enriched droplet population through the FADS system.

Figures 7, 8:
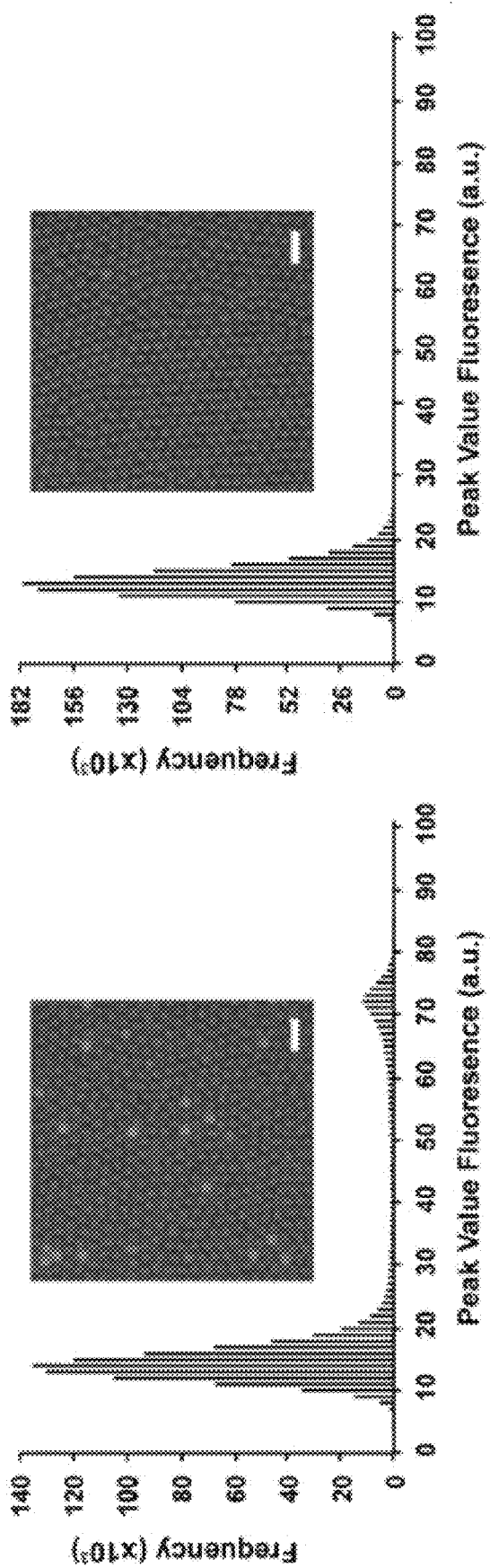
FIG. 7 illustrates enrichment assay based on DNA polymerase activity. Images and distributions of peak fluorescence for clonal populations of $E.$ $coli$ expressing wild-type KOD DNA polymerase (left) and a null mutant KOD-D542G (right) encapsulated in droplets. The scale bars in FIG. 7 are 50 µm.
FIG. 8 illustrates tabulated results and theoretical enrichment values. $E.$ $coli$ expressing wild-type KOD DNA polymerase were spiked at cellular ratios of 1:1000 and 1:10000 into a population of $E.$ $coli$ expressing the null mutant KOD-D542G. $\varepsilon 0$ and $\varepsilon 1$ represent the fraction of KOD-wt expressing cells in the starting and sorted populations, respectively. Raw $\varepsilon 0$ and $\varepsilon 1$ values were normalized using experimentally determined false negative and false positive rates obtained from the clonal populations. Experimental enrichment ($\eta exp$) is a ratio of $\varepsilon 1,norm/\varepsilon 0,norm$. The absolute enrichment ($\eta abs$) is $1/\varepsilon 0,norm$, while the maximum theoretical enrichment ($\eta max$) is mathematically derived based on Poisson statistics.

The enrichment values were carefully measured for both doped library populations using flow data obtained from the droplet sorting instrument (~$10^6$ droplets per experiment). These experiments were performed separately from the actual droplet sorting experiments, which involved ~$10^7$ droplets for each doped library. Analysis of homogeneous populations of wild-type and null mutant polymerase reveal that the false negative rate is ~2% and false positive rate is ~0.005% (FIG. 7). Evaluation of the starting populations before selection reveals that the two doped libraries contain 1 in 722 and 1 in 6447 active to inactive members, which approximates the anticipated doping levels of 1:1000 and 1:10000 and provides the upper limit for an absolute enrichment value (FIG. 8). However, one should keep in mind that the true maximum enrichment value is slightly less due to Poisson loading of the *E. coli* into the droplets, which allows for a small number of co-encapsulation events where a positively sorted droplet could contain more than one *E. coli* cell. Analysis of both libraries indicates that after 1 round of selection, ~50-55% of the *E. coli* containing droplets have functional enzymes. This corresponds to enrichment values of 407- and 3227-fold for the 1:1000 and 1:10000 doped libraries, respectively, which is close to the theoretic maximum enrichment values of 656- and 5861-fold, respectively, calculated using Poison statistics of experimentally determined encapsulation values (FIG. 8 and FIGS. 16, 17a, 17b). These levels are sufficient to allow for both purity and yield sorting depending on the needs of the experiment.

Discussion

A microfluidic-based droplet sorting platform has been described that enables the directed evolution of DNA processing enzymes. In contrast to previous droplet sorting approaches, our methodology is specifically tailored for applications that involve the development of artificial genetic polymers for synthetic biology. A key aspect of the approach was the design and validation of four different fluorescent sensors that transduce various polymerase activities (normal primer extension and primer-extension with downstream strand displacement), as well as ligase and restriction endonuclease activity inside w/o droplets. Apart from the restriction endonuclease sensor, each sensor functions with a Z' of 0.79-0.86, indicating exceptional statistical discrimination as assays of biological activity. Although the lower quality of the endonuclease activity assay would normally preclude its use in a standard-scale high-throughput protein engineering, the ultra-miniaturized scale of the FADS system makes implementation of the assay as it stands relatively risk-free, only highlighting a potential risk for increased false positive rate. Collectively, these activities represent the core functional units of the molecular biology toolkit, which impacts nearly every area of healthcare research from drug discovery to personalized medicine.

The platform facilitates the production of a monodisperse population of small (20 μm diameter) droplets at a frequency of 30 kHz (>100 million droplets per hour) using a highly stable dripping regime that can be maintained for a standard work day. However, in practice, most droplet production runs are complete after just 1 hour, as a population of $10^8$ droplets is more than sufficient for typical directed evolution experiments. Although *E. coli* as a protein expression system was utilized for delivering recombinant enzymes to the microfluidic compartment, the technology platform is compatible with coupled cell-free transcription and translation (TNT) systems. (See, e.g., Murray, C. J.; Baliga, R. *Curr. Opin. Chem. Biol.* 2013, 17, 420-6; Hartsough, E. M.; Shah, P.; Larsen, A. C.; Chaput, J. C. *Biotechniques* 2015, 59, 149-51). The one exception is polymerase engineering where dNTP and NTP substrates interfere with the selection. Relative to commercial TNT systems, *E. coli* benefits from lower reagent costs, ease of production, and user-friendly methods for storing engineered cell lines as glycerol stocks. An additional benefit is the fact that DNA plasmids provide a convenient format that allows for the immediate expression, purification, and characterization of selected variants.

Once the enzymes have been released from the *E. coli* and allowed to react with the fluorescent sensor, the sorting device is used to screen fluorescent droplets at a rate of 3 kHz (10 million droplets per hour). This frequency compares favorably with automated liquid handling robots that screen $10^6$ samples in a 2-3 days but require far greater cost and sample volume. Custom software allows for user-defined parameters in which droplet threshold is set based on photon counts and residence time. The ability to adjust the fluorescent droplet parameters allows for high instrument sensitivity and makes it possible to establish droplet thresholds that are specific for different optical sensors and enzymatic applications. Through iterative design-build-test cycles, we were able to show that the optimal droplet sorting device reduces the frequency of non-fluorescent droplets in the sorted pool to values that are less than 1 in 10,000 positively sorted droplets. This number is more than sufficient to meet the needs of most droplet sorting experiments involving enzymes that are used to replicate and modify XNAs.

Single cell directed evolution experiments that utilize *E. coli* as a protein expression system face stochastic problems that can limit the enrichment of functional enzymes during the first few rounds of selection. These include differences in protein expression levels between individual *E. coli* cells, differences in the release of the enzyme into the surrounding droplet, and the failure of some enzymes to react with enough substrate molecules to produce a strong fluorescent signal. It should be noted that recombinant enzymes expressed in *E. coli* are diluted ~1000-fold when they enter the droplet compartment. This is generally not a problem for natural enzymes which have been evolved by natural selection to recognize their substrates with high catalytic efficiency. However, the same is not true for enzyme libraries which typically function with reduced activity and protein stability. For this reason, it is important to ensure that the optical sensor functions with a high SNR and to adjust the droplet sorting parameters accordingly to ensure that enough droplets are selected to enable efficient recovery and amplification of the positively sorted library.

Although FACS-based sorting of double-emulsion droplets provides a user-friendly approach for performing directed evolution experiments in microfluidic droplets, custom FADS-instruments offer a number of unique advantages. First, FADS instruments utilize single-emulsion droplets, which are easier to produce and significantly more stable than double-emulsion droplets. Second, the higher stability of single emulsion droplets reduces the level of background contamination in positively sorted droplets, as single emulsion droplets are less prone to self-lysing. Third, FADS-based sorting is specifically designed for droplet sorting applications while FACS-based sorting was designed for eukaryotic cells, and later adapted for droplet sorting applications. In the case of small w/o droplets, it is unlikely that FACS instruments will be able to sort individual droplets. Fourth, FADS provides a higher partitioning efficiency than w/o/w sorting in FACS, as microfluidic devices are specifically engineered for the size and charge of single emulsion droplets. Fifth, high speed cameras enable researchers to visualize each droplet sorting event, which is not possible with FACS. Last, FADS devices offer a cheaper alternative to conventional FACS instruments by accelerating the pace of research with a dedicated instrument for directed evolution.

We anticipate that directed evolution using FADS will make it possible to address real-world applications that currently limit the fields of synthetic biology, biotechnology, and molecular medicine. In the area of polymerase engineering, we expect FADS-based instruments to increase the speed at which new polymerases are developed that can faithfully copy genetic information back and forth between DNA and XNA. Current XNA polymerases, by contrast, function with reduced catalytic activity and fidelity as compared to their natural counterparts. By analogy, the same methodology could also be used to evolve enhanced DNA and RNA polymerases for NGS applications that involve modified substrates or require long read lengths. Similarly, polymerases with reverse-transcriptase activity could be developed that are better suited for structured RNA molecules that cause existing polymerases to stall. In the area of ligases, we expect to see an emergence of activities that allow engineered ligases to synthesize XNA strands on lengths and scales that are currently not possible by solid-phase synthesis. These same techniques could be used to improve the quality of DNA ligases that are currently used to barcode NGS libraries, which suffer from sequence-bias. Last, the ability to rapidly search vast regions of sequence space makes FADS perfectly suited for discovering polymerases that can replicate XNA independent of DNA. This last application would have a dramatic impact on synthetic biology projects that utilize XNA polymers by providing a convenient method for amplifying XNA directly without conversion to DNA.

In summary, this work presents a single-droplet sorting instrument and fluorescent sensors that enable the directed evolution of enzymes that can synthesize and modify artificial genetic polymers. Because of the flexibility of the technology, the same methodology developed for XNA could also be used to optimize natural enzymes that synthesize and modify DNA and RNA. Such projects open the door to custom enzymes for synthetic biology, biotechnology, and molecular medicine.

Materials and Reagents

DNA oligonucleotides (see table of FIG. 19) were purchased from Integrated DNA Technologies (Coralville, Iowa). TNA triphosphates were chemically synthesized. Oligonucleotides were quantified by UV absorbance with a NANODROP™ 2000 (Thermofisher Scientific, Waltham, Mass.). All commercial buffers, enzymes, and the Q5 site-directed mutagenesis kit were purchased from New England Biolabs (Ipswich, MA), unless otherwise noted. Chemical reagents, including dNTPs, were purchased from Sigma Aldrich (St. Louis, Missouri). Ethylenediaminetetraacetic acid (EDTA), urea, acrylamide, and bis-acrylamide were purchased from Thermofisher Scientific. Tetramethylethylenediamine (TEMED) and Mini-PROTEAN precast gels were purchased from Bio-Rad (Hercules, California). Poly (dimethyl) siloxane (PDMS) base and curing agent was purchased from Dow Corning (Midland, MI). SU-8 2010 and 2025 photoresists (Microchem, Westborough, MA) were purchased from Fisher Scientific (Hampton, NH). 3-inch silicon wafers were purchased from the Polishing Corp. of America (Santa Clara, CA). (Tridecafluoro-1,1,2, 2-tetrahydrooctyl) trichlorosilane (CAS: 78560-45-9, SIT8174.0) was purchased from Gelest Inc. (Morrisville, PA). Fluorinated oil HFE-7500 was purchased from 3M NOVEC™ (St Paul, MN), and Pico-Surf™ 1 surfactant, Pico-Glide™ 1, and Pico-Break™ 1 were all purchased from Dolomite Microfluidics (UK). All dichroic mirrors and optical filters were purchased from Semrock (Rochester, New York). Photon counting photomultiplier tubes (PMTs) were purchased from Hamamatsu Photonics (Model# H7828, Japan).

Optical Setup and Image Acquisition

An inverted epi-fluorescence microscope (Ti-S, Nikon, Japan) was used to monitor droplet production and fluorescent microscopy analysis. Fluorescence activated droplet sorting (FADS) was monitored and controlled using a custom laser-induced fluorescent (LIF) microscope constructed from Thorlab (Newton, NJ) components. A high-speed camera (VEO-410S Phantom, Vision Research) was used to collect video and image data and ImageJ (NIH) was used for analysis. PAGE gels were visualized using a LI-COR Oddyssey CLx Imager (LI-COR Biosciences, Lincoln, NE).

Microfluidic Device Design and Fabrication

All microfluidic devices were fabricated in PDMS (Sylgard 184) using standard soft lithography techniques (FIG. 9a, 9b). Channel geometries were designed in AutoCAD (Autodesk), with colors and layers added after importing into Adobe Illustrator (Adobe). Designs were printed on a transparency mask at 20,000 dpi by CAD/Art Services (Bandon, Oreg.). All master molds were fabricated in a class 1000 cleanroom (FIG. 9a). All wafers were pretreated for 1 min in either 2% hydrofluoric acid, or 6:1 Buffered Oxide Etch (BOE) to remove the surface oxide layer, washed in Di $H_2O$, dried with pressured air, and dehydrated in a 120° C.

oven for 15 mins or on a 120° C. hot plate for 5 mins. For the single layer droplet generator, the 3-inch silicon wafer was spin-coated with a 20 μm thick layer of SU-8 2025 photoresist, and patterned with a photomask through exposure to UV light (350 nm-450 nm). For the 2-layer droplet sorter, SU-8 2010 was used to create both layers (10 μm and 20 μm) forming a maximum channel height of 30 μm. Briefly, after the first layer was patterned and baked, the second layer was spin-coated on top of the first layer and soft baked. The alignment marks on the first layer were revealed using acetone, and the $2^{nd}$ layer photo mask was aligned to the $1^{st}$ layer channel features on the wafer using a Karl Suss MA56 Mask Aligner (SUSS MicrotTec, Germany). After the final exposure, wafers were baked at 95° C., and then submerged in SU-8 developer to remove the unexposed photoresist. The remaining SU-8 formed the positive channel features. Wafers were then hard-baked at 150° C. for 5 min to harden, smooth, and improve SU-8 adhesion.

Silicon wafers were then treated with tridecafluoro-1,1, 2,2-tetrahydrooctyl) trichlorosilane in a vacuum chamber for 1 hour to reduce PDMS adhesion. PDMS was mixed at a ratio of 10:1 (w/w) pre-polymer base to curing agent, degassed for at least 30 mins, and then poured onto the patterned silicon wafer. The polymer mixture was cured at 65° C. overnight. After curing, devices were cut out and peeled off of the wafer, and inlet/outlet tubing holes were punctured into the device using disposable biopsy punches (1.5 mm, Integra™ Miltex®). PDMS chips were then cleaned with compressed $N_2$ and tape and concurrently air plasma treated (Harrick Scientific, NY) with pre-cleaned (100% IPA) glass slides (Corning Inc., Corning, NY) at 300 mTorr (30-60 sec per device) to allow for irreversible bonding (FIG. 9b). Following plasma treatment, devices were surface treated to create fluorophilic channel walls. Channels were filled with <1 μL Pico-Glide and incubated for 1 hr at room temperature. Channels were then washed with Fluorinert FC-40 (Sigma-Aldrich), followed by a stream of nitrogen gas to dry. Chips were then incubated overnight at 120° C.

Microfluidic Reagent Delivery and Droplet Collection

All aqueous and oil solutions were sealed in 1.5 mL screw-cap plastic micro-centrifuge tubes (Sigma-Aldrich) and delivery was controlled by pressure driven flow with custom LabVIEW software (National Instruments, Austin, TX). Reagent vials consisted of two lengths of Tygon tubing (OD: 1.52 mm, ID: 0.51 mm, EW-06419-01, Cole-Parmer, Vernon Hills, IL) inserted through two holes drilled into the caps of the micro-centrifuge tubes and glued into place to create an airtight seal. One length of tubing remained in the pressure headspace above the reagent and was connected at the other end to a SMC ITV0011-2UMS digital pressure regulator (Automation Distribution, Hatfield, PA). Another length of tubing was submerged in the reagent solution with the other end connected to the appropriate inlet of the microfluidic device. Applying a positive pressure to the reagent vial by the SMC digital regulator caused fluid to be driven into the channels of the microfluidic device. A length of Tygon tubing was also inserted in the outlet and placed in a micro-centrifuge tube for droplet collection. During production, droplets were collected under a layer of light mineral oil (~200-300 μL) in 1.5 mL plastic micro-centrifuge tubes. The FADS system generated considerable amounts of oil from both the collection and waste outlets, necessitating the use of 5 mL screw cap vials (USA Scientific, Ocala, Florida) for droplet collection. In the FADS system, droplets tended to remain at the highest point of the collection tubing until forced out with air.

Formation of Single Emulsion Droplets

Emulsions were produced using custom PDMS chips (FIG. 11a) utilizing a flow focusing geometry. The aqueous phase contained the E. coli (expressing enzyme) or commercial enzyme and any associated activity assay reagents. A second design (FIG. 11a, right) allowed cells to be co-encapsulated with a lysis agent to promote chemical or enzymatic lysis only following encapsulation. Co-encapsulation was accomplished by co-flowing two solutions, one containing the cells, and the other containing the lysis agent, for a short time before encapsulation. The aqueous phase was sheared by a continuous phase consisting of a low-viscosity fluorinated oil (HFE-7500, 3M NOVEC™) containing 1-2% (w/w) Pico-Surf surfactant (Dolomite Microfluidics, UK). Pressures were maintained to achieve droplet diameters of 20 μm and production rates between 30-35 kHz. Cells undergoing heat lysis were incubated for 5 mins at 95° C., followed by incubation at 55° C. for 1 hr-18 hrs.

E. Coli Preparation for Droplet Encapsulation 1 mL of E. coli from a 50 mL overnight growth or expression was transferred to a 14 mL round-bottom Falcon tube (#352059, Corning), centrifuged for 5 min at 1,811 r.c.f, and the supernatant discarded. The cells were washed three times with 1 mL of 1×ThermoPol buffer (20 mM Tris-HCl, 10 mM $(NH_4)_2SO_4$, 10 mM KCl, 2 mM $MgSO_4$, 0.1% TritonX-100, pH 8.8) with the supernatant removed each time after centrifugation. The rinsed bacterial pellet was re-suspended in 2 mL of 1×ThermoPol buffer and the absorbance was measured at 600 nm. Cells were diluted in 1×Thermopol to an $OD_{600}$ of 0.05 (0.1 for co-encapsulation with lysis agents) to enable encapsulation at occupancies of 0.1 cells per droplet according to a Poisson distribution (FIG. 10).

Encapsulation of GFP Expressing E. Coli in Droplets

Cell populations were grown to express green fluorescent protein (GFP) by first transforming the pTrc99a-GFP plasmid DNA into XL1-blue cells following the manufacturer's recommended instructions. Recovered cells were then used to inoculate 50 mL of LB-ampicillin (100 μg/mL) liquid medium in a 500 mL baffled flask. The culture was grown to confluency overnight at 37° C. with shaking at 225 rpm. Cells were washed as described earlier, and suspended in 1×Thermopol. Either 1×lysozyme or 1×BugBuster in 1×Thermopol was co-encapsulated with E. coli expressing GFP. The lysis agents were introduced in a separate stream of the microfluidic chip at 2× final concentration and co-flowed with the E. coli containing stream for a short distance before encapsulation (FIG. 11a, right). Given that the device operates at low Reynolds number, material transfer between the co-flowing streams is diffusion limited, ensuring the E. coli are not lysed until following encapsulation. Drops were then heat incubated at 37° C. or 55° C. for up to 1 hr to promote lysis (FIG. 12a-c).

Construction of Null Mutant KOD-D542G DNA Polymerase

KOD polymerase mutant KOD-D542G was constructed using the Q5 site-directed mutagenesis kit (New England Biolabs). Briefly, the forward primer containing the D542G mutation was designed using the NEBaseChanger software package (New England Biolabs) to ensure effective annealing during PCR amplification while the reverse primer aligned perfectly with the parent template. This forward/reverse primer pair (Table of FIG. 19) was first used to conduct whole-plasmid amplification of the custom pGDR11 polymerase expression plasmid harboring the KOD exo⁻ polymerase gene (Initial denaturation: 95° C.-2 min followed by 25 cycles: 95° C.-30 sec, 60° C.-45 sec, 72°

C. at 8 min followed by polishing step of 72° C. for 5 min.) This was followed by a kinase-ligase-DpnI (KLD) treatment (20 min at room temperature) to phosphorylate and ligate the blunt-ended linear PCR product. DpnI was used to digest the parent template background. This mixture (1 μL) was then transformed into DH5-alpha supercompetent cells (New England Biolabs), recovered for 1 hr in 250 uL of SOC media with shaking at 225 RPM, plated onto LB-ampicillin (100 μg/mL) agar plates and grown overnight with shaking at 225 RPM at 37° C. Single colonies were picked and used to inoculate separate 4 mL aliquots of LB-ampicillin (100 μg/mL) liquid medium in 14 mL round-bottom Falcon-tubes (Corning) with shaking at 225 RPM and 37° C. overnight. Overnight cultures were spun for 10 min at 4,000 RPM and 4° C. with the supernatant discarded. Cell pellets were purified using the Express Plasmid Miniprep Kit (Biomiga) following the manufacturer's recommended instructions. DNA constructs were sequence validated (Retrogen, San Diego, Calif.) and analyzed using the CLC Main Workbench (Qiagen) software package.

Encapsulation of Polymerase Expressing *E. Coli* in Droplets

Cell populations were grown to express the KOD-wt, KOD-D542G, TGO-wt, DV-QGLK, or KOD-RS polymerases by first transforming plasmid DNA into XL1-blue cells following the manufacturer's recommended instructions. Recovered cells were then used to inoculate 50 mL of LB-ampicillin (100 μg/mL) liquid medium in a 500 mL baffled flask. The starter culture was grown to confluency overnight at 37° C. with shaking at 225 rpm and then used to inoculate (1:100 v/v) 50 mL of LB-ampicillin (100 μg/mL) liquid medium in a separate 500 mL baffled flask and grown at 37° C. with shaking at 225 rpm. At $OD_{600}$=0.6, the expression culture was removed and cooled to 25° C. The culture was then induced with IPTG at a final concentration of 1 mM and incubated overnight at 25° C. with shaking at 225 rpm. Cells were washed in 1×Thermopol as described earlier, and diluted to $OD_{600}$=0.05. The appropriate volume of cells was transferred to a micro-centrifuge tube, centrifuged at 1,811 r.c.f. for 5 mins, the supernatant discarded, and then mixed with the appropriate volume of a premixed fluorescence polymerase activity assay (PAA). The PAA consisted of 1 μM of a self-priming hairpin template labeled with Cy3 at the 5' end (ST.1G.HP.44.Cy3, Table of FIG. 19), 2 μM of a 3' end labeled Iowa Black FQ quencher sequence (QP08.Iowa, Table of FIG. 19), and 100 μM mixture of the appropriate nucleoside triphosphates in 1×Thermopol buffer: dNTPs were used for DNA synthesis (KOD-wt, KOD-D542G, and TGO-wt), NTPs for RNA synthesis (DV-QGLK), fNTPS for FANA synthesis (TGO-wt), and tNTPS for TNA synthesis (KOD-RS).

Fluorescent Activated Droplet Sorting

Figure 4:
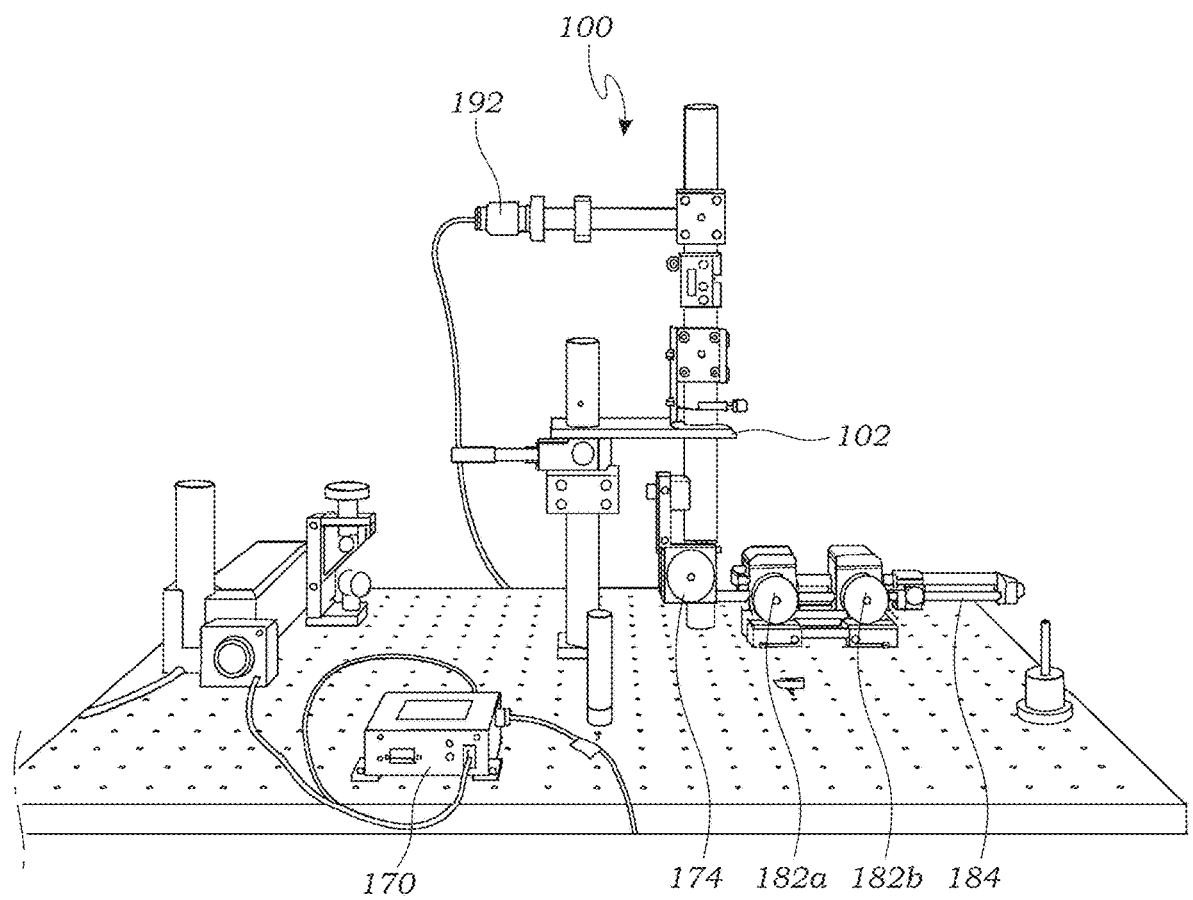
FIG. 4 illustrates the FADS system used in the Examples.

Following incubation, droplets were injected into a second chip for sorting (FIG. 2). To prevent droplet shearing and minimize the formation of satellite droplets, the spacing and bias oil were composed of 0.25% (w/w) of Pico-Surf surfactant in HFE 7500. The FADS system consists of a disposable sorting chip, a custom built LIF microscope, and associated electronics. The working principle of the FADS system is illustrated in FIG. 1A. A FADS system 100 used in the Examples is shown in FIG. 4. Designed for Cy3 excitation/emission, incident light from a Coherent OBIS LS 552 nm laser (Santa Clara, CA) is focused through a 20× plan apochromatic objective (Motic, Hong Kong) where droplets pass single file. Emitted light is led through a 405/488/543/635 nm Quad Band Dichroic into an optical train through a series of long-pass dichroics that can lead to a high-speed camera or 1 of 2 PMTs. Use of the quad-band dichroic allows for the use of a two-channel detection system (Cy3 and AlexaFluor 660), where a secondary dye can be used to decouple droplet size information from activity, if desired. The sample was illuminated with blue light (450 nm, 18 nm bandwidth), which does not overlap with the spectral properties of Cy3 (or AlexaFluor 660) and was imaged with a high-speed camera at 35,000 frames per second (fps). The digital signals generated by the PMT were analyzed by a field-gated programmable array (FPGA, USB-7856R, National Instruments) that is controlled with custom LabView software. Droplets falling within a user-defined threshold triggered the FPGA to send a square-wave pulse (50 kHz, 50% duty cycle, 60 μs), amplified to 600V by a high-voltage amplifier (2210, Trek, Lockport N.Y.), to the salt-water electrode (4M NaCl) of the sorting chip. The resulting non-uniform electric field generated a dielectrophoretic (DEP) force that polarized and deflected the droplet into a collection channel (FIG. 2C).

DNA Polymerase Activity Assay

Droplet Scale Reactions: Droplet scale reactions consisted of 2 μM of the quencher probe QP08.Iowa, and 1 μM of the self-priming hairpin-template ST.1G.HP.44.Cy3 in 1× Thermopol buffer. The max standard (+) droplet control utilized 2 μM of a non-complimentary quencher probe (QP13.Iowa.BQ, Table of FIG. 19). After the reaction mixtures were heat annealed (2 min at 95° C. followed by 5 min at 4° C.), commercial Q5 (1.6U), Taq (4U), Bst (6.4U), and nuclease free water as a (−) polymerase control were then added to their respective reaction mixtures, followed by the addition of 100 μM dNTPs. Following encapsulation, droplets were incubated at 55° C. for 1 h (Q5 and Taq) or 5 mins (Bst, and all control reactions). For each population, 10 μL of droplets were diluted in 50 μL of HFE-7500 containing 1-2% (w/w) of Pico-Surf surfactant, and 10 μL of this mixture was pipetted into a Countess™ Cell Counting Chamber Slide (Thermofisher) for analysis by fluorescence microscopy. Each droplet population was then injected into a FADS chip for flow cytometric analysis of ~1×10⁶ droplets.

Bulk Solution Reactions: 20 μL scale reactions used 1 μM of a primer-template complex (ST.1G.44 and ST.1G.44.Primer.IR800, Table of FIG. 19) and 2 μM of the quencher probe QP08.Iowa in 1×Thermopol. After heat annealing (2 min at 95° C. followed by 5 min at 4° C.), commercial Q5 (1.6U), Taq (4U), or Bst (6.4U) were added to their respective reaction mixtures, followed by the addition of 100 μM dNTPs or nuclease free water as a (−) dNTP control. Reactions were incubated at 55° C. for 1 h (Q5 and Taq) or 5 mins (Bst, and all control reactions). For analysis with denaturing PAGE, a 2 μL aliquot from each reaction was transferred to 38 μL of Stop Buffer [1×TBE, 25 mM EDTA, 40% formamide, pH 8.0] prior to gel loading. A 10 μL aliquot of each dilution was analyzed by denaturing PAGE.

Strand Displacement Sensor

Droplet Scale Reactions: Droplet scale reactions consisted of 2 μM of a 33 mer blocking oligo (Drops.SDP.317.Iowa, Table of FIG. 19) that also acted as the quencher probe, and 1 μM of the self-priming, 5' Cy3 labeled, hairpin-template 3.17.HP.Cy3 (Table of FIG. 19) in 1×Thermopol buffer. The max standard (+) droplet control contained 2 μM of a non-complimentary quencher probe (QP13.Iowa.BQ, Table of FIG. 19). After heat annealing (2 min at 95° C. followed by 5 min at 4° C.), commercial Q5 (1.6U), Bst (6.4U), and nuclease free water as a (−) polymerase control were then added to their respective reaction mixtures, followed by the addition of 100 µM dNTPs. Following encapsulation, droplets were incubated at 37° C. for 2 hrs. (Q5) or 5 mins (Bst, and all control reactions). For each population, 10 µL of droplets were diluted in 50 µL of HFE-7500 containing 1-2% (w/w) of Pico-Surf surfactant, and 10 µL of this mixture was pipetted into a Countess™ Cell Counting Chamber Slide (Thermofisher) for analysis by fluorescence microscopy. Each droplet population was then injected into a FADS chip for flow cytometric analysis of ~1×10⁶ droplets.

Bulk Solution Reactions: 20 µL scale reactions used 1 µM of a primer-template complex (3.17 and IR800.PBS2, Table of FIG. 19), and 2 µM of a non-Iowa labeled blocking oligo (Drops.SDP.317, Table of FIG. 19) or an equivalent volume of nuclease free water as a negative control. After heat annealing (2 min at 95° C. followed by 5 min at 4° C.), commercial Q5 (1.6U) and Bst (6.4U) were then added to their respective reaction mixtures, followed by the addition of 100 µM dNTPs. Reactions were incubated at 37° C. for 2 hrs. (Q5) or 5 mins (Bst, and all control reactions), and 2 µL aliquots were collected at 30, 60, and 120 min time points for Q5 and 1, 2, and 5 min time points for Bst. For analysis with denaturing PAGE, aliquots were transferred to 38 µL of Stop Buffer [1×TBE, 25 mM EDTA, 40% formamide, pH 8.0] points prior to gel loading. A 10 µL aliquot of each dilution was analyzed by denaturing PAGE.

Restriction Digestion Activity Assay

Droplet Scale Reactions: Droplet scale reactions consisted of 1 µM of a double stranded DNA fluorophore-quencher complex containing a PstI cut-site (PstI-Template, PstI-F-ON.Cy3, and Q-ON.Iowa, see table of FIG. 19) in 1×Cutsmart buffer. The max standard (+) droplet control consisted solely of a mixture of oligos (1 µM each) that simulated the composition of a reaction after complete digestion of the double stranded probe (PstI-F-ON.Cy3.Cut.11, PstI-F-ON.Cut.15, PstI-Template.Cut.19, PstI-Template.Cut.26, and Q-ON.Iowa, see table of FIG. 19). After heat annealing (2 min at 95° C. followed by 5 min at 4° C.), commercial NotI (5U), PstI (5U) and nuclease free water as a (−) enzyme control were added to their respective reaction mixtures. Following encapsulation, droplets were incubated at 37° C. for 18 h. Restriction enzymes were then heat-inactivated by incubating the droplets at 80° C. for 10 min. For each population, 10 µL of droplets were diluted in 50 µL of HFE-7500 containing 1-2% (w/w) of Pico-Surf surfactant, and 10 µL of this mixture was pipetted into a Countess™ Cell Counting Chamber Slide (Thermofisher) for analysis by fluorescence microscopy. Each droplet population was then injected into a FADS chip for flow cytometric analysis of ~1×10⁶ droplets.

Bulk Solution Reactions: 25 µL scale reactions were identically composed as the droplet scale reactions, but the PstI-Template was IR labeled (PstI-Template.IR800, Table of FIG. 19). After heat annealing (2 min at 95° C. followed by 5 min at 4° C.), commercial NotI (5U), PstI (5U) and nuclease free water as a (−) enzyme control were added to their respective reaction mixtures. Reactions were incubated at 37° C. for 18 h. Restriction enzymes were then heat-inactivated by incubating at 80° C. for 10 min. For analysis with denaturing PAGE, aliquots were transferred to 38 µL of Stop Buffer [1×TBE, 25 mM EDTA, 40% formamide, pH 8.0] points prior to gel loading. A 10 µL aliquot of each dilution was analyzed by denaturing PAGE.

Ligation Activity Assay

Droplet Scale Reactions: Droplet scale reactions consisted of 1 µM of a 5' Cy3-3' Iowa Black FQ labeled molecular beacon and an acceptor-donor sequence complex (MB.Ligation.Drops, Ligation.N1.6, and Ligation.N2.6.Phos, Table of FIG. 19) in 1×T4 DNA ligase buffer. The acceptor-donor sequence pair consisted of a left hand piece (Ligation.N1.6) and right hand piece (Ligation.N2.6.Phos) that annealed to the inner ring of the molecular beacon, and promoted linearization of the beacon upon ligation of the two pieces, leading to a fluorescent signal. Two negative control groups were assayed alongside the experimental group: one contained the non-phosphorylated version of the donor sequence (Ligation.N2.6, Table of FIG. 19) in place of Ligation.N2.6.Phos, and the other was prepared using the standard reaction mixture without enzyme. The droplet scale reactions also included a max standard (+) control that used 1 µM of a 12 mer oligo (Ligation.N1+N2.12, Table of FIG. 19) in place of Ligation.N1.6 and Ligation.N2.6.Phos that mimicked the effect of a ligated product. After heat annealing (2 min at 95° C. followed by 5 min at 4° C.), 400U of T4 DNA ligase, or nuclease free water for the (−) ligase control, was added to the reaction mixture. Following encapsulation, droplets were incubated at 37° C. for 1 hr. Ligase was then heat-inactivated by incubating the droplets at 80° C. for 10 min. For each population, 10 µL of droplets were diluted in 50 µL of HFE-7500 containing 1-2% (w/w) of Pico-Surf surfactant, and 10 µL of this mixture was pipetted into a Countess™ Cell Counting Chamber Slide (Thermofisher) for analysis by fluorescence microscopy. Each droplet population was then injected into a FADS chip for flow cytometric analysis of ~1×10⁶ droplets.

Bulk Solution Reactions: 20 µL scale reactions used an unlabeled molecular beacon (MB.Ligation, see table of FIG. 19) in place of MB.Ligation.Drops, and an IR800 labeled acceptor sequence (Ligation.N1.6.IR800, Table of FIG. 19) in place of Ligation.N1.6, but were otherwise identically composed to the droplet scale reactions. After heat annealing (2 min at 95° C. followed by 5 min at 4° C.), 400U of T4 DNA ligase, was added to the reaction mixture. Reactions were incubated at 16° C., 25° C., and 37° C. for 1 hr. Ligase was then heat-inactivated by incubating at 80° C. for 10 min. For analysis with denaturing PAGE, a 10 µL aliquot of each reaction was transferred to 10 µL of Stop Buffer [2×TBE, 50 mM EDTA, 80% formamide, pH 8.0] prior to gel loading. A 10 µL aliquot of each dilution was analyzed by denaturing PAGE.

Mock Enrichment

Figure 14D:
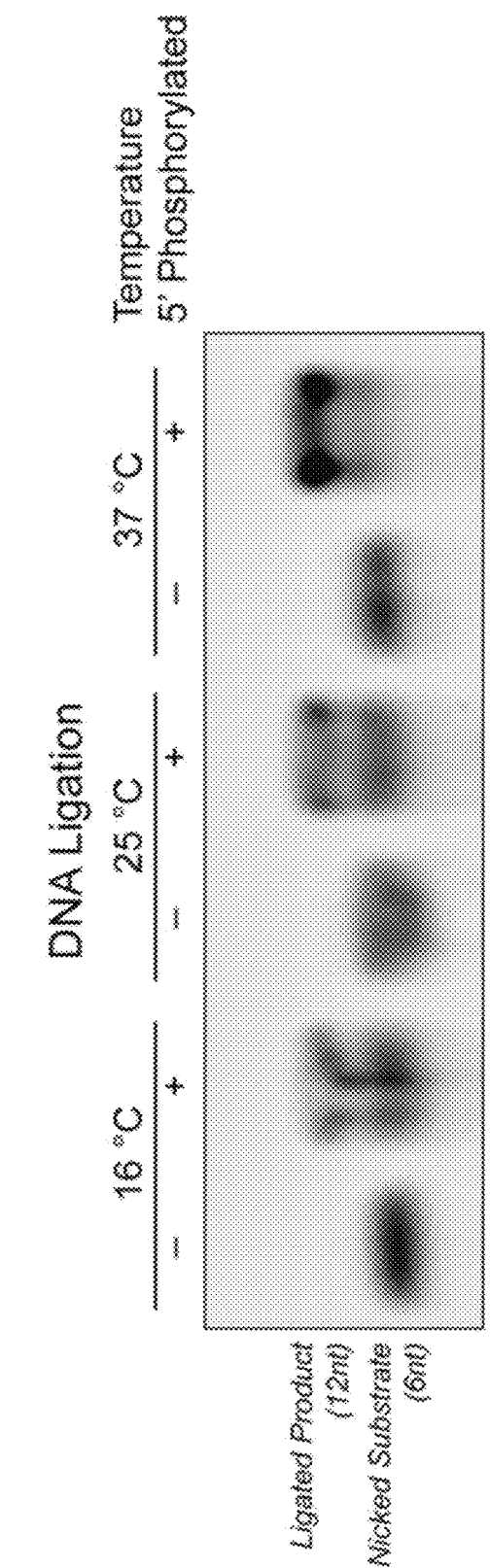

To evaluate the performance of our FADS system, we performed a mock enrichment for DNA synthesis activity by spiking *E. coli* expressing a wild-type polymerase (KOD-wt) into a population expressing an inactive null mutant (KOD-D542G) at cellular ratios of 1:1,000 and 1:10,000 (active to inactive polymerase) and co-encapsulated them in drops with the PAA. *E. coli* were heat lysed at 95° C. for 5 mins, incubated for 1 hour at 55° C. to allow DNA extension on the ST.1G.HP.44.Cy3 template (Table of FIG. 19), and then sorted. Enrichment was measured by comparing the number of positive droplets detected in the naïve and enriched populations (see FIG. 16). To increase the accuracy of the analysis, we measured the hit rates of clonal KOD-wt and clonal KOD-D524G and compared them to the expected values in order to calculate the rate of false positives and false negatives. Using the false positive rate (FPR) and false negative rate (FNR), the true composition of a mixed population could be estimated (FIGS. 14-14*d*). A model was also derived to calculate the maximum theoretical value of enrichment for a perfectly performing instrument, as a reference point to assess our results. The maximum theoretical enrichment ($\eta_{max}$) was calculated with the following expression:

$$\eta_{max} = \frac{1}{1 - e^{-\varepsilon_0 \lambda}(1 - \varepsilon_0)}$$

where $\lambda$ is the cell occupancy, and $\varepsilon_0$ is the fraction of KOD-wt cells in the naïve population.

Recovery of Sorted DNA for Mock Enrichment

Plasmid DNA was recovered from sorted droplet emulsions by extraction with Pico-Break (Dolomite Microfluidics, UK) following the vendor protocol. After sorting, a 23-gauge needle was inserted into one end of the collection tubing, with the other end left in the 5 mL collection vial. A 1 mL syringe was screwed onto the needle, and used to push air through the tubing and force the droplets into the collection vial. The tubing was then washed a few times by pulling the contents of the vial back into the tubing ~3/4 of the total length, followed by flushing with air. To create adequate aqueous volume to facilitate DNA extraction, at least 125 µL of pre-formed, well packed droplets made from 1×Thermopol buffer were added to the 5 mL collection tube. An equivalent volume of nuclease free water could also be added and vortexed to create a layer of droplets. The contents were then mixed to ensure the sorted droplets were randomly distributed within the added droplets. 1 mL of this mixture was added to a 1.5 mL microcentrifuge tube and spun at 1000 r.c.f. for 1 min, the bottom oil layer discarded, followed by addition of another 800 µL-1 mL of the initial mixture. This process was repeated until all the droplets were transferred into the 1.5 mL microcentrifuge tube. After removing as much of the bottom oil layer as possible to create a compact droplet layer, the droplets were transferred to a 0.5 mL low-adhesion microcentrifuge tube (USA Scientific), followed by the addition of 2 equivalent volumes of Pico-Break 1 (Dolomite). The contents were then vortexed for 15 sec and centrifuged (2 min, 1000 r.c.f) to attain phase separation. The top, aqueous layer containing the plasmid DNA was recovered and then concentrated using a spin column (DNA Clean & Concentrator-5, Zymo Research) and eluted with molecular biology grade water (10 µL).

Cloning of Enriched DNA Polymerase Domains

Custom DNA primers (Table of FIG. 19, see Tile 1-Fwd and Tile 9-Rvs) were used to PCR amplify the polymerase domain from the extracted FADS-sorted plasmid DNA (Initial denaturation: 95° C.-30 sec followed by 30 cycles: 95° C.-30 sec, 56° C.-45 sec, 72° C. 1 min followed by polishing step of 72° C.-2 min). The amplicon was then purified using a spin column (DNA Clean & Concentrator-5, Zymo Research) and size-validated by 1% agarose gel prior to cloning using the Gibson assembly. In a separate reaction, custom DNA primers (table of FIG. 19, see KOD-pol-dom_381-422-Fwd and KOD-poldom_21-65-Rvs) were used to PCR amplify the KOD-wt pGDR11 plasmid region flanking the polymerase domain PCR amplicon and DpnI treated to digest the parent template. Gibson assembly was performed in a 20 µL reaction volume containing a final concentration of 100 ng FADS-sorted polymerase domain amplicon, 100 ng linear vector, and 1×Gibson assembly Mastermix (NEB). The reaction was incubated at 50° C. for 60 minutes. This mixture (5 µL) was then transformed into DH5-alpha supercompetent cells (New England Biolabs), recovered for 1 hr. in 250 uL of SOC media with shaking at 225 RPM, plated onto LB-ampicillin (100 µg/mL) agar plates and grown overnight at 37° C. LB-ampicillin (4 mL, 100 µg/mL) was pipetted onto the overnight plate and colonies were scraped in a clockwise motion with a sterile L-shaped cell spreader (Fisher Scientific) until a uniform slurry was created by sloughing the colony forming units (CFUs) from the surface of the plate. The slurry was pipetted into a 14 mL round-bottom Falcon-tube (Thermofisher Scientific) and spun for 10 min at 4,000 RPM and 4° C. with the supernatant discarded. Cells were then mini-prepped using the Express Plasmid Miniprep Kit (Biomiga) following the manufacturer's recommended instructions. Purified plasmid DNA was quantified using a Nanodrop spectrophotometer. Purified plasmid DNA (300 ng) was transformed into XL1 blue supercompetent cells following the manufacturer's recommended instructions. The recovered transformation (50 µL cells+200 µL SOC media) was pipetted directly into 50 mL LB-ampicillin (100 µg/mL) media in a 500 mL baffled flask and grown at 37° C. with shaking at 225 rpm overnight. This ensures that the aggregate composition of the enriched plasmid DNA (KOD-wt:KOD-D542G) is evenly represented in the overnight culture used for inoculating a fresh round of cell growth and polymerase expression. An aliquot from the overnight transformation culture (500 µL) was used to inoculate a fresh cell culture (50 mL LB-ampicillin (100 µg/mL) media in a 500 mL baffled flask) for polymerase expression of the enriched mixture of KOD-wt and KOD-D542G enzyme variants. This culture was grown and expressed as previously described. Cells were harvested and encapsulated with the PAA as previously described.

Mathematical Model Relating $OD_{600}$ to Droplet Cell Occupancy

When encapsulating cells within microfluidically generated droplets, the probability, $p(k, \lambda)$, of a droplet containing 0, 1, or more cells within a population of droplets can be estimated using a Poisson distribution $$P(X = k) = \frac{\lambda^k}{k!} e^{-\lambda}$$

where k is the number of cells in a given droplet, and $\lambda$ is the average number of cells per droplet volume. This model agrees well with experimental data if the cells are significantly smaller than the droplets, and they are sparsely distributed so as to not influence the position of neighboring cells. If the cells are significantly smaller than the droplets that contain them, $\phi_d \lll 1$, where $\phi_d$ is defined as the volume fraction of single cell in one drop, and $\emptyset_d = V_c/V_d$, where $V_c$ is the average volume of a single *E. coli* cell and $V_d$ is the average droplet volume. Similarly, if the cells are sparsely distributed, the volume fraction of cells in the pre-encapsulated solution $\phi_s \lll 1$ where $\emptyset_s = V_C/V_{sol}$. $V_C$ is the total volume of cells in the pre-encapsulated solution, and $V_{sol}$ is the total solution volume. Realizing that $\lambda$ can be expressed as a ratio of $\emptyset_s$ and $\emptyset_d$:

$$\lambda = \frac{\phi_s}{\phi_d}$$

it is possible to derive an expression to relate the $OD_{600}$ of the pre-encapsulated cell solution to the parameter $\lambda$. If we rearrange the equation and expand it:

$$\phi_d \lambda = \phi_s$$

$$\frac{V_c}{V_d}\lambda = \frac{V_c}{V_{sol}} = \frac{n_{cells}\overline{V}_c}{V_{sol}} = \frac{(OD_{600} \cdot \sigma_{1.0} \cdot V_{sol}) \cdot \overline{V}_c}{V_{sol}} = (OD_{600} \cdot \sigma_{1.0}) \cdot \overline{V}_c$$

we obtain an expression relating $\lambda$ to the number of cells present in the pre-encapsulated solution ($n_{cells}$), the $OD_{600}$, and the *E. coli* concentration at $OD_{600}=1.0$ ($\sigma_{1.0}$). Further simplifying and re-arranging, we derive the following expression showing that the target $OD_{600}$ for a given $\lambda$ can be calculated from the desired droplet volume, $\overline{V}_d$, and $\sigma_{1.0}$.

$$OD_{600} = \frac{\lambda}{\overline{V}_d \cdot \sigma_{1.0}}$$

If we assume that $\sigma_{1.0}=5\times10^8$ cells/mL and desire a droplet diameter of 20 μm, we need an $OD_{600}$ of ~0.05 to get $\lambda=0.1$, and an $OD_{600}$ of ~0.5 to get $\lambda=1$, which was validated experimentally (FIG. 10). At $\lambda=0.1$, termed "single occupancy", 90.5% of the droplets will be empty, ~9% will contain a single cell, and ~0.5% will contain more than one cell. Of the cell containing droplets, approximately 95% will contain only a single cell. This is desired when a phenotype-genotype linkage is critical, such as in directed evolution and selection experiments. At $\lambda=1$, we have what is considered "full occupancy", whereby we have the maximum number of single cell containing drops (36.8%) across all values of $\lambda$, but a larger proportion contain multiple cells (26.4%). This occupancy level can be beneficial to enrich a very dilute population by sacrificing the degree of the phenotype-genotype linkage for higher throughput. Once enriched, further rounds of selection can be accomplished using single occupancy.

Theoretical Model for Cellular Enrichment

In sorting experiments, the efficiency of a sort is typically defined in terms of the degree of enrichment of a target cell from a population of cells that contains a mixture of both target and non-target cells. For the purposes of this exercise, target cells will be referred to as "positive" cells, while non-target cells will be referred to as "negative" cells. The term "enrichment" describes how the frequency of positive cells in the sorted pool of cells has increased in comparison to the naïve, non-sorted pool. This can be expressed mathematically as:

$$\eta = \frac{N_{+,1}}{N_{+,1}+N_{-,1}} \bigg/ \frac{N_{+,0}}{N_{+,0}+N_{-,0}} = \frac{\varepsilon_1}{\varepsilon_0}$$

where η is enrichment, $N_{+,0}$ and $N_{+,1}$ are the number of positive cells before and after sorting (or in an enriched pool) respectively, $N_{-,0}$ and $N_{-,1}$ are the corresponding values for negative cells, and $\varepsilon_0$ and $\varepsilon_1$ represent the fraction of positive cells in the naïve and sorted populations, respectively. This definition of enrichment describes by what factor the fraction of positive cells in the population has increased after a round of sorting. For example, if the fraction of positive cells in a population increased by a factor of 90 after sorting, from 0.01 (1%) to 0.9 (90%), or from 0.001 (0.1%) to 0.09 (9%), then η=90. Since the former example only contained a 0.01 fraction of positive cells, if it were enriched perfectly such that no negative cells we present after sorting, this would give $\eta=100=(0.01)^{-1}$. This puts an upper limit on the enrichment value as it would not make sense to enrich more than what it would take to make the sorted population 100% composed of positive cells. Consequently, the absolute maximum value and the dynamic range of enrichment increase with decreasing fractions of positive cells in the naïve population. Furthermore, given that a maximum value is present, the degree of success or efficiency of a particular enrichment exercise can be assessed based on the composition of the initial population.

An alternative approach is to measure enrichment based the ratio of positive to negative cells in the naïve and sorted populations:

$$m = \frac{N_{+,1}}{N_{-,1}} \bigg/ \frac{N_{+,0}}{N_{-,0}}$$

In this case, there is no theoretical upper limit on the enrichment (i.e., no real dynamic range). The more the positive cells outnumber the negative cells after sorting, the larger this value can climb regardless of the composition of the initial population, which can inflate enrichment values. Furthermore, when only positive cells are collected, this expression of enrichment is undefined, and has to be reported as "m>h", where h is a finite lower limit. This approach to calculating enrichment has merit in that a "x" fold increase in the ratio of positive to negative cells after sorting will give the same "x" fold increase in the enrichment value regardless of the initial ratio of positive to negative cells. The increase in the value of η (for a given population) will not reflect this trend though, as it will tend towards the absolute maximum value as positive cells take up a larger portion of the sorted population. However, η is a good representation of the sorting efficiency in regards to assessing how well an instrument performs in comparison to a perfect sorting system and it is a superior indicator of the composition of the sorted population. It also better reflects the increase in difficulty of enriching a target population when it makes up a lower proportion of the naïve population by not allowing enrichment values to become artificially large. Lastly, sorting efficiency can also be also quantified using η by comparing it to the absolute maximum value, which can allow one to assess how sorting efficiency trends with changes to the composition of the naïve population (i.e., sorting efficiency decrease with increasing proportion of negative cells).

Given that we wish to assess how well our instrument performs in comparison to a perfect system across a range of compositions for the naïve population, we will use η to characterize the sorting efficiency of our FADS system. If we assume a perfect sorting system, we can see that the best scenario would be to collect only positive cells, and zero negative cells. In this situation, our absolute maximum enrichment would be defined as:

$$\eta_{abs} = \frac{N_{+,1}}{N_{+,1}} \bigg/ \frac{N_{+,0}}{N_{+,0}+N_{-,0}} = \frac{1}{\varepsilon_0} = \varepsilon_0^{-1}$$

Thus, the absolute maximum obtainable enrichment can be easily calculated by taking the inverse of $\varepsilon_0$. This model would be sufficient if each cell-containing droplet only contained a single cell, but single cell encapsulation in microfluidic droplets follows a Poisson distribution, which means that inevitably, some negative cells will be sorted if they are co-encapsulated with positive cells. Consequently, even in a perfect system with no false positives or negatives, and 100% accurate sorting, it will never be possible to achieve $\eta_{abs}$. To derive an expression for the theoretical maximum enrichment, $\eta_{max}$, we must develop a model that includes the number of negative cells that are sorted with the positive cells, taking into consideration all possible combinations of co-encapsulation that can occur where at least one positive cell is present and n=0 to ∞ negative cells are also potentially present in a given sorted droplet.

To begin, only a single cell type will be considered for simplicity. Before encapsulation, a number of cells, $n_{cells}$, are randomly distributed in a volume of solution $V_{sol}$. After encapsulation, $n_{cells}$ are distributed among No droplet compartments, where the average number of cells per droplet can be defined as $\lambda = n_{cells}/N_0$. Thus, each cell has a probability of $p = 1/N_0 = \lambda/n_{cells}$ of being encapsulated. To determine the probability of encapsulating k cells within a given compartment we can use the binomial distribution:

$$B(n_{cells}, k, p) = \frac{n_{cells}!}{k!(n_{cells}-k)!} \cdot [p^k \cdot (1-p)^{n_{cells}-k}]$$

Since we know the number of drops $N_0 \gg 1$ and cells $n_{cells} \gg 1$ and that the probability of encapsulation for each cell remains constant during the course of the experiment (as they are sparsely distributed and are being encapsulated at a constant rate), we can rewrite the binomial distribution in terms of the average rate of encapsulation $\lambda$, and if we take the limit as $n_{cells} \to \infty$, then we can define a probability $P(X=k)$ independent of the number of events:

$$p = \frac{\lambda}{n_{cells}}$$

$$P(X = k) = \lim_{n_{cells} \to \infty} \left( \frac{n_{cells}!}{k!(n_{cells}-k)!} \cdot \left(\frac{\lambda}{n_{cells}}\right)^k \cdot \left(1 - \frac{\lambda}{n_{cells}}\right)^{n_{cells}-k} \right)$$

$$P(X = k) = \frac{\lambda^k}{k!} \cdot \lim_{n_{cells} \to \infty} \left( \frac{n_{cells}!}{(n_{cells}-k)!} \cdot \left(\frac{1}{n_{cells}}\right)^k \cdot \frac{\left(1 - \frac{\lambda}{n_{cells}}\right)^{n_{cells}}}{\left(1 - \frac{\lambda}{n_{cells}}\right)^k} \right)$$

The terms inside the limit can be calculated individually. Expanding the product of the first two terms, we see that it reduces to 1 (n=$n_{cells}$):

$$\lim_{n \to \infty} \frac{n!}{(n-k)!} \cdot \left(\frac{1}{n}\right)^k = \frac{n \cdot (n-1) \cdot (n-2)\ldots(n-k)\cdot(n-k-1)\ldots 1}{(n-k)\cdot(n-k-1)\ldots 1} \cdot \left(\frac{1}{n^k}\right)$$

$$\lim_{n \to \infty} \frac{n!}{(n-k)!} \cdot \left(\frac{1}{n}\right)^k =$$

$$\frac{n \cdot (n-1) \cdot (n-2)\ldots(n-k+1)}{n^k} = \frac{n}{n} \cdot \frac{n-1}{n} \cdot \frac{n-2}{n} \ldots \frac{n-k+1}{n} = 1$$

The term in the denominator also reduces to 1:

$$\lim_{n \to \infty} \left(1 - \frac{\lambda}{n}\right)^k = 1^k = 1$$

We can evaluate the last term in the numerator on the right if we rewrite it into the form of a commonly known limit:

$$\lim_{n \to \infty} \left(1 + \frac{1}{x}\right)^{x \cdot a} = e^a \to \lim_{n \to \infty} \left(1 - \frac{\lambda}{n}\right)^n = \lim_{n \to \infty} \left(1 + \frac{1}{\frac{-n}{\lambda}}\right)^{\frac{-n}{\lambda} \cdot -\lambda} = e^{-\lambda}$$

which leaves us with:

$$P(X = k) = \frac{\lambda^k}{k!} e^{-\lambda}$$

As the number of events approaches ∞, p becomes increasingly small, the binomial distribution can be represented by the Poisson distribution, P(X=k), which we previously established is a good approximation for modeling the distribution of droplet encapsulation events for microfluidically generated droplets. To reiterate, P(X=k) gives the probability of finding k cells encapsulated in a droplet, independent of $n_{cells}$ as long as the number of cells and drops is sufficiently large and p is sufficiently small.

In a typical enrichment, a library of cells expressing many different mutant variants may be present in a given population. To simplify the analysis, we will only consider cells which express a positive/active protein and those that express a negative/non-active protein, identified by either the "+" or "−" subscript respectively in the following derivation. Since each encapsulation event is said to be random and independent, and the positive and negative cells will be present in different amounts in the pre-encapsulation solution, they can each be said to have their own associated probability of encapsulation, defined as $P_+(\lambda_+, k_+)$ for positive cells, and $P_-(\lambda_-, k_-)$ for negative cells:

$$P_+(\lambda_+, k_+) = \frac{\lambda_+^{k_+}}{k_+!} e^{-\lambda_+}$$

$$P_-(\lambda_-, k_-) = \frac{\lambda_-^{k_-}}{k_-!} e^{-\lambda_-}$$

Where $\lambda_+$ and $\lambda_-$ are the average number of encapsulated positive and negative cells, respectively. Assuming perfect sorting, whereby all sorted drops contain at least one or more positive cell co-encapsulated with 0 or more negative cells, we can express the theoretical number of collected positive and negative cells in terms of the number of drops screened, $N_0$, and their associated probabilities. The number of positive cells collected during sorting can be expressed as:

$$N_{+,1} = N_0 \cdot \left( \sum_{k_+ = 1}^{\infty} k_+ \cdot P_+(\lambda_+, k_+) \right)$$

which simplifies to $$N_{+,1} = N_0 \cdot \left(\sum_{k_+=1}^{\infty} k_+ \cdot P_+(\lambda_+, k_+)\right) = N_0 \cdot \sum_{k_+=1}^{\infty} k_+ \cdot \frac{\lambda_+^{k_+}}{k_+!} e^{-\lambda_+}$$

$$N_{+,1} = N_0 \cdot e^{-\lambda_+} \cdot \sum_{k_+=1}^{\infty} k_+ \cdot \frac{\lambda_+^{k_+}}{k_+!} = N_0 \cdot \lambda_+ \cdot e^{-\lambda_+} \cdot e^{\lambda_+} = N_0 \cdot \lambda_+$$

$$N_{+,1} = N_0 \cdot \lambda_+$$

Similarly, the number of negative cells sorted simplifies to:

$$N_{-,1} = N_0 \cdot \sum_{k_+=1}^{\infty} P_+(\lambda_+, k_+) \cdot \left(\sum_{k_-=1}^{\infty} k_- \cdot P_-(\lambda_-, k_-)\right)$$

$$N_{-,1} = N_0 \cdot \lambda_- \cdot \sum_{k_+=1}^{\infty} P_+(\lambda_+, k_+)$$

The fraction of positive cells in the pre-sorted ($\varepsilon_0$) and post-sorted ($\varepsilon_1$) populations can written as:

$$\varepsilon_0 = \frac{N_{+,0}}{N_{+,0} + N_{-,0}} = \frac{\lambda_+}{\lambda_+ + \lambda_-} = \frac{\lambda_+}{\lambda}$$

$$\varepsilon_1 = \frac{N_{+,1}}{N_{+,1} + N_{-,1}} = \frac{N_{+,1}}{N_{+,1} + N_{-,1}} \cdot \frac{1/N_0}{1/N_0} = \frac{\lambda_+}{\lambda_+ + \lambda_-\left[\sum_{k_+=1}^{\infty} P_+(\lambda_+, k_+)\right]}$$

Expanding and simplifying the series in the denominator of $\varepsilon_1$ reduces it to:

$$\sum_{k_+=1}^{\infty} P_+(\lambda_+, k_+) = \sum_{k_+=1}^{\infty} \frac{\lambda_+^{k_+}}{k_+!} e^{-\lambda_+} =$$

$$e^{-\lambda_+} \cdot \sum_{k_+=1}^{\infty} \frac{\lambda_+^{k_+}}{k_+!} = e^{-\lambda_+} \cdot \left(\sum_{k_+=1}^{\infty} \frac{\lambda_+^{k_+}}{k_+!} - 1\right) = e^{-\lambda_+}(e^{\lambda_+} - 1) = 1 - e^{-\lambda_+}$$

$$\varepsilon_1 = \frac{N_{+,1}}{N_{+,1} + N_{-,1}} = \frac{N_{+,1}}{N_{+,1} + N_{-,1}} \cdot \frac{1/N_0}{1/N_0} = \frac{\lambda_+}{\lambda_+ + \lambda_-(1 - e^{-\lambda_+})}$$

Using the expression for $\varepsilon_0$, $\lambda_+$ and $\lambda_-$ can be written as:

$$\lambda_+ = \lambda \cdot \varepsilon_0 \quad \lambda_- = \lambda(1 - \varepsilon_0)$$

Allowing $\varepsilon_1$ to be written as:

$$\varepsilon_1 = \frac{\lambda_+}{\lambda_+ + \lambda_-(1 - e^{-\lambda_+})} = \frac{\lambda \cdot \varepsilon_0}{\lambda \cdot \varepsilon_0 + \lambda(1 - \varepsilon_0)(1 - e^{-\lambda \cdot \varepsilon_0})} =$$

$$\frac{\varepsilon_0}{\varepsilon_0 + (1 - \varepsilon_0)(1 - e^{-\lambda \varepsilon_0})} = \frac{\varepsilon_0}{1 - e^{-\lambda \varepsilon_0} + \varepsilon_0 \cdot e^{-\lambda \varepsilon_0}} = \frac{\varepsilon_0}{1 - e^{-\varepsilon_0 \lambda}(1 - \varepsilon_0)}$$

Dividing through by $\varepsilon_0$ to both gives the theoretical maximum enrichment, $\eta_{max}$:

$$\eta_{max} = \frac{\varepsilon_1}{\varepsilon_0} = \frac{1}{1 - e^{-\varepsilon_0 \lambda}(1 - \varepsilon_0)}$$

Experimental Enrichment

To calculate $\varepsilon_0$ for an experimental enrichment, one can do so easily based on the number of positive drops detected, $N_{0+}$, which can also be expressed mathematically in relation to $\lambda_+$ and the number of droplets screened, $N_0$, as:

$$N_{0+} = N_0 \cdot \left(\sum_{k_+=1}^{\infty} P_+(\lambda_+, k_+)\right) = N_0 \cdot (1 - e^{-\lambda_+})$$

$$e^{-\lambda_+} = \left(1 - \frac{N_{0+}}{N_0}\right)$$

Solving for $\lambda_+$ we get the following expression:

$$\lambda_+ = \ln\left(\frac{N_0}{N_0 - N_{0+}}\right)$$

Knowing the values of $\lambda$ and $\lambda_+$, $\varepsilon_0$ can be calculated for any population, which allows for the calculation of the observed/experimental enrichment, $\eta_{exp}$:

$$\eta_{exp} = \frac{\varepsilon_{1,exp}}{\varepsilon_{0,exp}}$$

If the value of $\lambda$ remains constant, $\eta_{exp}$ can simply be expressed as:

$$\eta_{exp} = \frac{\lambda_{1,+}}{\lambda_{0,+}}$$

where $\lambda_{1,+}$ and $\lambda_{0,+}$ are the experimental values for the average number of positive cells in the enriched and naïve populations, respectively.

To evaluate the performance of our FADS system, we spiked E. coli expressing a wild-type polymerase (KOD-wt) into a population of E. coli expressing a null mutant polymerase (KOD-D542G) at spiking ratios of 1:1000 and 1:10000 (KOD-wt:(KOD-D542G+KOD-wt)) and performed a single round of enrichment. To measure enrichment, we compared the number of positive droplets detected in the naïve and enriched populations, and used those values to back calculate the number of positive and negative cells actually present in the pool. Since we would inherently have false positives and false negatives, we to took this into account to predict what our number of hits would be if the assay were perfect in order to get a more accurate estimation of positive and negative cell count in a real sample.

To calculate the true value of KOD-WT cells in a mixed sample, we took clonal populations of KOD-WT and KOD-D542G and compared the number of positive droplets to the theoretical number given $\lambda=0.1$, in order to calculate the true positive rate (TPR) and false positive rate (FPR). For KOD-WT, we would expect 100% of the cell containing droplets to be counted as a hit (0 false positives from sensor), and conversely, for KOD-D542G, we would expect 0% of cell containing droplets to be counted as a hit (0 false negatives from sensor) in a perfect test, which is a valid assumption if the error rate of the sensor is almost 0. Thus the expected values of real KOD-WT containing droplets ($N_+$) in the clonal KOD-WT population and real KOD-D542G containing drops ($N_-$) in the clonal KOD-D542G population can be estimated as:

$$N_+ = N_0 \cdot (1 - e^{-\lambda}) \quad \lambda_+ = \lambda = 0.1, \quad \lambda_- = 0$$

$$N_- = N_0 \cdot (1 - e^{-\lambda}) \quad \lambda_- = \lambda = 0.1, \quad \lambda_+ = 0$$

which was also derived earlier. Using this data, the TPR and FPR can be calculated using the following equations:

$$TPR = \frac{N_{Hit,+}}{N_+}, FPR = \frac{N_{Hit,-}}{N_-}$$

where $N_{Hit,+}$ and $N_{Hit,-}$ are the number of positive droplets counted in the clonal KOD-WT and KOD-D542G populations, respectively. With the FPR, we can calculate the true negative rate (TNR) as TNR=1−FPR, and with the TPR, we can calculate the false negative rate (FNR) as FNR=1−TPR. Using these values, we can estimate the total number of actual KOD-WT ($N_+$) containing droplets in any mixed population, and thus calculate the true values for $\lambda_{0,+}$ and $\lambda_{1,+}$ (see below) to determine $\eta_{exp}$.

$$\lambda_{0 or 1,+} = \ln\left(\frac{N_0}{N_0 - N_+}\right)$$

where $N_0$ is the number of drops screened and $N_+$ is the predicted number of actual KOD-WT containing drops in a given population. In a given test of a mixed population, the values for TPR, FPR, FNR, and TNR can be used to back calculate the expected values of $N_+$ and $N_-$, which can also be visualized by a contingency table (see FIG. 14B).

$$N_+\cdot(TPR)+N_-\cdot(FPR)=N_{Hit,+}$$

$$N_+\cdot(FNR)+N_-\cdot(TNR)=N_{Hit,-}$$

We can rewrite this as matrix equation:

$$\begin{bmatrix} TPR & FPR \\ FNR & TNR \end{bmatrix}\begin{bmatrix} N_+ \\ N_- \end{bmatrix} = \begin{bmatrix} N_{Hit,+} \\ N_{Hit,-} \end{bmatrix}$$

which gives the solution:

$$\begin{bmatrix} N_+ \\ N_- \end{bmatrix} = \begin{bmatrix} TPR & FPR \\ FNR & TNR \end{bmatrix}^{-1}\begin{bmatrix} N_{Hit,+} \\ N_{Hit,-} \end{bmatrix}$$

While embodiments of the present invention have been shown and described, various modifications may be made without departing from the scope of the present invention. The invention, therefore, should not be limited, except to the following claims, and their equivalents.

What is claimed is:

1. A system for sorting droplets comprising:
a microfluidic chip comprising a droplet sorting channel coupled at an upstream location to a droplet inlet channel, the droplet sorting channel coupled at a downstream location to a sorting junction which leads to a waste channel and a collection channel;
an optical interrogation device configured to illuminate each droplet as it passes through the sorting channel with excitation light from an excitation light source, detect emitted fluorescent light from each droplet, and generate a respective output signal corresponding to the fluorescence of each respective droplet;
a diverter disposed in the microfluidic chip upstream of the sorting channel and configured to be actuated to selectively direct each droplet into one of the collection channel or the waste channel, the diverter operably coupled to a controller which controls the actuation of the diverter;
wherein the controller is configured to receive the output signal for each droplet from the optical interrogation device, and control the actuation of the diverter based on the output signal for each droplet to selectively direct each droplet into one of the collection channel or the waste channel; and
wherein the microfluidic chip further comprises an elevated divider interposed between the waste channel and the collection channel at the sorting junction and extending downstream of the sorting junction for a divider length, wherein the elevated divider separates only an upper portion of the waste channel and the collection channel for the divider length and leaves a lower portion of the waste channel and the collection channel fluidly connected by a dead-end channel below the elevated divider and wherein downstream of the elevated divider and the dead-end channel, a border wall completely separates the waste channel and the collection channel.

2. The system of claim 1, further comprising an oil bias channel coupled to the droplet sorting channel at the upstream location of the droplet sorting channel, the oil bias channel configured to provide a flow of oil which biases the droplets toward one of a collection channel side of the droplet sorting channel or a waste channel side of the droplet sorting channel thereby preventing unwanted migration of the droplets.

3. The system of claim 1, wherein the diverter comprises an electrode which is configured to exert a dielectrophoretic (DEP) force on the droplets when actuated by the controller.

4. The system of claim 3, wherein the electrode comprises an electrically conductive material.

5. The system of claim 3, wherein the electrode comprises a salt solution.

6. The system of claim 3, wherein the controller is a programmable controller comprising a field programmable gate array (FPGA) configured to receive the output signals from the optical interrogation device and actuate a high voltage amplifier to energize the electrode to exert a dielectrophoretic (DEP) force on the droplet to direct the droplets into the collection channel.

7. The system of claim 1, wherein the microfluidic chip further comprises first and second oil inlet channels that intersect at the droplet inlet channel.

8. The system of claim 7, wherein the microfluidic chip further comprises a droplet reservoir upstream of the droplet inlet channel.

9. The system of claim 1, wherein the excitation light source comprises one or more lasers.

10. The system of claim 9, wherein the optical interrogation device includes one or more photomultiplier tubes (PMTs) configured to capture emitted fluorescent light.

11. The system of claim 10, wherein the one or more PMTs comprises a plurality of PMTs, each PMT responsive to a different wavelength or wavelength range from the other PMTs.

12. The system of claim 1, wherein the elevated divider comprises a facing surface disposed above the dead-end channel and located at the sorting junction.

13. The system of claim 1, wherein the border wall between the waste channel and collection channel includes a plurality of pressure equilibration channels along a portion thereof.

14. The system of claim 1, wherein the controller is configured to actuate the diverter based on a threshold corresponding to the measured fluorescence at a particular wavelength or wavelength range.

15. The system of claim 1, wherein the controller is configured to actuate the diverter based on a threshold corresponding to the measured fluorescence at a particular wavelength or wavelength range for a defined residence time of each droplet.

16. The system of claim 1, further comprising a high-speed camera configured to capture images of droplets passing through the droplet sorting channel.

17. The system of claim 16, further comprising an illumination light configured to illuminate droplets passing through the droplet sorting channel for imaging by the high-speed camera, the illumination light emitting light which does not interfere with the excitation light and the emitted fluorescent light.

* * * * *